United States Patent [19]

Norita et al.

[11] Patent Number: 5,005,040
[45] Date of Patent: Apr. 2, 1991

[54] AUTOMATIC FOCUS ADJUSTING APPARATUS OF A CAMERA

[75] Inventors: Toshio Norita; Tokuji Ishida; Masataka Hamada; Kenji Ishibashi, all of Osaka, Japan

[73] Assignee: Minolta Camera Kabushiki Kaisha, Osaka, Japan

[21] Appl. No.: 479,206

[22] Filed: Feb. 14, 1990

Related U.S. Application Data

[63] Continuation of Ser. No. 352,824, May 16, 1989, abandoned.

[30] Foreign Application Priority Data

| May 16, 1988 | [JP] | Japan | 63-118682 |
| May 16, 1988 | [JP] | Japan | 63-118683 |
| Oct. 6, 1988 | [JP] | Japan | 63-252431 |
| Oct. 6, 1988 | [JP] | Japan | 63-252432 |

[51] Int. Cl.⁵ .................. G03B 13/36; G02B 7/28
[52] U.S. Cl. ........................ 354/402; 250/201.2
[58] Field of Search ............. 354/402, 406, 407, 408; 250/201.2, 201.6, 201.7, 201.8

[56] References Cited

U.S. PATENT DOCUMENTS

| 4,334,150 | 6/1982 | Herbst et al. | 250/201 |
| 4,387,975 | 6/1983 | Araki | 354/25 |
| 4,492,448 | 1/1985 | Ishikawa et al. | 354/406 |
| 4,563,708 | 1/1986 | Ishibashi | 358/213 |
| 4,636,624 | 1/1987 | Ishida et al. | 354/406 X |
| 4,768,052 | 8/1988 | Hamada et al. | 354/402 |
| 4,831,403 | 5/1989 | Ishida et al. | 354/402 |

Primary Examiner—W. B. Perkey
Attorney, Agent, or Firm—Burns, Doane, Swecker & Mathis

[57] ABSTRACT

An automatic focus adjusting apparatus of a camera comprises three CCD sensors receiving light from an object, a focus detecting apparatus for outputting a focus signal indicative of the focusing state of a photographic lens based on output data from the respective CCD sensors, a calculating apparatus for calculating an amount of driving the photographic lens based on the focus signal, a selector for selecting one of the three CCD sensors, a correcting apparatus for correcting the amount of driving calculated based on the output data from the selected CCD sensor, and a driving apparatus for driving the photographic lens to an in-focus position based on the corrected driving amount. An error in foucs detection incidental to the driving of the lens can be corrected based only on the data from one CCD sensor selected by a selector, so that the focusing error on a moving object can be eliminated in a simple manner.

14 Claims, 35 Drawing Sheets

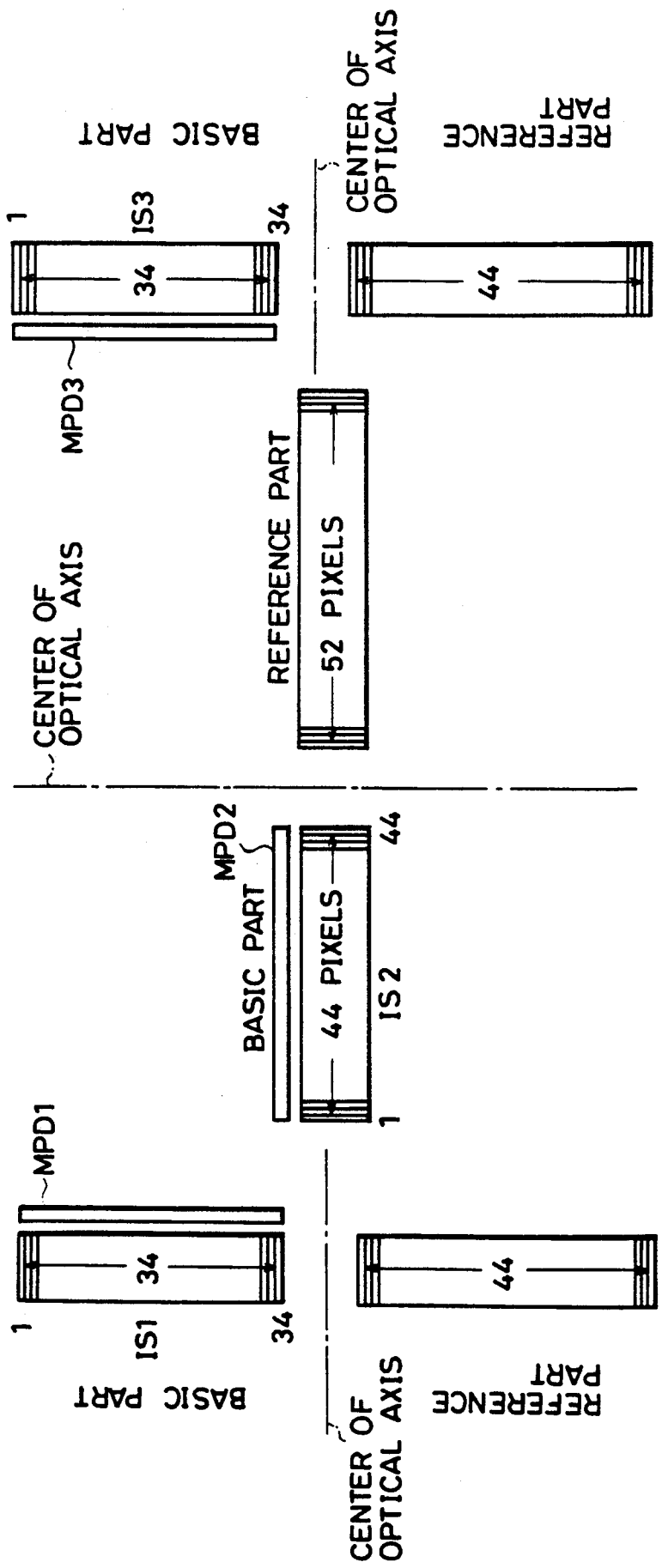

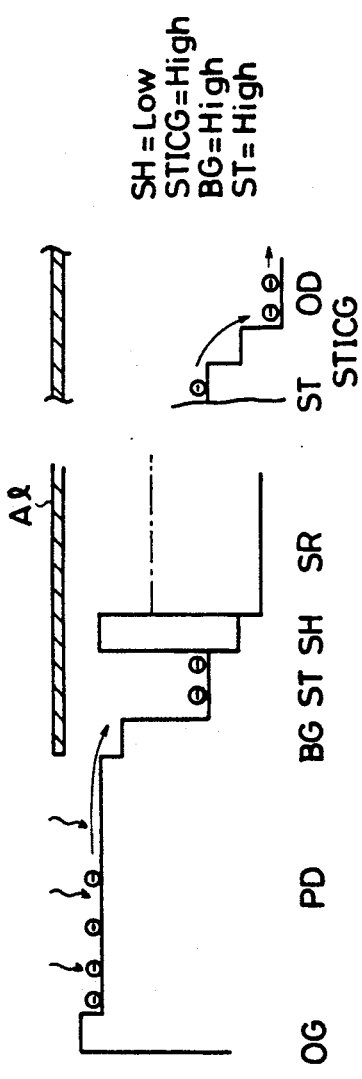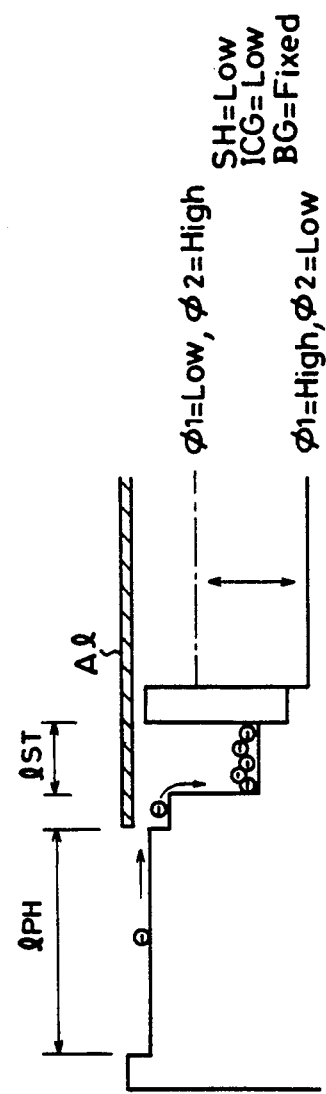
FIG.12A (PRIOR ART)
FIG.12B (PRIOR ART)
FIG.12C (PRIOR ART)

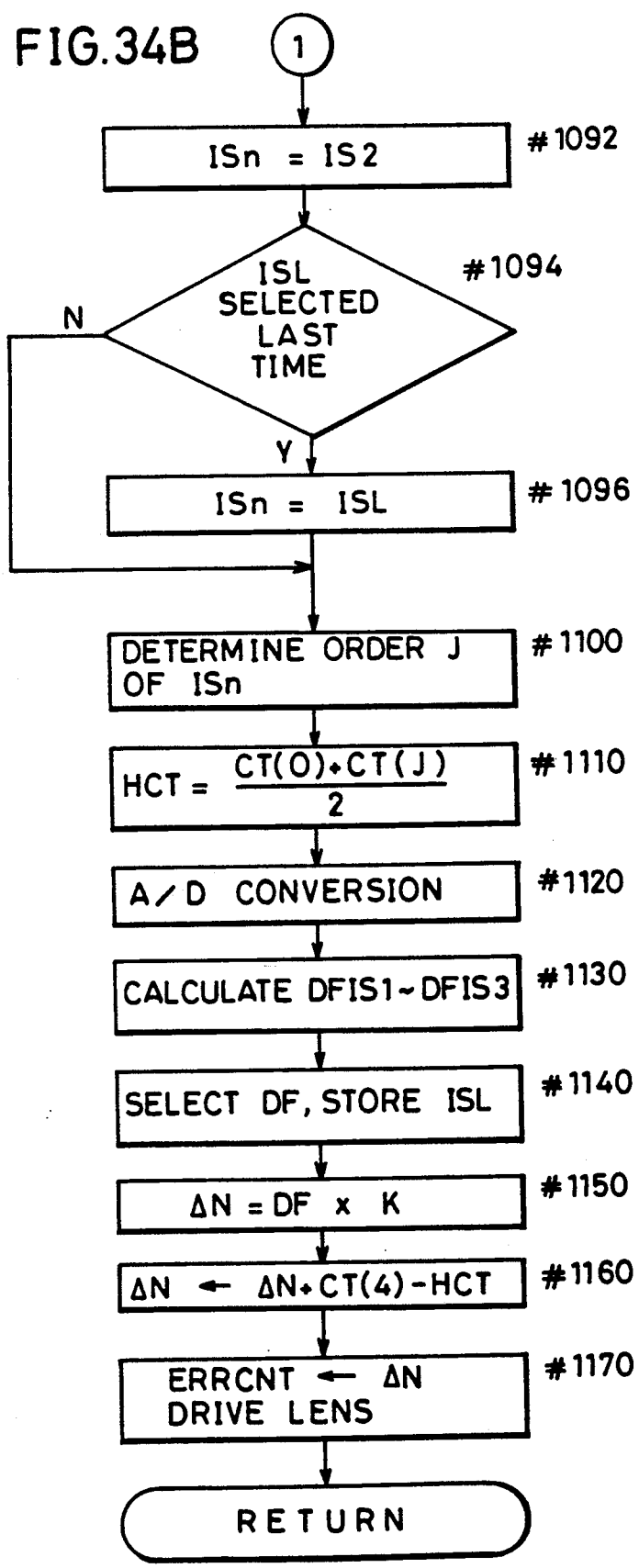

AUTOMATIC FOCUS ADJUSTING APPARATUS OF A CAMERA

This application is a continuation of U.S. application Ser. No. 07/352,824, filed May 16, 1989, now abandoned.

BACKGROUND OF THE INVENTION

1. Field of the Invention

The present invention relates to an automatic focus adjusting apparatus of a camera and, more specifically, to an automatic focus detecting apparatus of a camera having a plurality of areas for focus detection.

2. Description of the Related Art

A focus adjusting apparatus employing TTL phase difference detecting method of interest to the present invention is disclosed in Japanese Patent Laying-Open Gazette No. 4914/1985. According to this article, a condenser lens and first and second image re-forming lenses are arranged behind a predetermined plane equivalent to a focal plane of a photographic lens. An amount of deviation (amount of defocus) from the predetermined focal plane of the photographic lens is detected as deviation of a distance between first and second images which are re-formed by the first and second image re-forming lenses. Automatic focus adjustment is carried out by driving the photographic lens in accordance with the result of detection. In such an automatic adjusting apparatus, photoelectric converting elements of charge accumulation type such as CCD image pick up devices are often used to detect the distance between the first and second images.

In the above described automatic focus adjusting apparatus, the lens is driven even during accumulating charges, when the lens is driven for automatic focus adjustment. However, there is a time difference between the time when charges are being accumulated by the arrangement of photoelectric converting elements and the time when the amount of driving lens is calculated based on the result of focus detecting operation in accordance with the output from the arrangement of photoelectric converting elements. Therefore, the driving amount of the lens must be corrected. Now, when there are a plurality of areas for focus detection, respective focus detecting areas corresponds to different objects, respectively. Therefore, the time for accumulating charges in the respective arrangements of photoelectric converting elements corresponding to the respective focus detecting areas are different from each other. Therefore, the lens driving amount must be corrected by different amounts in the respective arrangements of photoelectric converting elements, which correction is complicated and time consuming. In addition, memory capacitance required for the correction is large. Alternatively, if the correction of the lens driving amount for respective focus detecting areas is carried out by a prescribed correcting amount, then the resulting lens driving amount corresponds to the amount of driving the lens from different positions.

SUMMARY OF THE INVENTION

Therefore, one object of the present invention is to eliminate, in a simple manner, errors in focus adjustment by photoelectric conversion during driving of a lens in a camera having automatic focus adjusting apparatus with a plurality of focus detecting areas.

Another object of the present invention is to carry out adjustment of an in-focus position of a photographic lens based on an amount of driving the photographic lens from the same point for the plurality of focus detecting areas, when the focus detecting operation is carried out during driving of the lens in a camera having automatic focus adjusting apparatus with a plurality of focus detecting areas.

A further object of the present invention is to properly control time required for accumulating charges by a plurality of arrangements of photoelectric converting elements in a camera having automatic focus adjusting apparatus with a plurality of focus detecting areas.

A still further object of the present invention is to eliminate, in a simple manner, errors derived from photoelectric conversion during driving of the lens in a camera having automatic focus adjusting apparatus with a plurality of focus detecting areas.

The above described objects of the present invention can be attained by a camera having automatic focus adjusting apparatus with a plurality of focus detecting areas of the present invention, comprising: a plurality of photoelectric converting apparatuses receiving light from an object, each of the photoelectric converting apparatuses having a plurality of light receiving portions and a plurality of charge accumulating portions for accumulating charges generated in the light receiving portions; storage controlling apparatus for controlling time of charge accumulation in each of the photoelectric converting apparatuses; a focus detecting apparatus for detecting an in-focus states of a photographic lens based on outputs from the photoelectric converting apparatuses to output a focus signal; a calculating apparatus for calculating an amount of driving of the photographic lens in accordance with the focus signal; selecting apparatus for selecting one of the plurality of photoelectric converting apparatuses, focusing error being generated when the photographic lens is moved in the time of charge accumulation of the photoelectric converting device selected by the selecting apparatus; correcting apparatus for correcting the calculated amount of driving of the photographic lens based on the focusing error; and a driving apparatus for driving the photographic lens based on the corrected amount of driving of the photographic lens.

The camera having automatic focus adjusting apparatus with a plurality of focus detecting areas comprises the above described components. If the photographic lens is being moved, an amount of defocus provided from the focus detecting apparatus indicates the amount of defocus not at the present position of the photographic lens but the amount of defocus at the time of charge accumulation. Therefore, correction must be carried out in order to correct the amount of movement of the lens between the charge accumulation time and the time of calculation of the defocus amount. In the present invention, the amount of driving the photographic lens is corrected based on an output value of a predetermined one of the plurality of photoelectric converting apparatuses. Therefore, an error in focus adjustment derived from photoelectric conversion during driving of the lens can be eliminated in a simple manner in a camera having automatic focus adjusting apparatus with a plurality of focus detecting areas.

According to another aspect of the present invention, a camera having automatic focus adjusting apparatus with a plurality of focus detecting areas comprises: a plurality of photoelectric converting apparatuses receiving light from an object, each of the photoelectric converting apparatuses having a plurality of light receiving portions and a plurality of charge accumulating portions for accumulating charges generated in the light receiving portions; charge controlling means for controlling time of charge accumulation in each of the photoelectric converting apparatuses; focus detecting apparatus for detecting an in-focus state of a photographic lens for each of the photoelectric converting devices to output focus signals indicative of the respective in-focus states; calculating apparatus for calculating an amount of driving photographic lens for each of the photoelectric converting apparatuses based on the focus signals, a focusing error being generated when the photographic lens is moved during the charge accumulating period of each photoelectric converting apparatus; correcting means for determining focusing error for each of the photoelectric converting apparatuses and for correcting the calculated amount of lens driving in each of the photoelectric converting apparatuses based on the focusing errors; determining apparatus for determining the amount of driving photographic lens based on the respective corrected lens driving amount; and driving apparatus for driving the photographic lens based on the lens driving amount determined by the determining apparatus. The camera having automatic focus adjusting apparatus with a plurality of focus detecting areas comprises the above described components.

Generally, the plurality of photoelectric converting apparatuses store charges at different time. Therefore, the amount of movement of the lens to be corrected derived from the movement of the photographic lens is different. Therefore, the amount of movement of the lens from the time of the charge accumulation to the time at which the defocus amount is calculated for each of the photoelectric converting devices, and the amount of defocus is corrected by a correcting apparatus so as to offset the amount of movement. The photographic lens is driven by the corrected value. Therefore, when a focus detecting operation is carried out during driving of the lens in the camera having automatic focus adjusting apparatus with a plurality of focus detecting areas, the in-focus position of the photographic lens is adjusted based on the amount of driving the photographic lens from the same position.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 4A and 4B show details of a CCD chip employed in the photoelectric converting apparatus of the present invention;

FIGS. 12A to 12C, 13A to 13C, and to 14A to 14D illustrate different accumulation modes of the photoelectric converting apparatus in the prior art and to which the present invention is applied;

FIGS. 25-27, 28A, 28B, 28C, 29-33, 34A, and 34B are flow charts showing operations of the control circuit in accordance with the second embodiment of the present invention.

DESCRIPTION OF THE PREFERRED EMBODIMENTS

Figure 1:
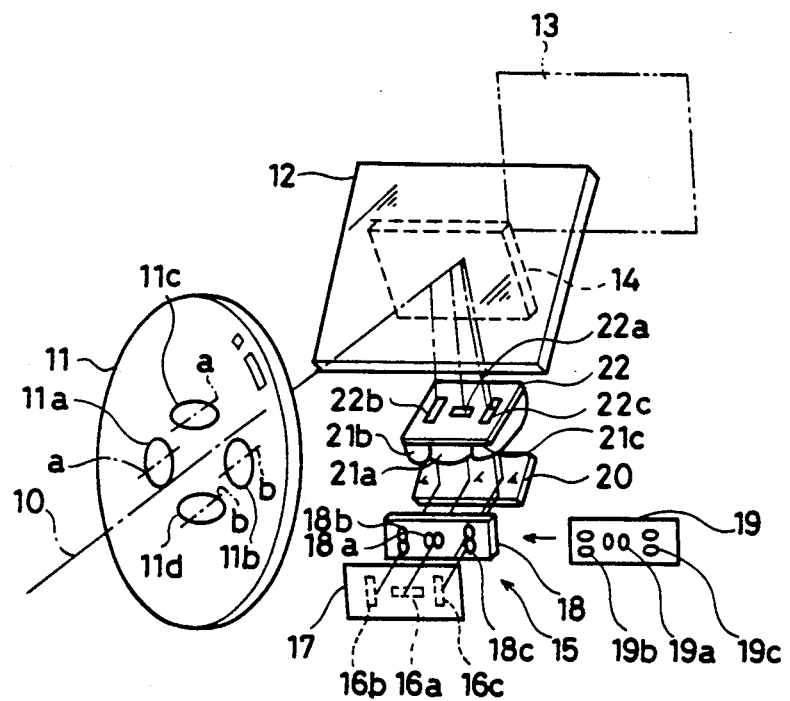
FIG. 1 is a perspective view showing a focus detecting optical system of a camera employing a photoelectric converting apparatus in accordance with the present invention.
Figure 2:
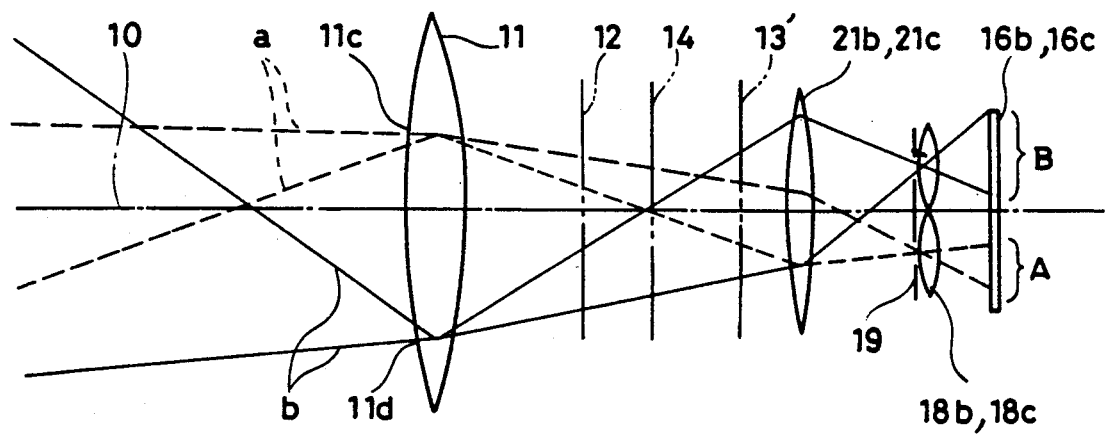
FIG. 2 illustrates the principle of the focus detecting optical system shown in FIG. 1.

A focus detecting optical system in a single lens reflex camera having automatic focus detecting function employing the photoelectric converting apparatus in accordance with the present invention will be described in the following with reference to FIGS. 1 and 2. A camera body of the single lens reflex camera comprises a photographic lens 11 provided on an optical axis 10 and a main mirror 12 provided inclined upward by 45° behind the photographic lens 11. A film 13 is provided behind the main mirror 12. Luminous bundle for photographing passed through the photographic lens 11 is reflected upward by the main mirror 12, images are formed on a focusing screen (not shown) and guided to a finder optical system through a penta prism.

A half mirror is formed at least at one portion of the main mirror 12. A submirror 14 whose rotary axis attached on a rear surface of the main mirror 12 is provided facing downward at an angle of 45° between the half mirror portion of the main mirror 12 and the film 13. Luminous bundle for detecting focus passed through the half mirror portion of the main mirror 12 is reflected downward by the submirror 14 to be guided to a focus detecting apparatus 15 arranged below a mirror box of the camera body.

In taking photographs, the main mirror 12 and the submirror 14 are rotated forward and upward to be displaced from the optical axis 10. The luminous bundle for photographing passed through the photographic lens 11 is formed on the film 13, so that image exposure is carried out on the film 13.

The focus detecting apparatus 15 comprises an AF sensor 17 comprising three arrangements of photoelectric converting elements 16a, 16b and 16c. One arrangement 16a of the photoelectric converting elements out of the arrangements 16a to 16c is arranged at a horizontal position including the optical axis 10. Two arrangements 16b and 16c of the photoelectric converting elements are arranged at vertical positions not including the optical axis 10 on both sides of the arrangement 16a of the photoelectric converting elements. The arrangements 16b and 16c of the photoelectric converting elements are arranged approximately at right angle with the arrangement 16a of the photoelectric converting elements.

A separator lens plate 18 is provided in front of the AF sensor 17. Separator lens pairs 18a, 18b and 18c corresponding to the arrangements 16a to 16c of the photoelectric converting elements are formed in one unit. An aperture mask 19 is provided directly in front of the separator lens plate 18, the mask 19 having openings 19a to 19c corresponding to the separator lens pairs 18a to 18c. A reflecting mirror 20 is provided facing the aperture mask 19 and the submirror 14. The reflecting mirror 20 guides the luminous bundle for detecting focus reflected downward by the submirror 14 to the arrangements 16a to 16c of the photoelectric converting elements through the aperture mask openings 19a to 19c and through the separator lens pairs 18a to 18c. Condenser lenses 21a to 21c opposing to the aperture mask openings 19a to 19c are provided between the reflecting mirror 20 and the submirror 14. A field stop 22 is provided on the upper surfaces of the condenser lenses 21a to 21c. The field stop 22 has openings 22a to 22c for separating the luminous bundle for focus detection such that the bundle corresponds to the arrangements 16a to 16c of the photoelectric converting elements having different positions and directions.

The TTL phase difference detecting method is the principal of focus detection. Basic luminous bundles a (represented by dotted lines in FIG. 2) and reference luminous bundles b (represented by solid lines in FIG. 2) passing through different areas 11a and 11b, 11c and 11d on exit pupil of the photographic lens 11 are respectively received by the basic part A and the reference part B in each of the arrangements 16a to 16c of the photoelectric converting elements. Patterns of light distribution of the images are converted into electric signals and the relative displacement of the two images are determined by a correlator (not shown). The photographic lens 11 is moved forward and rearward by a driving mechanism based on a deviation signal from the correlator, so as to realize automatic focus adjustment. In the focus detecting optical system of FIG. 1, arrangements 16b and 16c of the photoelectric converting elements in the vertical positions are provided in addition to the arrangement 16a of the photoelectric converting elements in the horizontal direction. Therefore, focus detection in the horizontal direction and in the vertical direction can be simultaneously carried out, enabling focus detection of a horizon and the like.

Figure 3:
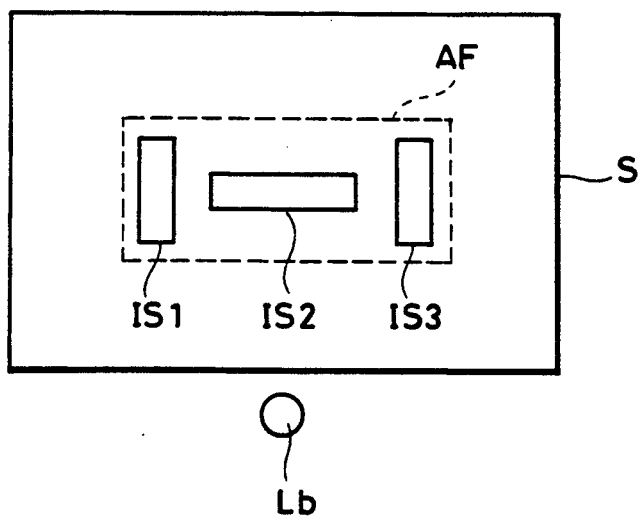
FIG. 3 shows a display in a finder of a camera to which the present invention is applied.

FIG. 3 shows a display in a finder of a camera employing the AF sensor 17 of the present embodiment. Focus detection can be carried out on objects positioned in three areas IS1, IS2 and IS3 (hereinafter referred to as a first island, second island and third island, respectively) shown by solid lines at the center of a photographing screen. A rectangular frame AF is shown by a dotted line so as to inform the user of the area in which focus detection is carried out. An indicating portion LB outside of the photographing screen S is provided to indicate the state of focus detection, which is turned on when the camera is brought into the in-focus state.

FIG. 4A shows light receiving portions of arrangements of CCD image pick up elements on the AF sensor 17 employed in the focus detecting apparatus. The CCD comprises a light receiving portion, a charge accumulating portion and a transferring portion. Each of the islands IS1, IS2 and IS3 of FIG. 3 comprises a basic part and a reference part, with the center of the optical axis positioned at the center between the basic part and the reference part. Monitoring light receiving elements MPD1, MPD2 and MPD3 for controlling time of accumulation to the charge accumulating portion of the CCDs are provided on one side in the longitudinal direction of the basic portions of each of the island. The number of pixels in the basic part and reference part of the respective islands IS1, IS2 and IS3 are (34, 44) in the island IS1, (44, 52) in the island IS2 and (34, 44) in the island IS3. These pixels are all formed on one chip.

In the focus detecting apparatus of the present embodiment, the basic parts of the three islands are divided into a plurality of a blocks. Each of the blocks of the basic parts is compared with the reference parts to carry out focus detection. Out of the results of focus detection in the respective blocks, the data corresponding to the rear-most focus is used as the focus detecting data in respective islands, and the focus detecting data of the camera is calculated in accordance with the focus detecting data of the respective islands and the data of photographing magnification rate.

Figure 4B:
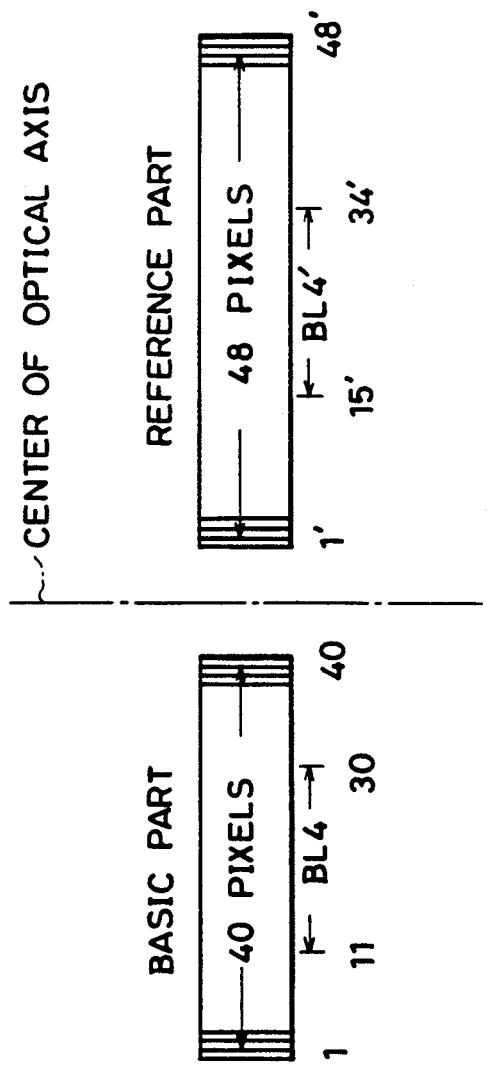
Figure 5:
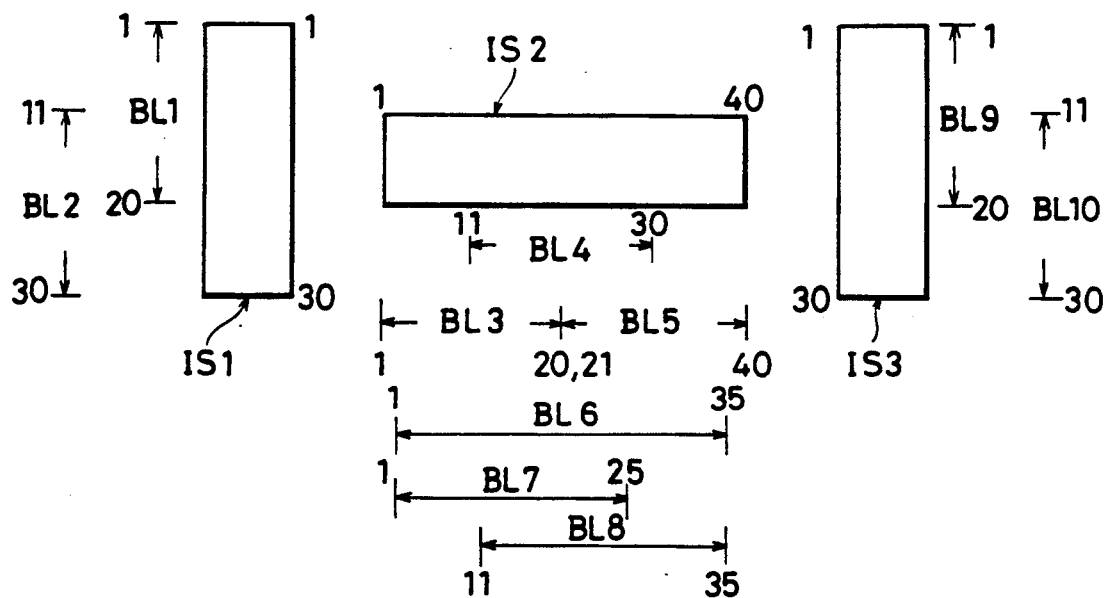
FIG. 5 illustrates division of areas of a basic part on the CCD chip shown in FIGS. 4A and 4B.
Figure 6:
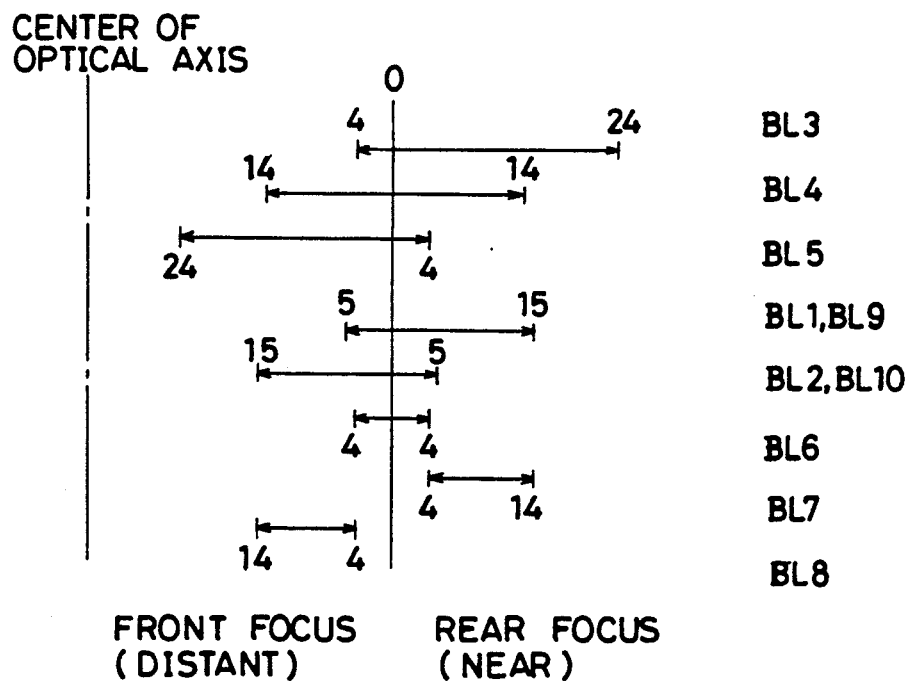
FIG. 6 shows amount of shifting in respective divided areas on the CCD chip.

The range of dividing and the range of defocus of the divided islands are shown in FIGS. 5, 6 and 4B. FIG. 5 shows, in an enlargement, the focus detecting area on the photographing screen shown in FIG. 3. The respective islands IS1, IS2 and IS3 for focus detection correspond to the areas of the basic parts shown FIG. 4A. Now, the pixel data provided in the CCDs are represented by differences between two data. Here, the difference between data provided from every fourth pixel of the CCD is calculated (the data will be hereinafter referred to as difference data). In FIG. 5, the numerals shown in respective islands indicates data number of the difference data provided by the CCDs shown in FIG. 4A (the difference data may be provided from every other or every third pixels, and in that case the numerals will be different). Therefore, the number of difference data (X, Y) in the basic parts and the reference parts of the respective islands are (30, 40) in the island IS1, (40, 48) in the island IS2 and (30, 40) in the island IS3. The data number is adapted such that the number increases from the upper end or from the left end, as shown in FIG. 5. Each of the islands is divided. The island IS1 is divided into two blocks BL1 and BL2. The block BL1 comprises difference data (1 to 20) and the block BL2 comprises the difference data (11 to 30). The island IS2 is divided into three blocks BL3, BL4 and BL5. The block BL3 comprises the difference data (1 to 20), the block BL4 comprises the data (11 to 30) and the block BL5 comprises the data (21 to 40). The island IS3 is divided into blocks BL9 and BL10. The block BL9 comprises the difference data (1 to 20) and the block BL10 comprises the data (11 to 30).

In the present embodiment, another focus detecting operation is carried out by using a sum of data with different extracting frequencies of the image in order to treat object of low frequencies, in the above described second island. More specifically, a sum of difference data obtained from every eighth one of the above described continuous pixels is carried out. In that case, the number of data will be as follows. Since difference data provided from every eight data from the CCD output are used, so that the number of data in the basic part is 36 and the number of data in the reference part is 44. Since the sum of the adjacent difference data are used as the data, the number of data in the basic part become 35 and the number of data in the reference part becomes 43. If the distance between the pixels for providing the difference data becomes larger, it is more preferable for an object of the lower frequency. In the present embodiment, the distance approximately twice as large as the ordinary case is employed. The block BL6 for low frequency structured as described above comprises difference data (1 to 35) which is divided into a seventh block BL7 including 25 difference data on the left side and an eighth block BL8 including 25 difference data on the right side.

In the focus detection employing the phase difference detecting method, the center of the optical axis is positioned between the basic part and the reference part. When the images in the basic part and the reference part matched with each other and the distance between the images is larger than a prescribed distance, then it is determined as a rear focus state. If the distance is smaller than the prescribed distance, it is determined as a front focus state. If the distance is a prescribed distance, then it is determined as the in-focus state. Therefore, as for the defocus detectable range in the divided block, the blocks which are far from the center of the optical axis in respective islands correspond to the rear focus side. The reason for this is described in detail based on FIG. 4B showing the difference data. FIG. 4B shows the basic part and the reference part of the island IS2. Now, let us consider the range of defocus of the fourth block BL4. The in-focus sate is realized when the images on the 15th to 34th elements (BL4') from the left end in the reference part coincides with the images of the fourth block BL4. If the coincidence of the image occurs on the positions nearer to the left end of the reference part than the above described position, it is determined that the lens is in the front focus state. At that time, the largest number of deviated pixels of the front focus (hereinafter referred to as a deviation pitch) becomes 14. If the coincidence of the images occurs in the portions nearer to the right end of the reference part than the illustrated position, the lens is in the rear focus state, and the maximum deviation pitch of the rear focus is 14. The defocus detectable range of the divided block in other islands are the same. The relation is shown in FIG. 6. In the third block BL3, the deviation pitch in the front focus side is 4 and the deviation pitch in the rear focus side is 24. In the fifth block BL5, the deviation pitch in the front focus side is 24 and the deviation pitch in the rear focus side is 4. In the first and third islands IS1 and IS3, the deviation pitch in the front focus side is 5 and the deviation pitch in the rear focus side is 15 in the first and ninth blocks BL1 and BL9. The deviation in the front focus side is 15 and the deviation pitch in the rear focus side is 5 in the second and tenth block BL2 and BL10. In the sixth block BL6, the deviation pitch is 4 in both rear focus side and the front focus side. The deviation pitch is 4 in the front focus side and the deviation in the rear focus side is 14 in the seventh block BL7. The deviation pitch is 14 in the front focus side and the deviation pitch is 4 in the rear focus side in the eighth block BL8. However, since calculation is carried out avoiding an overlap with the sixth block BL6, the deviation pitch of the seventh block BL7 are 4 to 14 in the rear focus side, and the deviation pitch in the eight block BL8 are 4 to 14 in the front focus side.

Figure 7:
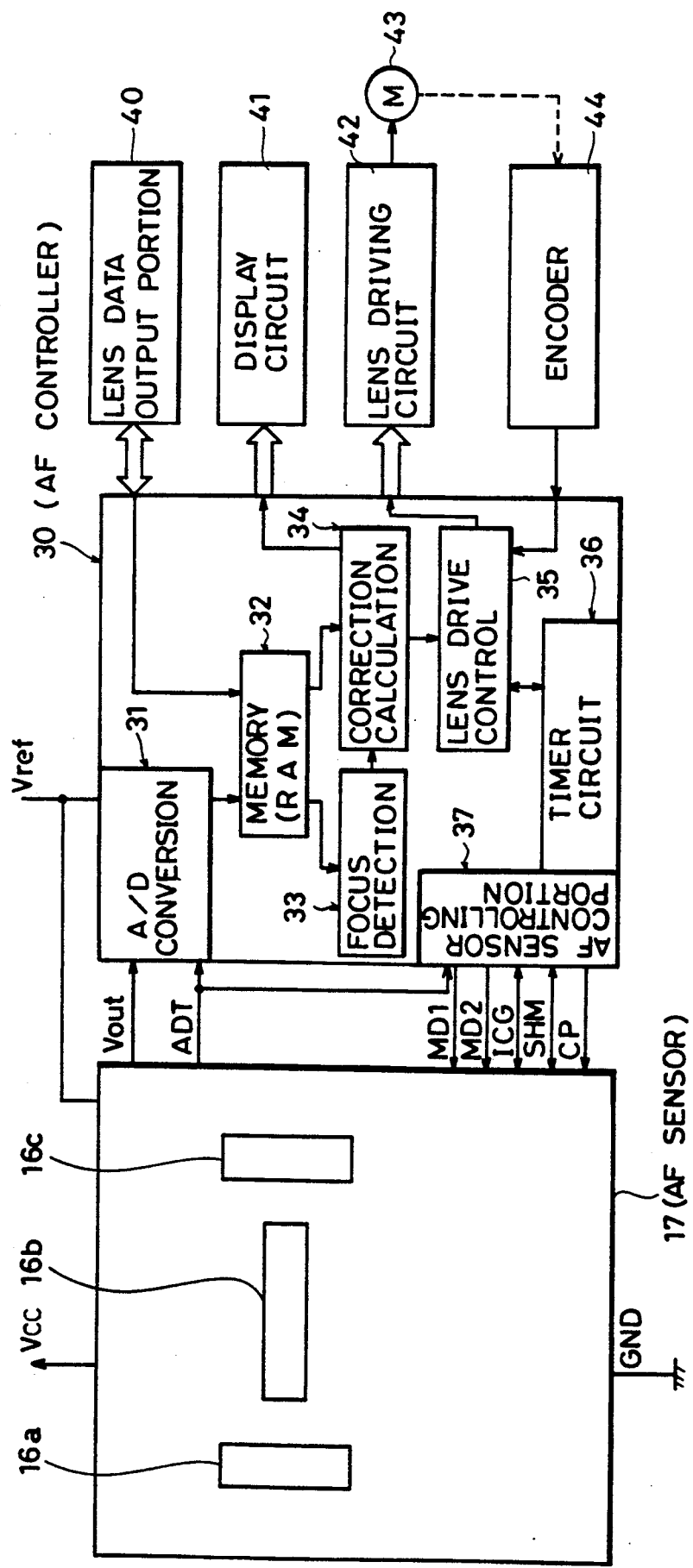
FIG. 7 is a block circuit diagram of an AF sensor and an AF controller implementing photoelectric converting apparatus of the present invention.

FIG. 7 is a block diagram of a control portion of a focus detecting apparatus of a camera employing the photoelectric converting apparatus of the present invention. Referring to FIG. 7, the control portion comprises an AF sensor 17, an AF controller 30 and peripherals circuits thereof. The AF controller 30 is formed of a one chip microcomputer, including an A/D converting portion 31 for converting analog signals provided from an analog signal output line $V_{out}$ of the AF sensor 17 into digital signals, and a memory portion 32 formed of a RAM. The memory portion 32 receives data such as defocus amount-lens moving amount converting coefficient $K_L$ which are different in various lenses and a color temperature defocus amount $dF_L$ from a lens data output portion 40 including an ROM of the photographic lens (interchangeable lens unit), and stores digital data from the A/D converting portion 31 one by one. The AF controller 30 further comprises a focus detecting portion 33 for detecting an in-focus point based on the output from the memory portion 32; correction calculating portion 34 for calculating amount of correction in accordance with the detected focus data, the lens data and so on; a lens drive controlling portion 35 for transmitting a signal for driving the lens based on the amount of correction to a lens driving circuit 42; a timer circuit 36 for measuring time in order to determine whether or not charge accumulated in the AF sensor 17 (hereinafter the term "charge storage" will be referred to as "accumulation") reaches a prescribed value within a prescribed time period; and an AF sensor controlling portion 37 for exchanging signals with the AF sensor 17. The lens drive controlling portion 35 receives data in association with movement of the lens from an encoder 44. A lens driving motor 43 is connected to the lens driving circuit 42. A display circuit 41 is controlled by the AF controller 30. The AF sensor 17 and the AF controller 30 are separately formed, each on 1 chip. Therefore, the AF system as a whole comprises 2 chips in total. An analog reference voltage Vref is applied to the A/D converting portion 31 of the AF controller 30 and to the AF sensor 17. The AF sensor 17 is connected to a power supply line Vcc and the ground.

The AF sensor 17 and the AF controller 30 are connected to each other by seven signal lines, namely, MD1, MD2, ICG, SHM, CD, ADT and Vout. Out of these signal lines, the lines MD1 and MD2 are signal lines for outputting logic signals from the AF controller 30 to the AF sensor 17 for setting operation mode of the AF sensor 17. The operation mode of the AF sensor 17 comprises four modes, that is, an initializing mode, low brightness accumulation mode, high brightness accumulation mode and data dump mode. The operation mode is selected in accordance with a combination of the logic levels on the signal lines MD1 and MD2. Signal lines ICG and SHM transmit signals in both directions. In the data dump mode, signals are outputted from the AF sensor 17 to the AF controller 30, outputting information in association with the brightness of an object and the order of completion of the accumulation in respective islands. In other modes, the signal line ICG applies an ICG signal instructing start of a new accumulation of the AF sensor 17, the signal line SHM applies an SHM signal designating a request of data to the AF sensor 17, respectively, from the AF controller 30 to the AF sensor 17. The signal line CP supplies reference clocks from the AF controller 30 to the AF sensor 17. The reference clocks supplied from the signal line CP can be ON/OFF controlled in the AF controller 30. The operation of the AF sensor 17 is temporarily stopped by turning OFF the reference clock. The AF controller 30 is capable of controlling other circuit portions, for example the lens driving circuit 42. The signal line ADT indicates completion of output of 1 pixel data of the AF sensor 17 in the data dump mode, and supplies an ADT signal indicating a start of A/D conversion to the A/D converting portion 31 in the AF controller 30. In other modes, an interruption signal indicative of completion of accumulation is outputted from the AF sensor 17 to the AF controller 30 at the time when charges are accumulated to a proper level in respective islands of the AF sensor 17. The signal line Vout is an analog signal line, which processes outputs from the arrangements 16a to 16c of the photoelectric converting elements in the AF sensor 17 in an analog manner to supply the same to the A/D converting portion 31 in the AF controller 30 from the AF sensor 17. The Vout signal outputted from the signal line Vout is outputted for every pixel in synchronization with the above mentioned ADT signal, and the Vout signal is A/D converted to be received by the AF controller 30 as image signal of the object provided from the AF sensor 17.

Figure 9:
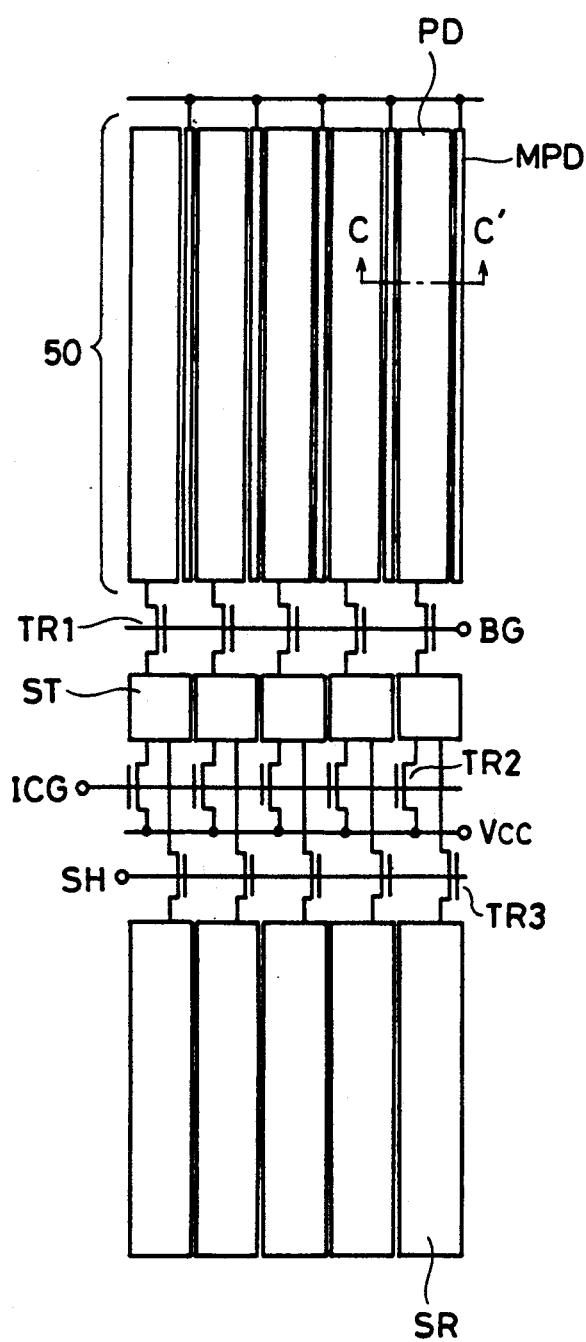
FIG. 9 shows structure of main portions of arrangements of photoelectric converting elements shown in FIG. 8.
Figure 10:
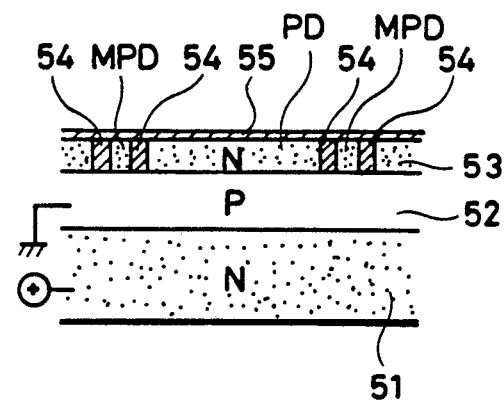
FIG. 10 is a cross sectional view taken along the line C—C' of FIG. 9.

Specific structure of the AF sensor 17 will be described in the following with reference to FIG. 8. The arrangements 16a to 16c of the photoelectric converting elements are shown in the left side of the figure, and an I/O portion to the AF controller 30 is shown in the right side. The arrangements 16a to 16c of the photoelectric converting elements comprise, as shown in the display of the finder of FIG. 3, three islands IS1 to IS3 arranged in an H shape. They are controlled independently in principal. The details of the structure of the arrangements 16a to 16c of the photoelectric converting elements will be shown in FIGS. 9 to 11. Portions comprising main components such as photodiodes PD, shift registers SR and so on will be described. As shown in FIG. 9, a photodiode array portion 50 comprises a plurality of photodiodes PD for pixels and photodiodes MPD for monitoring interposed therebetween. One end in the longitudinal direction of each of the photodiodes PD for pixels is coupled to the source of a first MOS transistor TR1 forming a barrier gate. The MOS transistor TR1 has its drain coupled to an accumulating portion ST of the succeeding stage and its gate coupled to a supply line of a BG signal (barrier gate signal). The accumulating portion ST is masked by an aluminum film to avoid irradiation of light, and the portion generates a so called dark current. The output ends of the accumulating portion ST are coupled to the source of a second MOS transistor TR2 forming an accumulation clear gate ICG and to the source of a third MOS transistor TR3 forming a shift gate SH. The second MOS transistor TR2 has its drain coupled to the power supply line Vcc and its gate coupled to a supply line of the ICG signal (accumulation clear gate signal). Meanwhile, the third MOS transistor TR3 has its drain coupled to a segment constituting the shift register SR and its gate coupled to a supply line of the SH signal (shift gate signal).

The monitoring photodiodes MPD are connected to each other at the upper end side as viewed in the figure. Therefore, the monitoring output are the total output of the connected plurality of monitoring photodiodes MPD. By coupling the plurality of monitoring photodiodes MPD, a photodiode for monitoring brightness of an object having wide field can be realized.

Referring to FIG. 9, the photodiode array portion 50 comprises: a P type region 52 formed on a silicon substrate 51 by a diffusing method; an N type region 53 formed by implantation; a photodiode PD for pixels and photodiodes MPD for monitoring formed on the P type region 52. P+ (P type impurity diffused region having high concentration) channel stoppers 54 are formed in the upper N type region 53 in order to isolate photodiodes PD for pixels from the photodiodes MPD for monitoring. An N+ film 55 to suppress the surface depletion layer is formed on the N type region 53 in order to suppress dark current from each of the photodiodes PD. A plus potential is externally applied to the silicon substrate 51 and a ground potential is applied to the intermediate P type region 52. The N type region 53 is formed by phosphorus implantation and P type region 52 is formed by diffusion of boron.

A plurality of cascade couplings of the photodiode PD for pixel, the monitoring photodiode MPD, the first MOS transistor TR1 for the barrier gate BG, the accumulating portion ST, the second MOS transistor TR2 for the accumulation clear gate ICG, the third MOS transistor TR3 for the shift gate SH, and the shift register SR are arranged in the transverse direction. For example, the number of segments of the shift register SR is 128.

Figure 11:
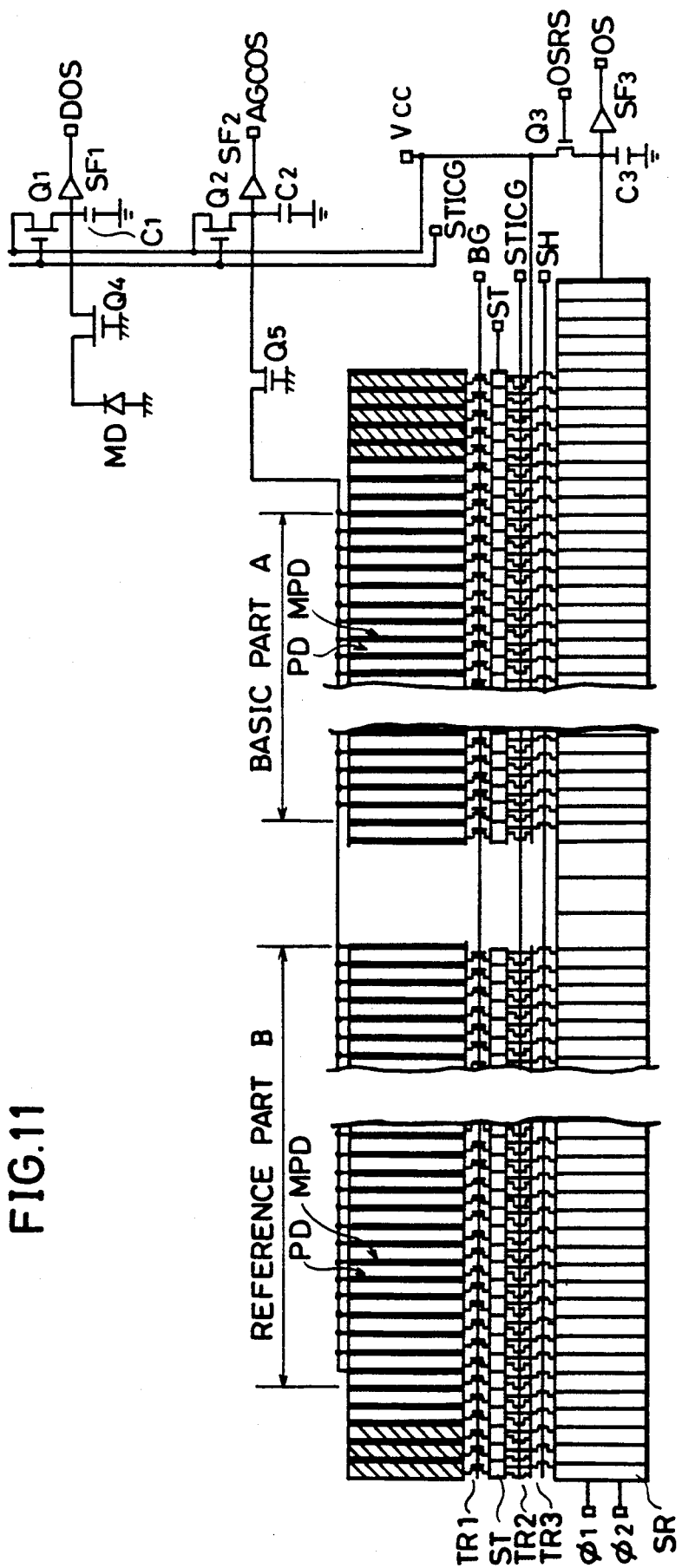
FIG. 11 shows a whole structure of the arrangements of the photoelectric converting elements.

As shown in the right end of the arrangement shown in FIG. 11, the number of segments of the photodiodes PD for pixels, the monitoring photodiodes MPD, the MOS transistors TR1 for the barrier gate, the accumulating portions ST, the MOS transistors TR2 for accumulation clear gate and the MOS transistors TR3 for the shift gate is smaller than that of the shift registers SR by 5 at the right end. In other words, five shift registers SR are additionally provided in the right end. These five segments serve as a transmitting path of the photoelectric charges.

In FIG. 11, five photodiodes PD for pixels and monitoring photodiodes MPD on the right end and three photodiodes PD for pixels and monitoring photodiodes MPD on the left end are covered by aluminum film, as shown by the hatching. The shaded photodiodes PD generate dark currents which are for dark correction of the output from the photodiodes PD for pixels. A portion of the photodiode array is allotted to the basic part A and another portion is allotted to the reference part B. For example, the basic part A comprises 44 combinations of the photodiodes PD for pixels and the monitoring photodiodes MPD while the reference part B comprises 52 combinations of the photodiodes PD for pixels and the monitoring photodiodes MPD. However, the basic part A and the reference part B have the same structure, the distinction between the two parts is realized by a software in the AF controller 30, which will be described later.

In that portion which is considered to be unnecessary between the basic part A and the reference part B, the photodiodes PD for pixels, the monitoring photodiodes MPD, the MOS transistors TR1 for the barrier gates, the accumulating portions ST, the MOS transistors TR2 for the accumulation clear gates and the MOS transistors TR3 for the shift gate are partly or entirely removed, leaving the shift registers SR only. The pitches between respective segments of the shift registers SR in this portion is larger than the pitch in other portions. Consequently, the number of transfer clocks necessary for transferring outputs of all the pixels can be reduced, thereby reducing the time required for transferring all charges.

The monitoring photodiodes MPD are connected to each other such that only those photodiodes positioned in the basic part (and also in the reference part B as needed) are utilized, and the monitoring photodiodes positioned in other portions are not used. However, those monitoring photodiodes MPD which are not used should preferably be connected to the power supply line $V_{cc}$ so as to kept in a stable state. The reason for this is that if these photodiodes are electrically floating, they will affect other photodiodes PD for pixels. Namely, the monitoring photodiodes MPD may be influenced by other photodiodes PD for pixels or may influence other photodiodes PD for pixels conductive. The output from the monitoring photodiode MPD is applied to a capacitor $C_2$ through a MOS transistor $Q_5$ to be kept therein, and it is outputted as an automatic gain control output signal AGCOS through a buffer formed of a source follower $SF_2$. A MOS transistor $Q_2$ is provided to initialize the capacitor $C_2$. A drift output signal DOS is generated simultaneously in order to remove a component dependent on temperature and the fluctuation of power supply of the automatic gain control output signal AGCOS. The drift output signal DOS is outputted from a capacitor $C_1$ which is initialized by a MOS transistor $Q_1$ having the same structure as the MOS transistor $Q_2$ for initializing the capacitor $C_2$. A diode MD having approximately the same area as the total area of the monitoring photodiodes MPD for detecting the drift component is connected to the capacitor $C_1$ through the MOS transistor $Q_4$. The diode MD is covered with an aluminum film. The MOS transistors $Q_1$ and $Q_2$ for initialization are simultaneously turned on while the ICG signal (accumulation clear gate signal) is being applied.

The charge accumulation mode of the arrangements 16a to 16c of the photoelectric converting elements in the AF sensor 17 will be described in the following with reference to FIGS. 12A to 14D. FIGS. 12A to 12C show distribution of potentials of the conventional one dimensional arrangement of photoelectric converting elements. The photoelectric converting element of 1 pixel comprises a photodiode PD with an overflow gate OG, a barrier gate BG set at a constant potential and an accumulating portion ST. First, by an application of a voltage to the accumulation clear gate STICG, the accumulating portion ST and the photodiode PD for photoelectric conversion discharge to the overflow drain OD the charges which have been accumulated, as shown in FIG. 12A. The overflow drain OD is commonly connected to the power supply line $V_{cc}$. Since the unnecessary charges are discharged, there is no electric charge left in the photodiode PD and in the accumulating portion ST, whereby each of the pixels is initialized. Thereafter, the voltage to the accumulation clear gate STIGC is removed, so that the potential level of the accumulation clear gate STICG rises, and the flow of charges from the accumulating portion ST to the overflow drain OD is stopped. Photoelectric charges generated in correspondence with the intensity of light entering the photodiode PD enters the accumulating portion ST through the barrier gate BG as shown in FIG. 12B to be accumulated therein. This is the charge accumulating operation. Now, when an average value of the charges accumulated in the accumulating portion ST in each pixel reaches a suitable level for the processing calculation and the processing circuits in the succeeding stage or when there is a data request for the AF controller 30, then the accumulation completing operation is carried out. The accumulation completing operation is carried out as shown in FIG. 12C. More specifically, a voltage is applied to the shift gate SH to lower the potential level of the gate, whereby the charges generated in the photodiode PD by the incidental light and held in the accumulating portion ST are introduced to the corresponding shift register SR.

The accumulating portion ST is provided from the following reason. Namely, a photodiode PD having large pixel area and high sensitivity is needed as the AF sensor 17 so that it can be used for a low brightness area. The length $l_{PH}$ is about several 100 μm. Meanwhile, the length $l_{ST}$ of the accumulating portion ST is generally about 50 μm, which is defined in accordance with requirements such as saturation voltage and so on (see FIG. 12B for the respective lengths $l_{PH}$, $l_{ST}$). Now, the time required for transmitting the charges to the shift register SR in the accumulation completing operation is about 3 to 5 μsec when the charges are to be transmitted from the accumulating portion ST. This value depends on the speed of movement of the charges, which increase in direct proportion to the square of the distance of transmission. Therefore, if the charges are accumulated in the photodiode PD but not in the accumulating portion ST, then the time for transmitting charges $\tau_{ST}$ will be $$\tau_{SH} = 5 \times (l_{PH}/l_{ST})^2 = 80 \; \mu sec$$

Assuming that $l_{PH} = 200$ μm and $l_{ST} = 50$ μm. Even if the voltage is applied to the shift gate SH in order to start accumulation completing operation immediately after the start of accumulation, the state must be continued for 80 μsec which limits the time of accumulation. Consequently, the dynamic range in the high brightness state is lowered. In view of the foregoing, the accumulating portion St is provided so as to reduce the length of transmission of the charges in completing accumulation, thereby improving responsiveness of the accumulation completing operation.

When the above described accumulation completing operation is terminated and the voltage applied to the shift gate SH is removed, then the charges generated in the photodiode PD accumulated and in the accumulating portion ST from the end of the last accumulation completing operation to the end of the present accumulation completing operation have been transmitted in parallel to the corresponding shift register SR.

Thereafter, the charges, which are the image information, are successively transmitted through the shift register SR in synchronization with the transfer clocks $\phi_1$ and $\phi_2$ supplied to the shift registers SR to be read as analog voltages from the output signal line OS of FIG. 12 through the capacitor $C_3$ serving as the charge amount-voltage converting means and through a buffer formed of a source follower $SF_3$ (see FIG. 11). The MOS transistor $Q_3$ is provided for initializing the capacitor $C_3$.

Now, there are following problems in the accumulating operation.

(1) Signals are outputted even if it is dark. The reason for this is that charges are generated corresponding to the potential level of respective positions by thermal excitation or the like even if there is no light. In order to prevent this problem, the potential level of the photodiode PD is generally set high. The potential level of the accumulating portion ST must be set lower in consideration of the conditions of the flow of charges. Therefore, the dark current in the accumulating portion ST alone is several to several ten times as large as that of the photodiode PD, even if the dark current is very small. Accordingly, most part of the dark current which will be the noise component is generated in the accumulating portion ST which is not directly related to the photoelectric conversion. Consequently, the S/N ratio is decreased compared with a common photodiode PD.

(2) Since the photoelectric conversion must be carried out with high sensitivity as described above, the time for accumulation must be controlled to be shorter. As described in the foregoing, the minimum accumulation time is limited by the pulse width of the shift pulse SH, and the phase relation of the transfer clocks $\phi_1$ and $\phi_2$ supplied to the shift register SR is also limited by the generation of the shift pulse SH.

Therefore, in the present embodiment, two accumulation modes are switched dependent on the conditions of usage, in order to reduce the dark current and to realize completion of accumulation at high speed.

ST accumulation mode (high brightness accumulation mode)

Figure 13A:
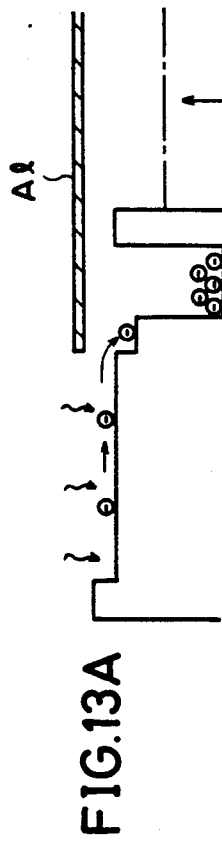
Figure 13B:
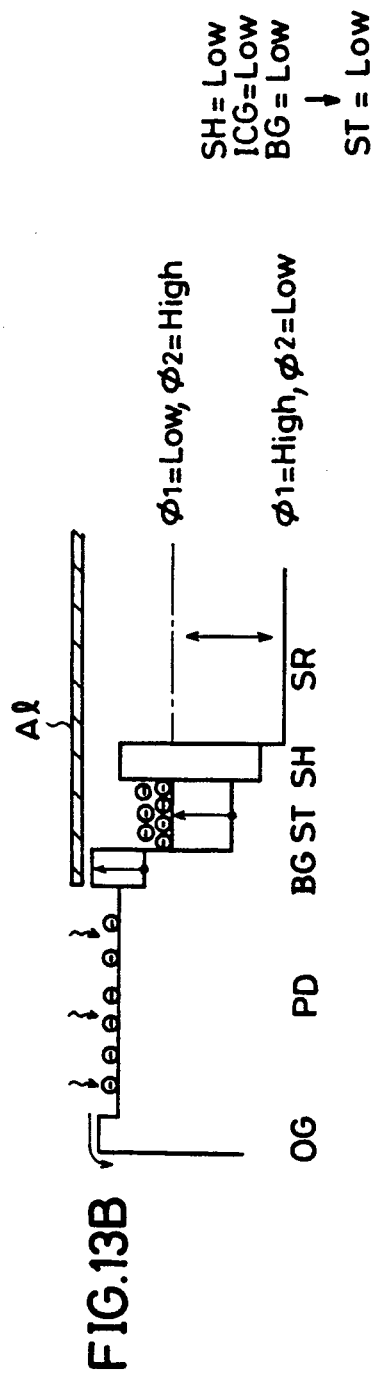
Figure 13C:
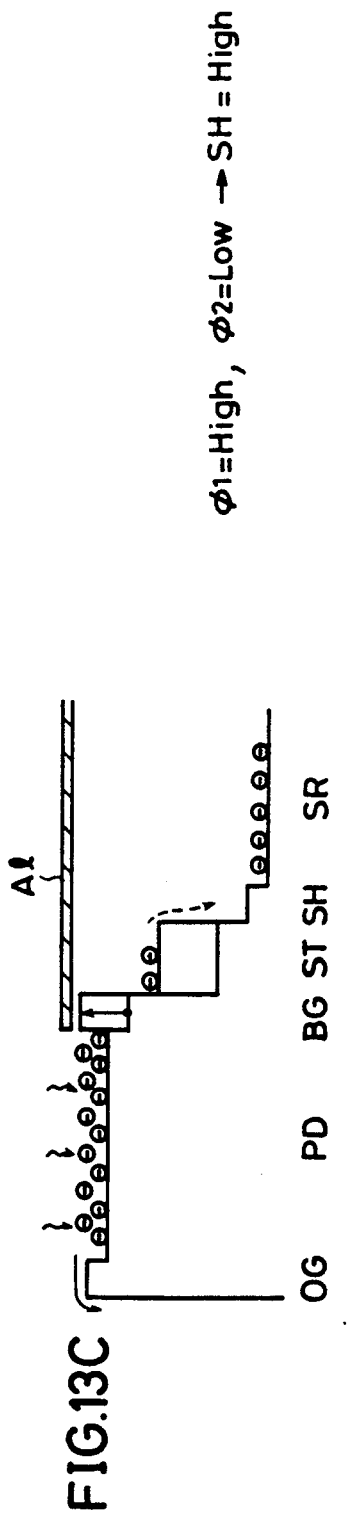

When image information of an object having high brightness which requires completion of accumulation at high speed is inputted, the ST accumulation mode shown in FIGS. 13A to 13C is selected by a combination of logics of the above described signal lines MD1 and MD2. The accumulation clearing operation and the accumulating operation shown in FIG. 13A are carried out in the same manner as described with reference to FIG. 12A. Only the accumulation completing operation is different in the ST accumulation mode. In the arrangements 16a to 16c of the photoelectric converting elements of the present embodiment, the potential of the barrier gate BG arranged between the photodiode PD and the accumulating portion ST can be controlled. During the accumulation clearing and accumulating operation shown in FIG. 13A, a prescribed voltage is applied to the barrier gate BG and the potential thereof is set at a low level in order to allow movement of the charges between the photodiode PD and the accumulating portion ST. When the average level of the accumulated charges in each pixel reaches a suitable level for the processing circuits in the succeeding stage or when the data request is applied from the AF controller 30, then, the accumulation completing operation is started by the signal. The voltage which has been applied to the barrier gate BG is removed so that the potential of the barrier gate BG is increased to a high level as shown in FIG. 13B, whereby the movement of the charges between the photodiode PD and the accumulating portion ST is stopped. Thereafter, the flowing of the charges generated by the incidental light to the photodiode PD into the accumulating portion ST is inhibited, thereby completing the accumulating operation. Thereafter, as shown in FIG. 13B, the potential of the accumulating portion ST is increased to a high level. Generation of the dark current in the accumulating portion ST while the charges from the photodiode PD are held in the accumulating portion ST can be suppressed. Therefore, the image information is not damaged by the dark current generated in the accumulating portion ST. Thereafter, in response to a generation of a data request signal SHM from the AF controller 30, a voltage is applied to the shift gate SH as shown in FIG. 13C to lower the potential level of the gate, whereby the charges are moved between the accumulating portion ST and the shift register SR.

In this manner, reading of data and the accumulation completing operation are carried out independent from each other. The accumulation completing operation can be realized by only changing the potential of the barrier gate BG from the low level to the high level. Consequently, the completion of accumulation can be carried out in a very short time period.

PD accumulation mode (low brightness accumulation mode)

An accumulation mode of the photodiode PD for an object having low brightness which require reduction of dark current will be described with reference to FIGS. 14A to 14D. The following operations are carried out in the accumulation mode of the photodiode PD. Charge accumulation is carried out in a photodiode PD outputting small current. The unnecessary dark current generated in the accumulating portion ST during the accumulation is discharged through the accumulation clear gate STICG. Charges generated only in the photodiode PD are transmitted from the photodiode PD to the accumulating portion ST for a sufficiently long period of time, and thereafter the charges are transmitted to the shift register SR to be successively read out. In this mode, the time required for the accumulation completing operation is about 100 µsec as it is limited by the speed of movement of the charges as described above. However, reading of image information of very small current can be realized.

Figure 14A:
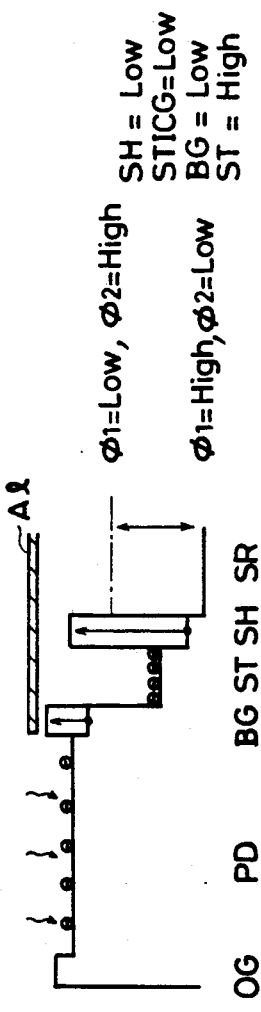
Figure 14B:
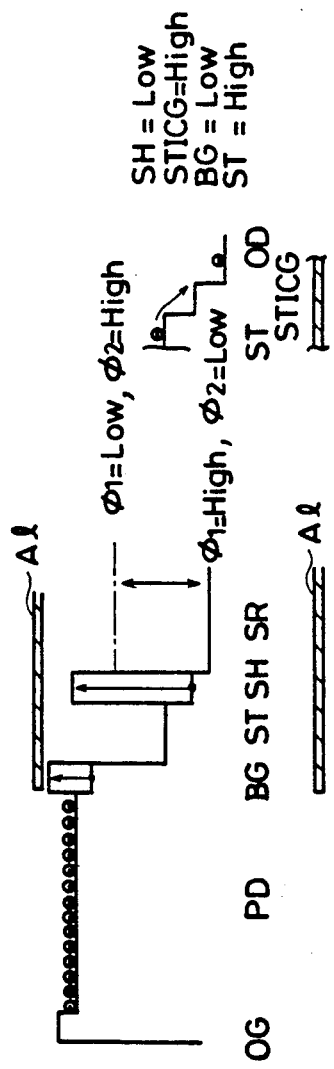
Figure 14C:
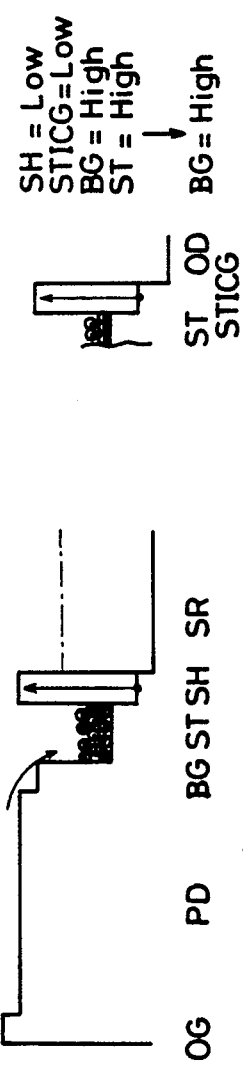

The accumulation clearing operation is carried out in the same manner as shown in FIG. 12A. At the start of accumulation, the potential of the barrier gate BG between the photodiode PD and the accumulating portion ST is set at a sufficiently high level unlike in the accumulation mode shown in FIG. 12A or in the ST accumulation mode shown in FIG. 13A, and the charges are accumulated not in the accumulating portion ST but in the photodiode PD. When the charges stored in the photodiode PD reach a suitable level or when there is a data request signal SHM is applied from the AF controller 30 to start the accumulation completing operation, the unnecessary dark current charges which have been generated in the accumulating portion ST and accumulated in the accumulating portion ST are discharged. The unnecessary charges left in the accumulating portion ST are discharged by controlling the potential of the accumulation clear gate STICG while the potential of the barrier gate BG is maintained at the "High" level as shown in FIG. 14B. After the unnecessary charges in the accumulating portion ST are discharged, the potential of the accumulation clear gate STICG is returned to the high level as shown in FIG. 14C. Thereafter, the potential of the barrier gate BG is lowered to a low level and charges are transferred from the photodiode PD to the accumulating portion ST (see FIG. 14C). The transmission of charges requires about 100 μsec as described above, the time being measured in the AF sensor 17. After the transfer of the charges accumulated in the photodiode PD is completed, the potential of the barrier gate BG is again returned to the high level, thus terminating the accumulation completing operation.

Figure 14D:

After the end of the accumulation completing operation, the potential of the accumulating portion ST is set at the high level as shown in FIG. 14D and the generation of the dark current is suppressed, as in the above described ST accumulation mode. This state is maintained for a while and thereafter charges are transferred in parallel from the accumulating portion ST to the shift register SR by the operation of the shift gate SH in response to the data request signal SHM from the AF controller 30. The reading operation of image information is the same as described above.

Figure 8:
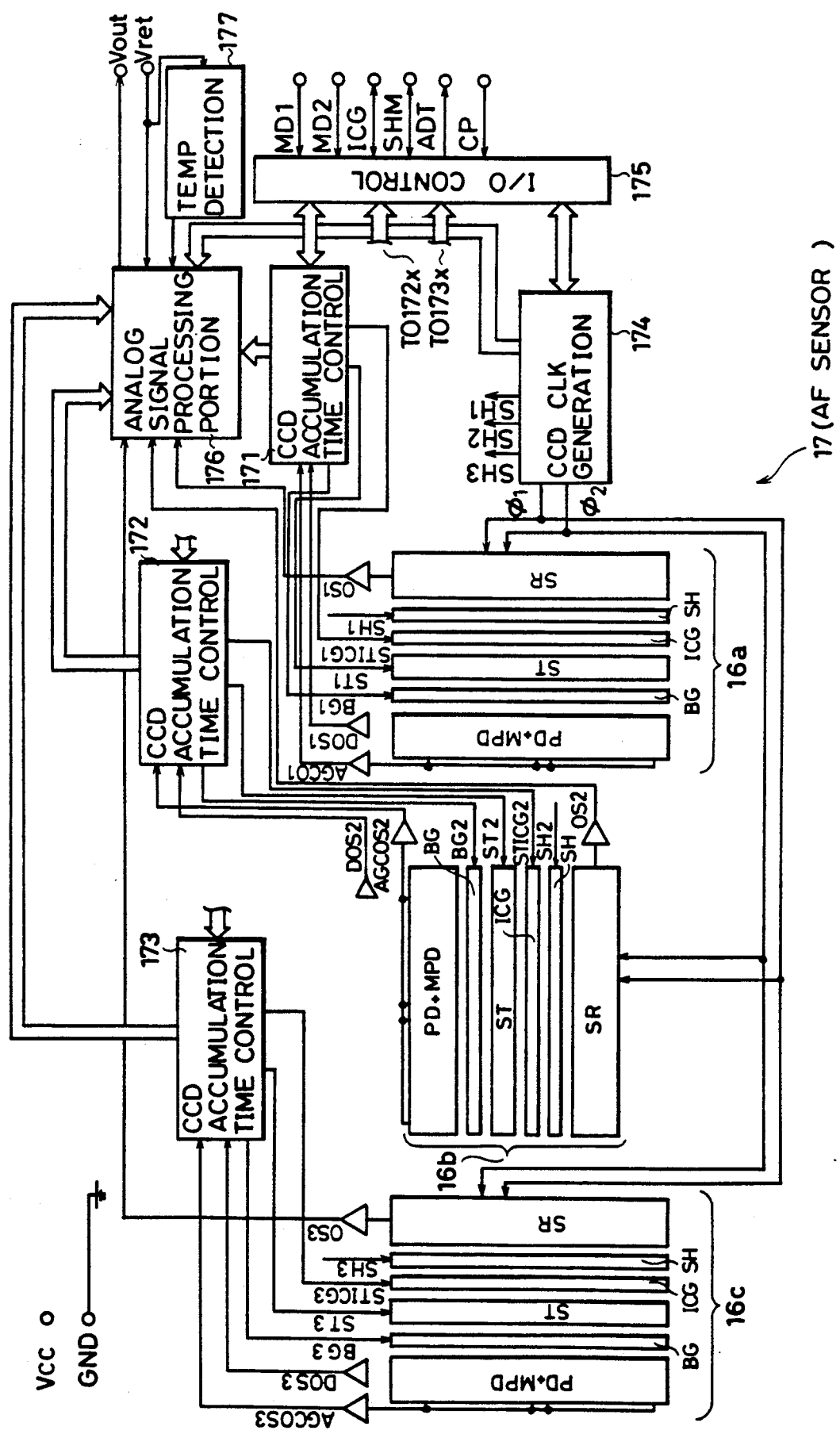
FIG. 8 is a block circuit diagram of the AF sensor incorporating the present invention.

Each unit in the arrangements 16a to 16c of the photoelectric converting elements shown in the block diagram of FIG. 8 has been described. How the arrangements 16a to 16c of the photoelectric converting elements are controlled in the present embodiment will be described in the following. As shown in FIG. 8, CCD accumulating time controlling portions 171 to 173 are provided in correspondence with respective output portions AGCOS1 to AGCOS3 of the monitoring photodiodes MPD1 to MPD3 in the respective arrangements 16a to 16c of the photoelectric converting elements. The barrier gates BG1 to BG3, the accumulating portions ST1 to ST3 and the accumulation clearing gates STICG1 to STICG3 of the respective islands IS1 to IS3 are controlled by these portions. A CCD clock generating portion 174 provided for all the islands outputs transfer clocks $\phi_1$ and $\phi_2$ which are common to the shift registers SR in all islands and outputs shift pulses SH1 to SH3 for controlling the shift gates of the respective islands.

The ST accumulation mode for an object having high brightness will be described in the following with reference to the time chart of FIG. 15A. First, the AF controller 30 set the signal line MD1 to the "Low" level and the signal line MD2 to the "High" level so as to set the high brightness accumulation mode. Thereafter, the ICG signal (accumulation clear gate signal) is applied to the AF sensor 17 to start the accumulation. The ICG signal is supplied to the respective CCD accumulation time controlling portions 171 to 173 through the I/O controlling portion 175 of FIG. 8. The ICG signals are applied as STICG signals (ST accumulation clear gate signal) for a sufficient time period (about 100 μsec) to carry out the above described discharging, from the respective CCD accumulation time controlling portions 171 to 173 to the arrangements 16a to 16c of the photoelectric converting elements. During this time period, a "High" level voltage is applied to the barrier gates BG1 to BG3 of the arrangements 16a to 16c of the photoelectric converting elements of the respective islands, and the charges generated in the photodiodes are all discharged to the overflow drain OD through the barrier gate BG, the accumulating portion ST and the accumulation clear gate STICG. After the lapse of the time period (about 100 μsec), only the STICG signal becomes "Low" level, the potential of the ST accumulation clear gate STICG attains high level, and the accumulation of the charges generated in the photodiode PD is started in the accumulating portion ST. The accumulation of the respective outputs AGCOS1 to AGCOS3 of the monitoring photodiodes MPD1 to MPD3 is also started by the STICG signal.

The details of this operation will be described.

Figure 16:
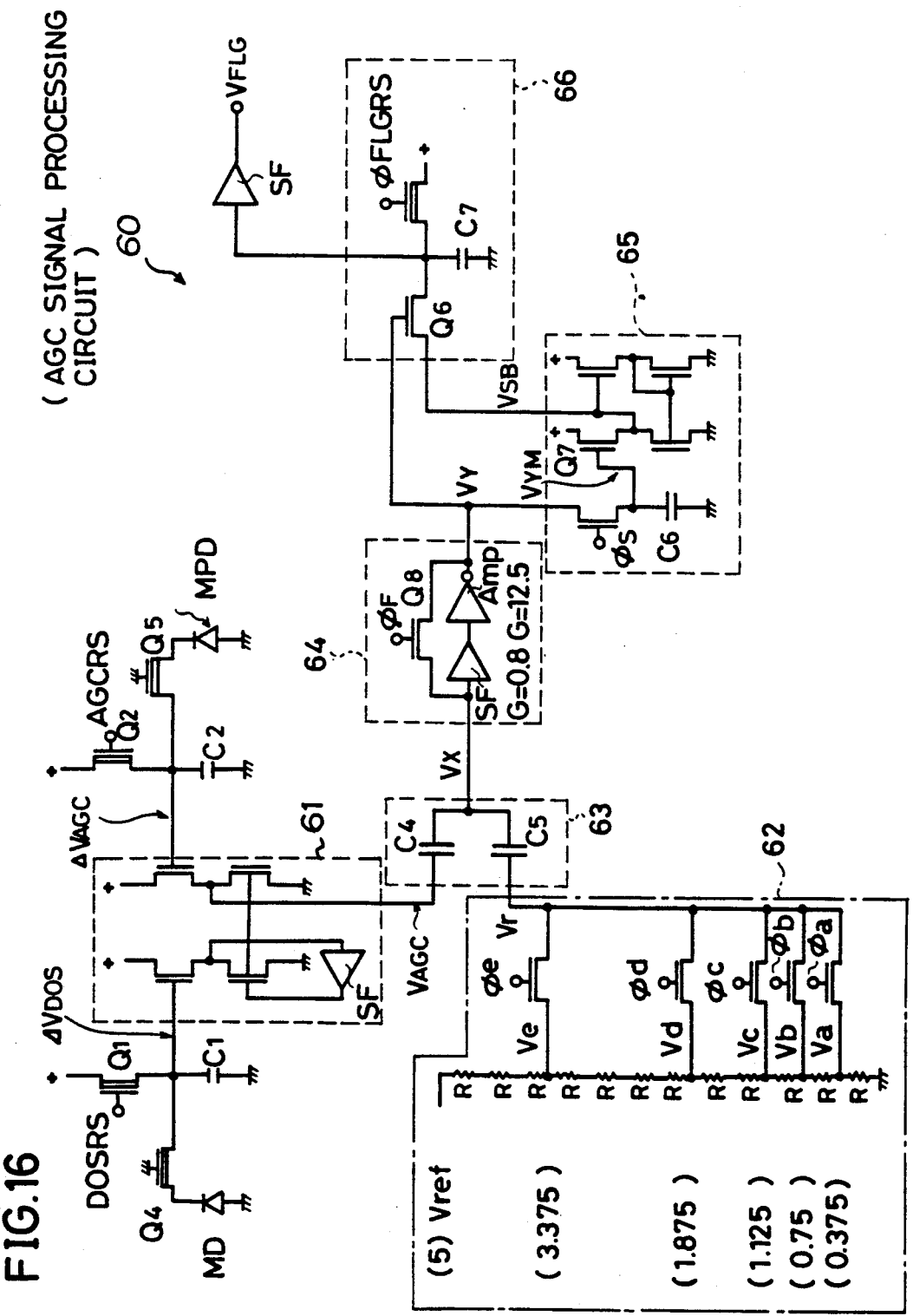
FIG. 16 is a schematic diagram of an AGC signal processing circuit employed in the AF sensor shown in FIG. 7.
Figure 17:
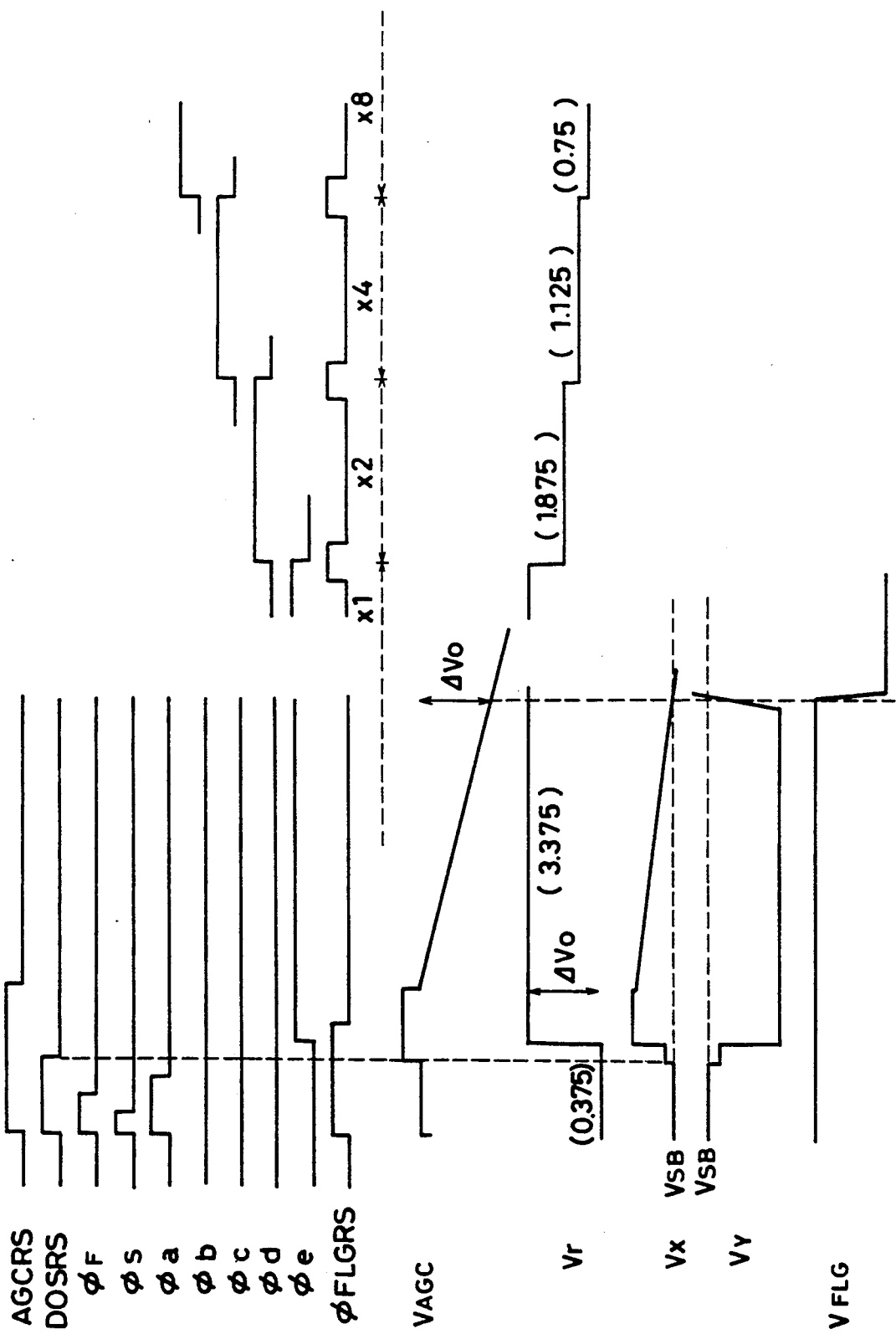
FIG. 17 is a diagram of waveforms showing the operation of the AGC signal processing circuit shown in FIG. 16.

An AGC signal processing circuit 60 is provided for accumulating respective outputs AGCOS1 to AGCOS3 of the monitoring photodiodes MPD1 to MPD3 to provide voltage flag signals $V_{FLG1}$ to $V_{FLG3}$. The AGC signal processing circuit 60 is provided in each of the CCD accumulation time controlling portions 171 to 173. Referring to FIG. 16, when an ICG signal is inputted to the AGC signal processing circuit, the level of the signal DOSRS for initializing the capacitor $C_1$ for obtaining the drift output signal DOS and the level of a signal AGCRS for initializing the capacitor $C_2$ for obtaining the automatic gain control output signal AGCOS are both set to "High", thereby initializing the voltage $\Delta V_{DOS}$ and the voltage $\Delta V_{AGC}$ of the capacitors $C_1$ and $C_2$. At the same time, an operation point setting pulse $\phi_F$ generated in AGC signal processing circuit 60 is applied to a transistor $Q_8$ in an inverting amplifying portion 64 to set the operation point. A capacitor $C_6$ in the reference output holding portion 65 is initialized by an initializing pulse $\phi_S$. The capacitor $C_7$ in a comparing circuit portion 66 is initialized by an initializing pulse $\phi_{FLGRS}$. The voltages $\Delta V_{DOS}$ and $\Delta V_{AGC}$ of the capacitors $C_1$ and $C_2$ are differentially amplified by a differential amplifying portion 61 including a source follower, thereby an automatic gain control voltage $V_{AGC}$ with the drift signal output subtracted therefrom is provided, as $V_{AGC}=0.8\times(\Delta V_{AGC}-\Delta V_{DOS})+V_0$. The reference character $V_0$ is an offset value. Subtraction of the automatic gain control voltage $V_{AGC}$ provided from the differential amplifying portion 61 and the reference voltage Vr provided from the reference voltage generating portion 62 is carried out in a voltage subtracting circuit portion 63 including capacitors $C_4$ and $C_5$ having the same capacitance. The output voltage $V_X$ from the voltage subtracting circuit portion 63 includes a fluctuation component of $0.8\times\{(\Delta V_{AGC}-\Delta V_{DOS})-V_r\}/2$. When we represent the automatic gain controlling output signal as AGCOS, then $\Delta V_{AGC}=\Delta V_{DOS}+V_1-AGCOS$, wherein $V_1$ represents an offset value. Consequently, $V_{AGC}=0.8\times(-AGCOS)+V_2$, where $V_2$ ($=V_0+0.8\times V_1$) also represents an offset value. The output voltage $V_X$ from the voltage subtracting circuit portion 63 includes the fluctuation component of $\{0.8\times(-AGCOS)-Vr)\}/2$, since the reference voltage switching pulse $\phi a$ is at the "High" level and the pulses $\phi b$ to $\phi e$ are at the "Low" level in the initial state, a minimum reference voltage Va=0.375V is being applied as the reference voltage Vr. The voltage $V_Y=(-10)\times V_X$, which is the output voltage $V_X$ of the voltage subtracting circuit portion 62 inverted and amplified by the inverting amplifying portion 64, is the threshold level of inversion of the voltage flag signal $V_{FLG}$. The voltage $V_Y$ is held in the capacitor $C_6$ of the reference output holding portion 65 at the timing of the fall of the initializing pulse $\phi s$ and continuously applied to the gate of the transistor $Q_7$ as a level $V_{YM}$. When the initializing pulse $\phi_F$ falls, the total charges at this time are held in the capacitors $C_4$ and $C_5$ in the voltage subtracting circuit portion 63. Thereafter, one half level fluctuation of the voltage fluctuation in the respective input voltages $V_{AGC}$ and $V_r$ in the voltage subtracting circuit portion 63 become the level fluctuation of the output volta $V_X$. Thereafter, the AF controller 30 sets the pulse $\phi a$ for obtaining the reference voltage Va (=0.375) and the initializing pulse DOSRS at "Low" level, and sets the pulse $\phi e$ for obtaining the reference voltage Ve (=3.375V) at "High" level. In order to start monitoring whether or not a fluctuation of (Ve−Va) is generated in the voltage $V_{AGC}$, the initializing pulse $\phi_{FLGRS}$ is set to the "Low" level and the initializing pulse AGCRS is set to the "Low" level, thereby starting accumulation of the monitor output. The light entering the monitoring photodiode MPD is photoelectrically converted and the generated electric charge gradually lower the voltage $\Delta V_{AGC}$ stored in the capacitor $C_2$ from the initial value $V_{cc}$. The fluctuation from the initial value in the output voltage $V_X$ of the voltage subtracting circuit portion 63 will be $$\{-Va + 0.8 \times AGCOS + Ve\}/2$$

When the value of this expression becomes 0, the output voltage $V_Y$ of the inverting amplifying portion 64 has the same potential as the initial value $V_{YM}$. When $V_Y > V_{SB} \div 0.8 \times V_{YM}$, then the charges stored in the capacitor $C_7$ of the comparing circuit portion 66 leak through the MOS transistor $Q_6$, the voltage flag signal $V_{FLG}$ is inverted and is outputted as a signal indicative of a suitable level for accumulation.

The AGC signal processing circuit 60 is structured as described above. In the AF sensor 17 in the present embodiment, the areas of the photodiodes PD for pixels in respective islands are made constant, so as to make uniform the sensitivity of the respective CCD pixels. By making uniform the total area of the monitoring photodiodes MPD in the respective islands, the sensitivity ratio between the photodiode PD for pixels and the monitoring photodiodes MPD in the respective islands is made uniform. Accordingly, the reference voltage generating portions 62 in AGC signal processing circuit 60 shown in FIG. 16 is made common to the respective islands. Consequently, the power consumption in the voltage dividing resistance group R can be reduced, and the chip area of the AF sensor 17 can be reduced.

The AGC signal processing circuit 60 controls the time for accumulation of the arrangements of the CCD pixels in respective islands and the circuit provides suitable gain to the analog signal processing portion 176 corresponding to monitor signals from respective islands, even when the maximum permissible accumulating time of the system has passed with the accumulation not sufficiently carried out. The determination of the gain is also carried out by the AGC signal processing circuit 60.

When the SHM signal for starting reading of the data is applied from the AF controller 30, the CCD accumulation time controlling portions 171 to 173 force completion of the accumulating operation. Namely, the operations of the barrier gates BG1 to BG3, the accumulating portions ST1 to ST3 and the ST accumulation clear gates STICG1 to STICG3 are started. In the ST accumulation mode, the accumulation completing operation is immediately terminated only by the operation of the barrier gate BG1 to BG3. In the PD accumulation mode, the accumulation completing operation is terminated after a time lapse of about 100 μsec by the operation of the ST accumulation clear gates STICG1 to STICG3 and the barrier gates BG1 to BG3 after the application of the SHM signal. Thereafter, in order to carry out charge transfer from the accumulating portion ST of the second island at first to the shift register SR, the shift pulse SH2 is generated.

The gain in respective island must be stored at this point. In order to realize the storage, the monitoring reference voltages Vr of the respective island are successively switched by using the pulses $\phi e$, $\phi d$, $\phi c$ and $\phi b$ for switching the reference voltage, after the generation of the shift pulse SH2. The inversion of the voltage flag signal $V_{FLG}$ is checked. The gain in reading the photoelectric converted signal in each of the islands is determined in accordance with the time of inversion of the voltage flag signal $V_{FLG}$, and the gain is stored. If the inversion of the voltage flag signal $V_{FLG}$ has been generated with Vr=Ve (3.375 V) or when the inversion of the voltage flag signal $V_{FLG}$ is generated when Vr is switched to Vr=Vd (1.875 V), then the gain of $\times 1$ is stored. When the inversion of the voltage flag signal $V_{FLG}$ is generated when Vr is switched from Vr=Vd to Vr=Vc (1.125 V), then the gain of $\times 2$ is stored. When the inversion of the voltage flag signal $V_{FLG}$ is generated at the time Vr is switched from Vc to Vr=Vb (0.75 V), then the gain of $\times 4$ is stored. If the inversion of voltage flag signal $V_{FLG}$ is not generated even when the Vr is switched as Vr=Vb, then the gain of $\times 8$ is stored. In this manner, the gain is simultaneously determined in the AGC signal processing circuit 60 of each of the first, second and third islands to be stored.

Figure 18:
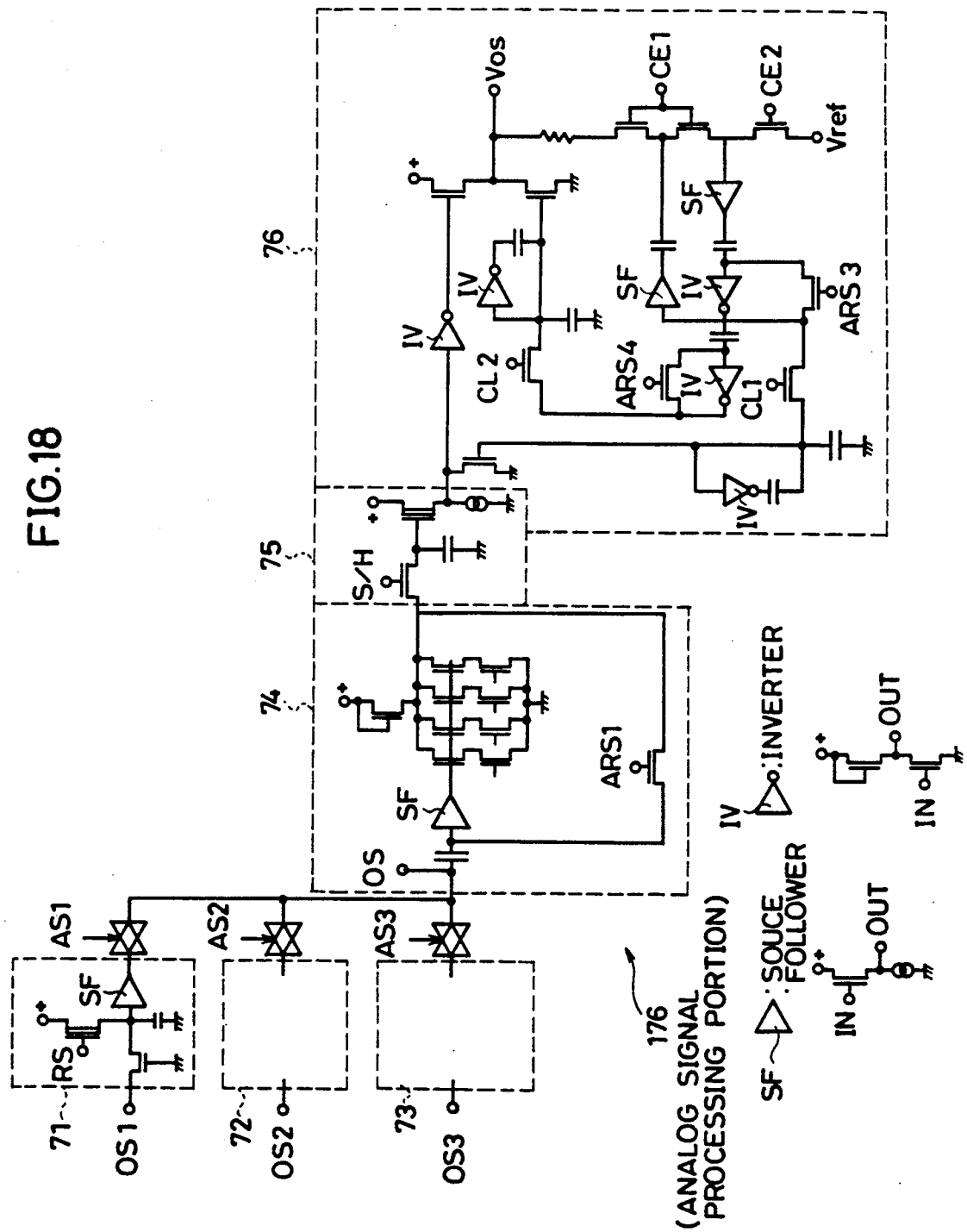
FIG. 18 is a circuit diagram of the analog signal processing portion shown in FIG. 8.
Figure 19:
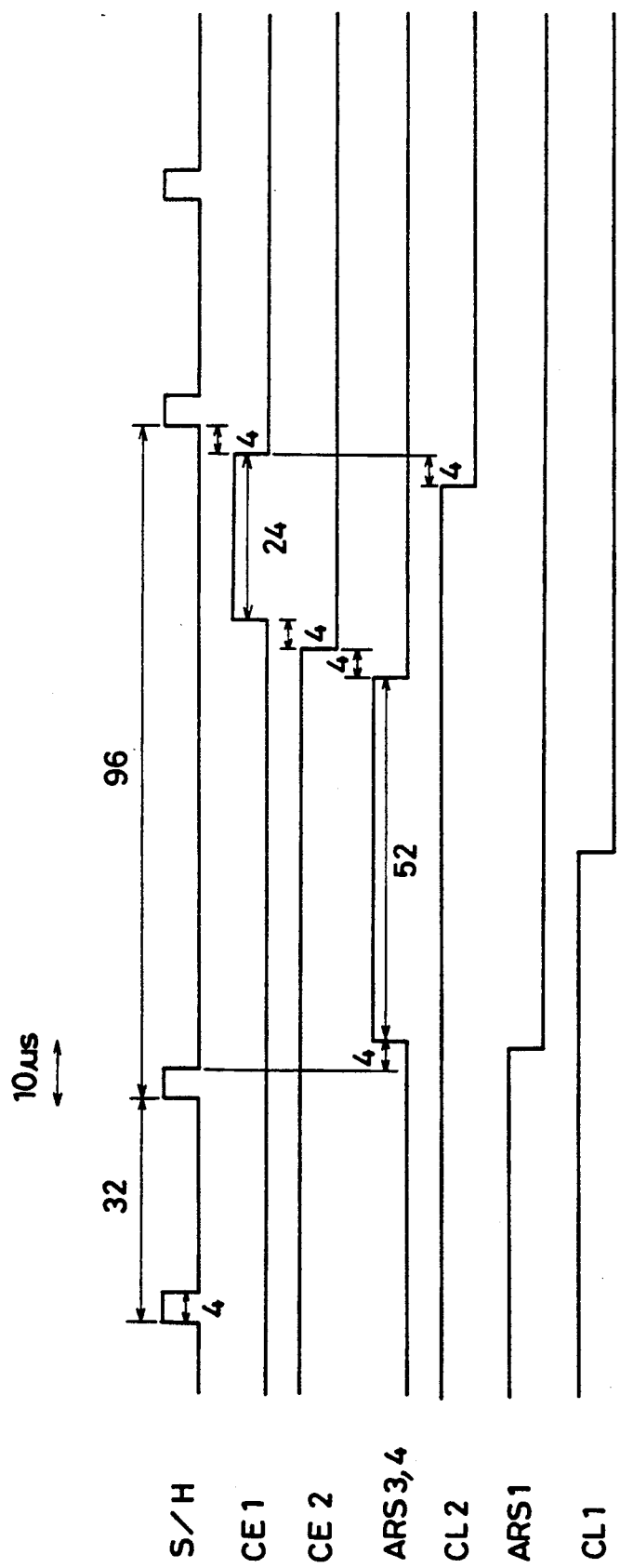
FIGS. 19 and 20 are diagrams of waveforms showing the operation of the analog signal processing portion.

The stored gain is supplied to the AGC amplifier 74 shown in FIG. 18 in the leading pixel data in each of the islands, and the most suitable gain is applied for the output of each of the respective islands. The information in association with the gain of the respective islands is outputted as digital data in synchronization with the ADT signal, immediately after the start of data dump from ICG and SHM signal lines to the AF controller 30.

The above described AGC signal processing circuit 60 is provided in each of the CCD accumulation time controlling portions 171 to 173. Whether or not the respective monitor outputs AGCOS1 to AGCOS3 reach the suitable level is always monitored by the AGC signal processing circuit 60. Every time a prescribed level change is generated in any of the monitor outputs AGCOS1 to AGCOS3 and it is detected in any of the CCD accumulation time controlling portions 171 to 173 that the output reaches the suitable level, the corresponding one of the voltage flag signals $V_{FLG1}$ to $V_{FLG3}$ of the corresponding one of the islands IS1 to IS3 is inverted. In the example of FIG. 15A, the inversion of the voltage flag signal $V_{FLG2}$ is generated first in the second island. At this point, the CCD accumulation time controlling portion 172 inverts barrier gate signal BG2, which has been outputted the "High" level signal from the accumulation clear operation, to the "Low" level, whereby the flow of charges from the photodiode PD to the accumulating portion ST is stopped. Consequently, the accumulation completing operation is carried out. At the same time, the CCD accumulation time controlling portion 172 applies a "Low" level pulse signal to the ADT signal which has been kept at the "High" level from the point of accumulation clearing, thereby informing the AF controller 30 of the completion of accumulation in one island. The AF controller 30 receives the fall of the ADT signal as an interruption signal to carry out an ADT interrupting process (described in detail later with reference to FIG. 23), thereby recognizing completion of accumulation in one island.

In other islands, namely, the first and third islands in the example of FIG. 15A, the barrier gate signals BG1 and BG3 are kept at the "High" level independent from the operation of the second island, to continue accumulation (this operation is only in the ST accumulation mode: in PD accumulation mode, which will be described later, the accumulating operation in all islands are simultaneously stopped). In the example of FIG. 15A, the inversion of the voltage flag signal $V_{FLG1}$ of the first island is generated after the inversion in the second island. In this case also, the "Low" level pulse is outputted to the ADT, the barrier gate signal BG1 is inverted, the path between the photodiode PD and the storing portion ST is cut to carry out the accumulation completing operation, as described with reference to the second island. The AF controller 30 recognizes the completion of accumulation in the second one of the islands by the fall of the ADT signal. When the voltage flag signal $V_{FLG3}$ is inverted before the time lapse of the maximum permissible accumulation time (20 msec in the ST accumulation mode), the ADT signal is held at the "Low" level, the barrier gate signal BG3 is turned to the "Low" level, the path between the photodiode PD and the storing portion ST is cut so as to complete accumulation. The AF controller 30 repeatedly senses the ADT signal at a period slightly longer than the pulse width indicating the first and second completion of accumulation to detect that a "Low" level signal is continuously outputted, and the completion of accumulation in all the islands can be recognized.

At this point of time, amount of charges of the level suitable for the analog signal processing portion 176 in the succeeding stage are prepared and held in the accumulating portions of the arrangements 16a to 16c of the photoelectric converting elements of the respective islands.

Thereafter, the AF controller 30 applies the SHM signal, which serves as a data request signal, to the AF sensor 17. The SHM signal is applied to the respective CCD accumulation time controlling portions 171 to 173 and to the CCD clock generating portion 174 through the I/O controlling portion 175 of FIG. 8. When the accumulating operation has automatically completed by the CCD accumulation time controlling portions 171 to 173 before the SHM signal is supplied in all the islands as shown in the time chart of FIG. 15A, the CCD accumulation time controlling portions 171 to 173 do not operate in response to the SHM signal. The CCD clock generating portion 74 initializes an internal counter by the SHM signal and start counting of the input pulse CP from this point of time. At the same time, the CCD clock generating portion 174 sets the transfer clock $\phi_1$ at the "High" level and the transfer clock $\phi_2$ at the "Low" level and applies, at first, the shift gate pulse SH2. By the application of the shift gate pulse SH2, the charges held in the respective accumulating portions ST2 of the second island are transferred to the shift register SR2 of the second island. After the application of shift gate pulse SH2, the transmission of the transfer clocks $\phi_1$ and $\phi_2$ is started again. In synchronization with the transfer clocks $\phi_1$ and $\phi_2$, the shift register SR2 of the CCD successively transfers the photoelectric charges generated in the photoelectric converting portion in the second island as output signals OS2. The CCD clock generating portion 174 counts the number of transfer clocks of the CCD to transmit the same to the analog signal processing portion 176. In addition, a control signal for level clamping is applied to the analog signal processing portion 176 so that when analog signals are outputted from the CCD dark current outputting pixels, which are the seventh to ninth pixels shown in FIG. 11, the dark current output level is clamped at the A/D conversion reference voltage Vref.

Referring to FIG. 18, the analog signal processing portion 176 comprises buffers 71 to 73 receiving output signals OS1 to OS3 from the arrangements 16a to 16c of the photoelectric converting elements. Any one of the outputs from the buffers 71 to 73 is selected by analog switches AS1 to AS3 corresponding to the output timing to be inputted to an AGC amplifier 74. The output from the AGC amplifier 74 is sampled and held in a sample hold circuit 75, the reference level thereof is clamped at the reference voltage Vref by a level clamp circuit 76 to be outputted as an output signal Vos. The level clamp circuit 76 is supplied with control signals CE1, CE2, ARS3, ARS4, CL1 and CL2 for clamping level from the CCD clock generating portion 174.

Figure 20:
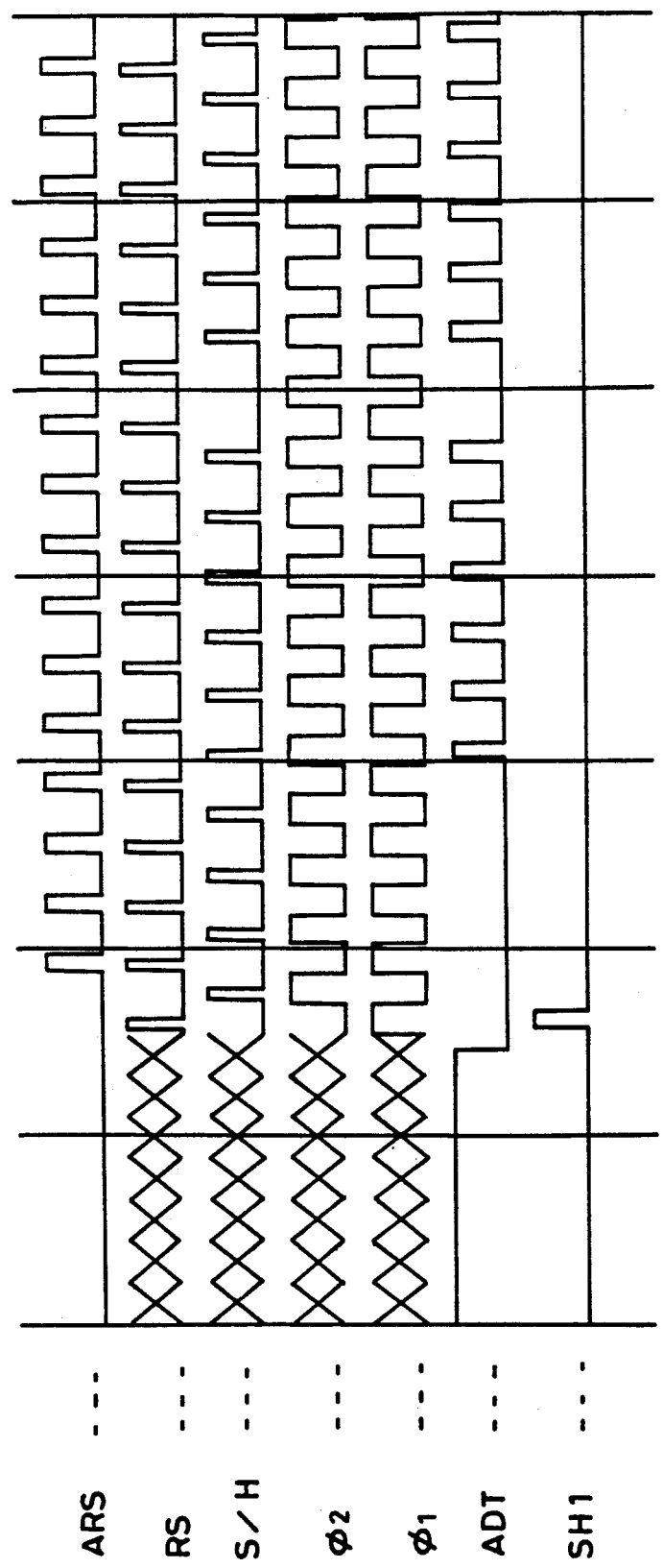

The CCD clock generating portion 174 outputs an ADT signal through the I/O controlling portion 175. The ADT signal is outputted as a signal indicative of the switching between each of the pixels of the CCD data, and the A/D converting portion 31 starts A/D conversion at the fall of the ADT signal. FIG. 20 is a time chart showing the operation of the CCD transfer clocks $\phi_1$ and $\phi_2$ and the operations of respective signals in synchronization therewith. The ADT signal is outputted as a signal in synchronization with the CCD transfer clock only at the time of output of a falling pulse indicative of the time of completion of the accumulation in respective islands, the time of output of digital data employing the ICG and SHM signals line and the time of output of valid pixels, as shown in FIG. 15A. When invalid pixels are outputted, the ADT signal is not outputted, since it is masked by the value of the counter in the CCD clock generating portion 174. Therefore, dump of A/D conversion data can be carried out without determining whether it is a valid pixel or invalid pixel, on the side of the AF controller 30.

In this manner, the image signals which are photoelectrically converted in the second island are outputted as the output signals Vos first from the basic part and then from the reference part. The level of the image signal output is corrected by the dark current to be clamped as the reference voltage Vref generated during the accumulation of the second island. Thereafter, the image signals which are photoelectrically converted in the first island must be read out. For this purpose, an SH1 signal generated when the clock $\phi_1$ at the time of output of the 48th pixel data of the reference part in the second island is at the "high" level. The timing is also derived from the value of the counter in the CCD clock generating portion 174. The SH1 signal is generated at this point of time in order to reduce output time corresponding to the shift registers including no photodiode for pixel at the beginning of the CCD output, as shown in FIG. 11. After the generation of the SH1 signal, when the output of the 52nd pixel data in the reference part of the second island is completed, the CCD clock generating portion 174 switches the AS2 signal for controlling opening/closing of an analog switch AS2 in the analog signal processing portion 176 from "High" level to the "Low" level and the AS1 signal from the "Low" level to the "High" level. Consequently, data of the first island are applied to the analog signal processing portion 176. Thereafter, as in the data output of the second island, sample holding of the dark current is carried out, and thereafter the dark current level generated during the accumulation of the first island is outputted from the analog signal line Vout as the output clamped as the A/D conversion reference voltage Vref, first from the basic part and then from the reference part. Thereafter, the same process as in the output switching from the second to first island is carried out in order to carry out output switching from the first island to the third island, and the data output of the third island is carried out. Thus the data output is completed and then next accumulation is started.

In the analog signal processing portion 176 shown in FIG. 18, the output signal Vos is unstable during the accumulation and during the clamping operation of the dark current level. Therefore, it is not suitable as a signal to be externally applied. Therefore, the CCD clock generating portion 174 controls such that temperature data $V_{TEMP}$ provided by dividing A/D conversion reference voltage Vref by resistances having different temperature coefficients are used as output signals Vout during these periods. The temperature data $V_{TEMP}$ are applied from the temperature detecting portion 177 shown in FIG. 8 to the analog signal processing portion 176.

In the PD accumulation mode for an object having low brightness, longer time is required for accumulation as the brightness is low, so that the speed of the whole system is given priority. As shown in FIG. 15B, after the time lapse of the maximum accumulation time (100 msec), or when the first ADT signal is inputted from the AF sensor 17 to the AF controller 30, the SHM signal is applied from AF controller 30 to the AF sensor 17, whereby the accumulating operation in the all islands IS1 to IS3 are simultaneously completed. Except this point, the operations in the PD accumulation mode for an object having low brightness are approximately the same as those in the above described ST accumulation mode. Therefore, description of those operations is not repeated. Thus, the description of the operations in the ST accumulation mode and the PD accumulation mode have been described.

Now, the voltage flag signals $V_{FLG1}$ to $V_{FLG3}$ of the respective islands in the AGC signal processing circuit 60 are outputted as falls of the ADT signal, enabling recognition of the timing of the accumulation completion in the AF controller 30. However, the AF controller 30 can only recognize by the ADT signal that the accumulation completing operation is carried out in any of the island, and it can not determine in which island the accumulation completing operation is carried out from the ADT signal. In order to determine the island in which accumulation is completed, the order of completion of accumulation in respective islands is recognized by the AF controller 30 by employing digital data at the time of data dump. By doing so, the AF controller 30 recognizes the timing of accumulation completion in respective islands and the order of completion, and therefore correction of the lens driving amount during the accumulation time period and during focus detecting operation can be carried out based on the information. More specifically, when the lens is moved for automatic focus adjustments, there is a time difference between the time of accumulation of the AF sensor 17 and the time when the lens driving amount is calculated based on the focus detecting operation in accordance with the valid pixel output from the AF sensor 17, and the amount of movement of the lens during this time difference must be corrected. In the ST accumulation mode in which the time of completion of accumulation is different in respective island, the amount of correction of the amount of lens movement is different in each island.

The focus detecting operation during the lens drive will be described in the following with reference to the time chart of FIG. 21. Now, when the lens is driven at a constant speed, images which are moved as time passes in accordance with the driving of the lens are projected on the AF sensor 17. As for the distance between images, the distance between moving images is calculated. However, the distance between images matches with the distance between images provided at the central point of the accumulation time period of the AF sensor 17 so long as the brightness of the object is the same. Now, assuming that the accumulation is started from the time point $t_0$, the accumulation in the first island is completed at the time $t_1$, the accumulation in the third island is completed at the time $t_2$ and the accumulation in the second island is completed at the time $t_3$ respectively, then the result of focus detecting operation calculated at $t_4$ is provided as the amount of defocus $df_1$ to $df_3$ based on the distances between images at different time points in the respective islands.

More specifically, the amount of defocus $df_1$ to $df_3$ are calculated in the respective islands based on the distance between images at the time $I1=(t_0+t_1)/2$ in the first island, the time $I2=(t_0+t_3)/2$ in the second island and at the time $I3=(t_0+t_2)/2$ in the third island. By converting the amounts $df_1$ to $df_3$ into the number of driving pulses, the numbers N1 to N3 are provided. However, the number of pulses N1 to N3 calculated here are the number of driving pulses needed from the different centers of accumulation (namely, the time I1 to I3 at the center of each of the accumulation periods) of the respective island. Therefore, these numbers must be converted into the number of remaining driving pulses R1 to R3 at the time $t_4$ at which the focus detecting operation is completed. Therefore, pulse count numbers indicative of the amount of the lens drive at the respective time $t_0$, $t_1$, $t_2$ and $t_3$ must be stored in counter registers CT1 to CT4. The pulse count values indicative of the amount of lens drive at respective points are represented by P ($t_0$), P ($t_1$), P ($t_2$) and P ($t_3$) and the pulse count value indicative of the lens driving amount at present is represented as P ($t_4$). The remaining numbers of driving pulses R1 to R3 in the respective islands IS1 to IS3 will be provided by subtracting the pulse count values of the lens drive from respective centers I1 to I3 to the time $t_4$ of completion of the focus detecting operation from the numbers of driving pulses N1 to N3 calculated by the focus detecting operation, as shown by the following equations.

$$R1 = N1 + P(t_4) - \{P(t_0) + P(t_1)\}/2$$

$$R2 = N2 + P(t_4) - \{P(t_0) + P(t_3)\}/2$$

$$R3 = N3 + P(t_4) - \{P(t_0) + P(t_2)\}/2$$

By this subtraction, the amount of defocus of respective islands IS1 to IS3 viewed from the same point (converted into the pulse count numbers R1 to R3) can be calculated, and it is determined at this time which of the defocus amounts of the respective islands IS1 to IS3 should be used for driving the lens.

Figure 21:
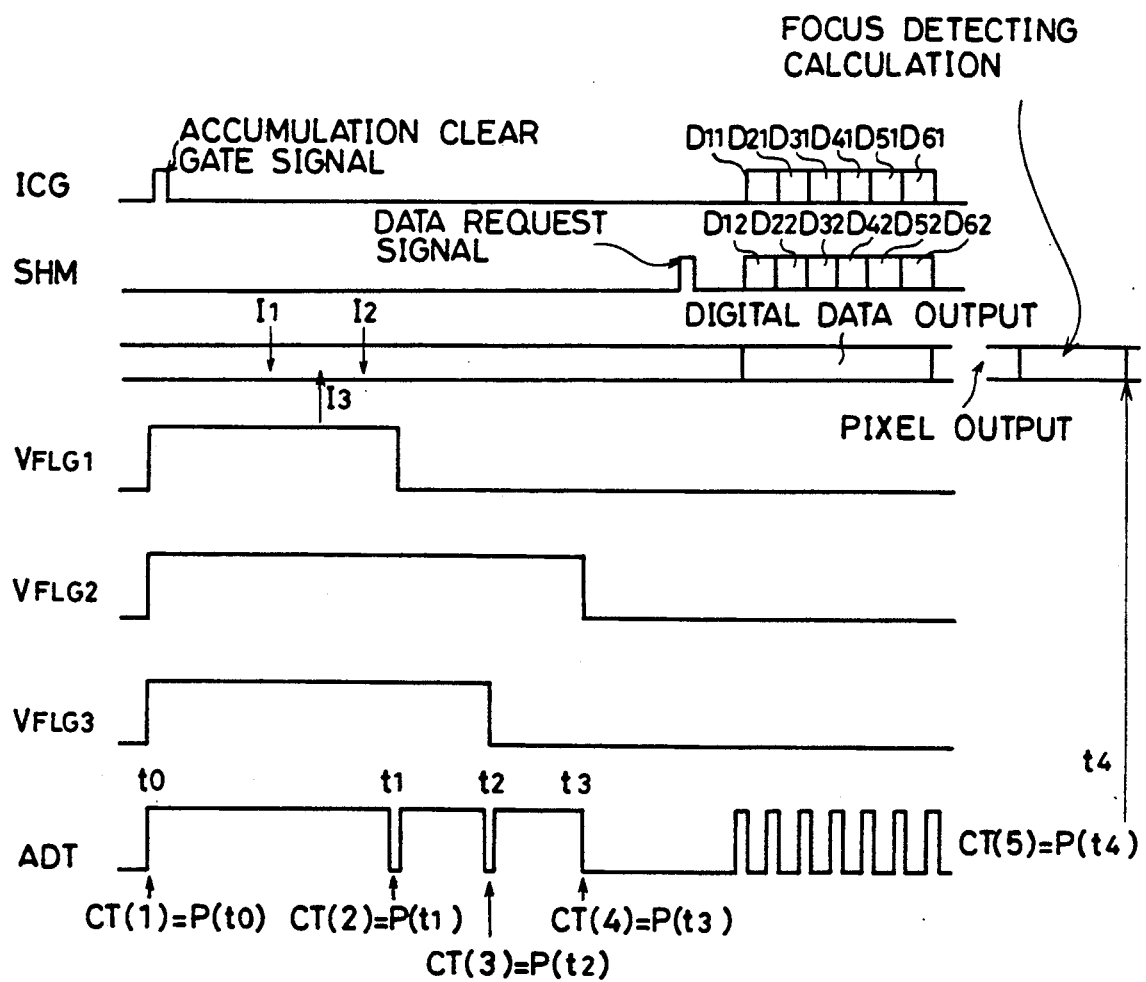
FIG. 21 is a diagram of waveforms for illustrating transmission of signals between the AF sensor and the AF controller.

In the time chart of FIG. 21, changes in the ICG signal and the SHM signal transmitted between the AF sensor 17 and the AF controller 30 and in the voltage flag signals $V_{FLG1}$ to $V_{FLG3}$ in the AF sensor 17 are shown.

The accumulation completed signals of respective islands are, as timings, recognized by the AF controller 30 as the points of fall of ADT signal. The AF controller further detects the change to the "Low" level of the ADT signal for three times, and thereafter it detects that the ADT signal is maintained at "Low" level, to recognize the completion of accumulation in all of the islands. At this time, the voltage flag signals $V_{FLG1}$ to $V_{FLG3}$ are all inverted, and the order of completion of the accumulation are stored in six D flip flops FF12, FF13, FF21, FF23, FF31 and FF32 provided in the I/O controlling portion 175. In the example shown in FIG. 21, the voltage flag signal $V_{FLG1}$ is inverted from "High" level to the "Low" level at the time $t_1$, when the clock inputs CK of the D flip flops FF21 and FF31 rise from "Low" level to the "High" level, whereby the "high" level signals of the voltage flag signals $V_{FLG2}$ and $V_{FLG3}$ applied to the data inputs D are latched at respective outputs Q. Consequently, the D flip flops FF21 and FF33 store that the time of completion of the accumulation in the first island is earlier than the time of completion of the accumulation in the second and third island. Thereafter, at the time $t_2$, the voltage flag signal $V_{FLG3}$ is inverted from "High" level to the "Low" level, when the clock inputs CK of the D flip flops FF13 and FF23 rise from "Low" level to the "High" level, whereby the "Low" level signal of the voltage flag signal $V_{FLG1}$ applied to the data input D and the "High" level signal of the voltage flag signal are latched at respective outputs Q. Consequently, the D flip flops FF13 and FF23 store that the time of completion of the accumulation in the third island is later than the time of completion of accumulation in the first island but earlier than the time of completion of accumulation in the second island. Thereafter, the voltage flag signal $V_{FLG2}$ is inverted from the "High" level to the "Low" level at the time $t_3$, when the clock inputs CK of D flip flops FF12 and FF32 rise from "Low" level to the "High" level and the "Low" level signals of the voltage flag signals $V_{FLG1}$ and $V_{FLG3}$ applied to the data input D are latched at the output Q. Consequently, the D flip flops FF12 and FF32 store that the time of completion of accumulation in the second island is later than the time points of completion of the accumulation in the first and third islands.

The outputs Q of 6 flip flops are transmitted as digital data together with the information in association with the gain in respective islands immediately after the start of data dump from the AF sensor 17 to the AF controller 30 through the signal lines ICG and SHM.

Figure 23A:
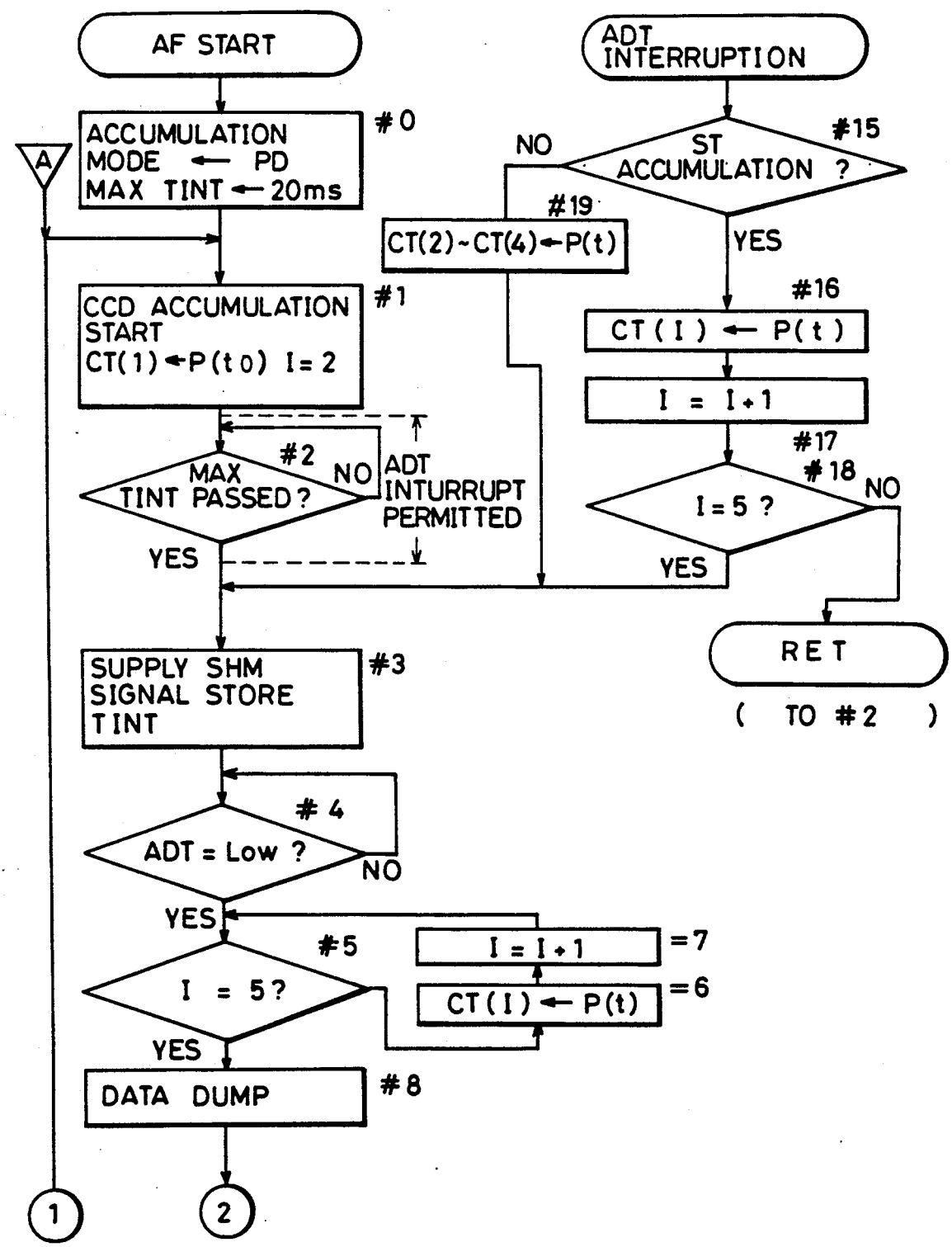
FIGS. 23A and 23B comprise a flow chart showing the main operation of the AF controller.
Figure 23B:
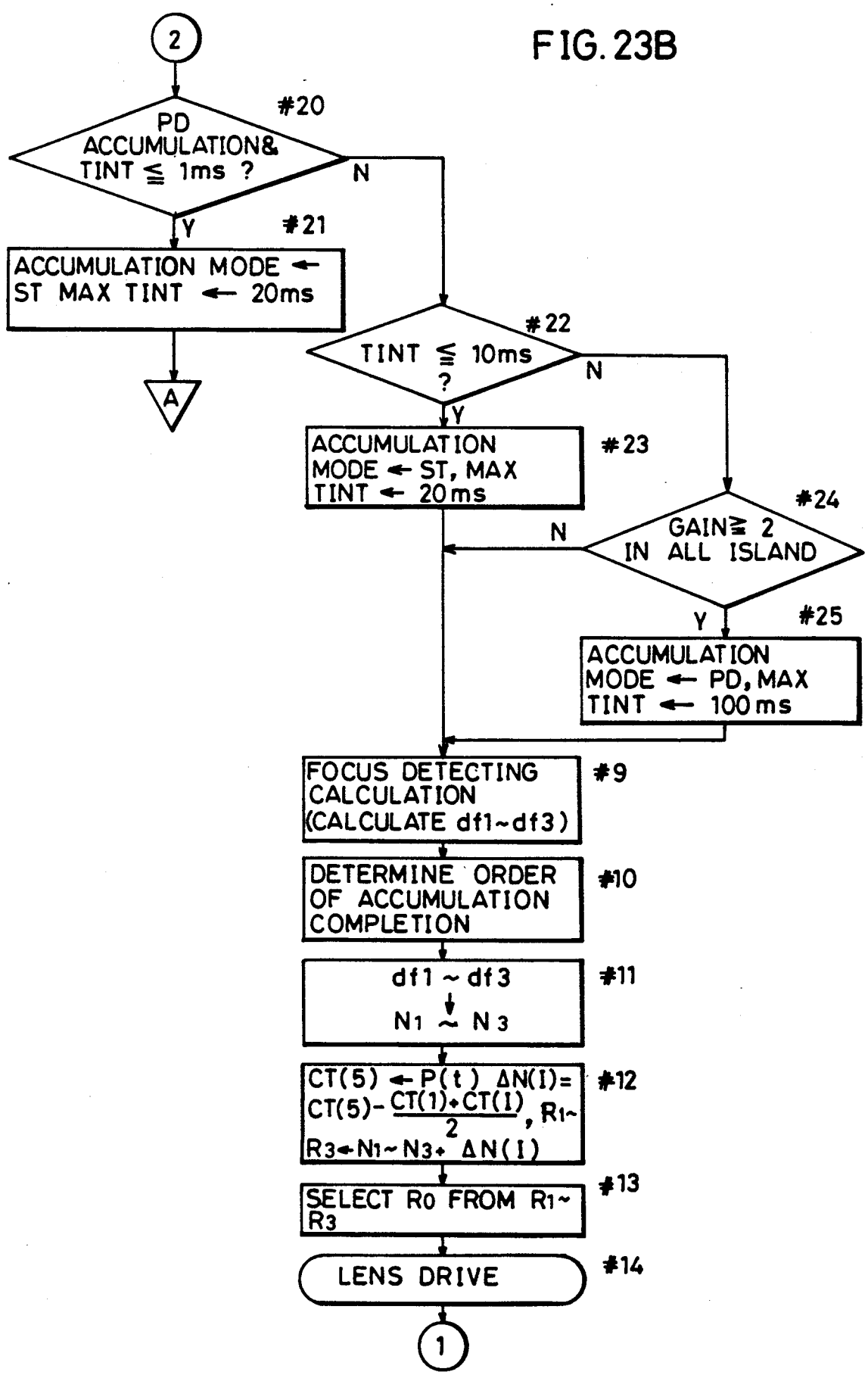

A flow chart for carrying out the correction of the lens moving amount will be described in the following with reference to FIG. 23. When the focus detection is started for the first time, the lens is not driven. Since the values stored in respective counter registers CT (i) are the same, correction of the lens moving amount is not carried out. The number of driving pulses N1 to N3 are calculated in accordance with the amount of defocus $df_1$ to $df_3$, which are directly set in the pulse counters for driving the lens, and the driving of the lens is started. Thereafter, accumulation of the AF sensor 17 for the second time is started. FIG. 23 shows the operation following the start of AF operation during lens driving of the second accumulation of the AF sensor 17. The value of pulse count in the pulse counter for driving the lens is decremented one by one every time a pulse is provided corresponding to a unit lens driving amount. The AF controller 30 stores the pulse count value P ($t_0$) in the first counter register CT (1) at the time $t_0$ of the start of accumulation in the AF sensor 17, and thereafter interruption by the ADT signal for recognizing the completion of accumulation is permitted. Whether or not the maximum accumulation time period has lapsed, which period is 20 msec in the ST accumulation mode and 100 msec in the PD accumulation mode is continuously checked (#1, #2). If it is in the ST accumulation mode with the brightness of the object being high, the accumulation is automatically completed in respective islands and the charges are accumulated in the accumulating portion ST. Every time the charges are accumulated in the accumulating portion ST, the ADT signal attains the "Low" level, and an interruption routine is called by the ADT signal. In the ADT interruption routine, whether the operation is in the ST accumulation mode or in the PD accumulation mode is determined at first (#15). The reason for this is that the charges are stored in different accumulation time in the ST accumulation mode in accordance with the monitor outputs AGCOS1 to AGCOS3 of the arrangements 16a to 16c of the photoelectric converting element, namely, ADT signal falls at the timings at which the accumulation is completed in each of the three islands IS1 to IS3 at which ADT signal interruption routine is called. On the other hand, in the PD accumulation mode, the charges are accumulated in the same accumulation time in accordance with the fall of ADT signal from the brightest island ISn. Therefore, the interruption routine of the ADT signal is called only once.

The switching between the accumulation mode is shown in the steps #20 to #25 of FIG. 23. The reference character TINT represents the accumulation time. When the AF operation is started, the arrangements of the photoelectric converting elements are initialized, and the PD accumulation mode is set in which the maximum accumulation time is 20 msec. If the accumulation is completed within 1 msec, it means that the amount of charges accumulated in the accumulating operation after the inversion of the voltage flag signal $V_{FLG}$ of the PD accumulation is too much, so that the accumulation mode is set in the ST accumulation mode and accumulation is again carried out (#20, 21). If the accumulation time is no more than 10 msec, then the accumulation mode is set to the ST accumulation mode thereafter, and the program proceeds to the focus detecting operation (#22, #23). If the gain information of all the islands is no less than twice, then the maximum accumulation time is changed to 100 msec with the PD accumulation mode maintained as it is, and the program proceeds to the focus detecting operation (#24, #25). If none of these conditions is satisfied, the program proceeds to the focus detecting operation with accumulation mode maintained as it is.

The switching of the accumulation mode is carried out every time the accumulation in the photoelectric converting elements is completed. Once the mode is set to the ST accumulation mode, namely, when the time of accumulation becomes no longer than 10 msec, then the time of accumulation in the all islands become 20 msec, and the ST accumulation mode is continued until the gain becomes no less than twice. Once the PD accumulation mode is set, namely, if the gain becomes no less than twice at the accumulation time being 20 msec in each of the islands, then the PD accumulation mode is continued until the accumulation time in any of the islands becomes 100 msec.

As described above, when the specified accumulation mode is started, hysterisis is provided in switching condition so that the selected accumulation mode is continued. Consequently, stable data in the same accumulation mode can be provided.

In the ST accumulation mode, the remaining driving pulse numbers P ($t_1$) and P ($t_2$) at the times $t_1$ and $t_2$ of generation of the first and second ADT interruptions are respectively stored in the second counter register CT (2) and the third counter register CT (3) (#16). After the number I of the counter register is incremented by 1, the flow returns to the step #2 to check the lapse of the maximum accumulation time (#17, #18). If the third ADT interruption is generated and the accumulation is completed in all the islands, the remaining driving pulse number P ($t_3$) at that time is stored in the fourth counter register CT (4) and the SHM signal is applied (#3) to start data dump.

Meanwhile, in the PD accumulation mode, the accumulation completing operation for all the islands is carried out when the first ADT interruption is generated. Therefore, when the ADT signal interruption is generated, the pulse count value P (t) at the time t of generation of the ADT interruption is stored in the second, third and fourth counter registers CT (2) to CT (4) (#19). Thereafter, the SHM signal for data dump is applied (#3). Meanwhile, if the accumulation is not completed in any of the islands after the time lapse of the maximum accumulation time in #2, then the SHM signal for data dump is applied in #3, and it is recognized in #4 that the ADT signal is at the "Low" level. In the steps #5 to #7, the number of pulse count at that time period is stored in any of the second to fourth counter registers CT (2) to CT (4) in which storing has not yet been carried out, and the program proceeds to the data dump (#8).

The AF sensor 17 outputs AGC data from the signal lines ICG and SHM and the digital data indicative of the order of completion of the accumulation in respective islands in synchronization with the ADT signal, and the AF controller 30 receives the digital data. Thereafter, analog signal outputs from the arrangements 16a to 16c of the photoelectric converting elements are outputted from the analog signal line Vout of the AF sensor 17. The AF controller 30 carries out A/D conversion on the analog signal output in synchronization with the ADT signal to receive the same successively (#8). All the outputs from the AF sensor 17 are A/D converted, and when the data input is completed, the focus detecting operation is carried out in each of the islands in accordance with the output from the arrangements 16a to 16c of the photoelectric converting elements. The amounts of defocus df1 to df3 are calculated for respective island (#9). Thereafter, order of completion of accumulation in respective islands is determined based on the digital data from AF sensor 17 in order to correct the movement during driving of the lens for the calculated defocus amounts df1 to df3 of the respective islands (#10). The defocus amounts df1 to df3 calculated for respective islands are converted into the number of driving pulses N1 to N3 by using the lens data (conversion coefficient $K_L$). Thereafter, the number of driving pulses from the centers I1 to I3 of accumulation of respective islands to the end of the focus detecting operation is calculated. Namely, one counter CT (I) out of the second to fourth counters CT (2) to CT (4) is selected in accordance with the order of completion of accumulation in the respective islands, and the amount of correction for the lens movement ΔN (I)=CT (5)−{CT (1)+CT (I)}/2 is calculated. The sign of this amount ΔN(I) is negative. In the example of FIG. 21, the respective amounts ΔN(I) of correction of the lens movement for the numbers of driving pulses N1, N2 and N3 corresponding to the first, second and third islands are ΔN(2), ΔN(4) and ΔN(3). The amounts ΔN(I) of correction of the lens movement are respectively applied to the number of driving pulses N1 to N3 of the respective islands to provide the remaining number of driving pulses R1 to R3 of the respective islands (#12). The number of driving pulses R0 for the next lens driving operation is selected from these numbers R1 to R3 of the remaining driving pulses (#13). The lens is driven (#14) in accordance with the number R0 of the driving pulses and thereafter the next CCD accumulation (#1) is started.

Figure 24:
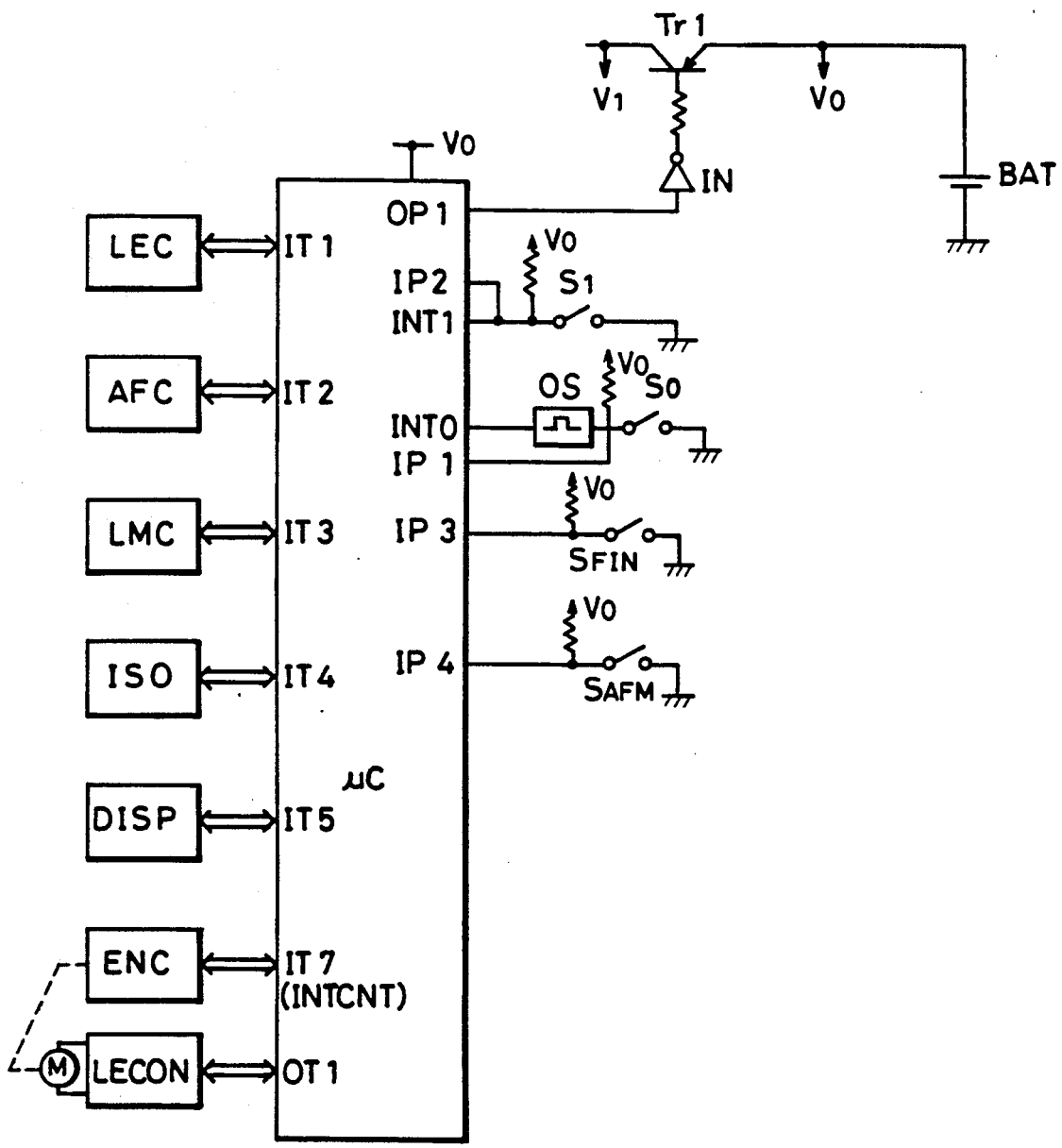
FIG. 24 is a block diagram of a control circuit in accordance with a second embodiment of the present invention.

A second embodiment of the present invention will be described in the following. FIG. 24 is a circuit block diagram showing control of a camera as a whole in accordance with another embodiment of the present invention. Referring to FIG. 24, the control portion of the camera to which the present invention is applied comprises: a microcomputer μc for carrying out sequential operation of the camera and the operations for exposure and focus detection; a lens circuit LEC for transmitting information peculiar to an interchangeable lens attached to the camera body to the camera; an AF controller AFC for controlling an AF sensor 17 to obtain data in association with the focus detection; a brightness detecting circuit LMC for measuring light passing through a lens to detect brightness of an object and for outputting digital signals Bvo in the APEX system corresponding to the brightness of the object to the microcomputer μC; a film sensitivity reading circuit ISO for outputting digital signals $S_v$ in the APEX system corresponding to the film sensitivity to the microcomputer μC; a display circuit DISP for displaying information of exposure and the focusing state of the lens; an encoder ENC for detecting amount of rotation of a motor M for outputting pulses (pulses outputted in correspondence with a prescribed amount of rotation of the motor M) to a lens controlling circuit LECON, which will be described later; and the lens controlling circuit LECON receiving a signal indicative of the direction of the motor drive and a control signal for stopping the motor from the microcomputer μC for driving the motor M in accordance with these signals. The microcomputer μC comprises a counter to see how far the lens is moved from the infinite photographing position. The operation of counting up or counting down the pulses from the encoder ENC is carried out in accordance with an internal instruction. If the lens is moved rearward to the ∞ position when the lens is moved rearward with a main switch S0, which will be described later, being ON, then the above mentioned counter is reset in accordance with an internal instruction.

A power supply battery BAT directly supplies power to the microcomputer μC and to various switches which will be described later. A power supply transistor Tr1 supplies power to all circuits except the microcomputer μC. A one shot circuit OS generates pulse in association with the ON/OFF of the switch S0. The microcomputer μC receives this pulse to carry out a flow of INT0 interruption, which will be described later. A switch $S_{FIN}$ is turned ON when the lens is moved rearward to the infinite photographing position or when the lens is moved forward to the closest photographing position. The fact that the lens is positioned at the infinite photographing position or at the closest photographing position can be detected by checking that no pulse is inputted from the encoder ENC for more than a prescribed time period during the rearward movement of the lens, and in that case the switch $S_{FIN}$ in unnecessary. The switch $S_{AFM}$ is a switch for selecting either an automatic focusing mode (AF mode) or a focus aid manual focusing mode (FA mode). When the switch $S_{AFM}$ is turned ON, the FA mode is selected, and if the switch is OFF, the AF mode is selected. In the automatic focusing mode, the lens is driven in accordance with the result of focus detection. In the focus aid mode, the result of focusing condition such as an in-focus or out-of-focus only is displayed, and the lens is not automatically driven.

Figure 31:
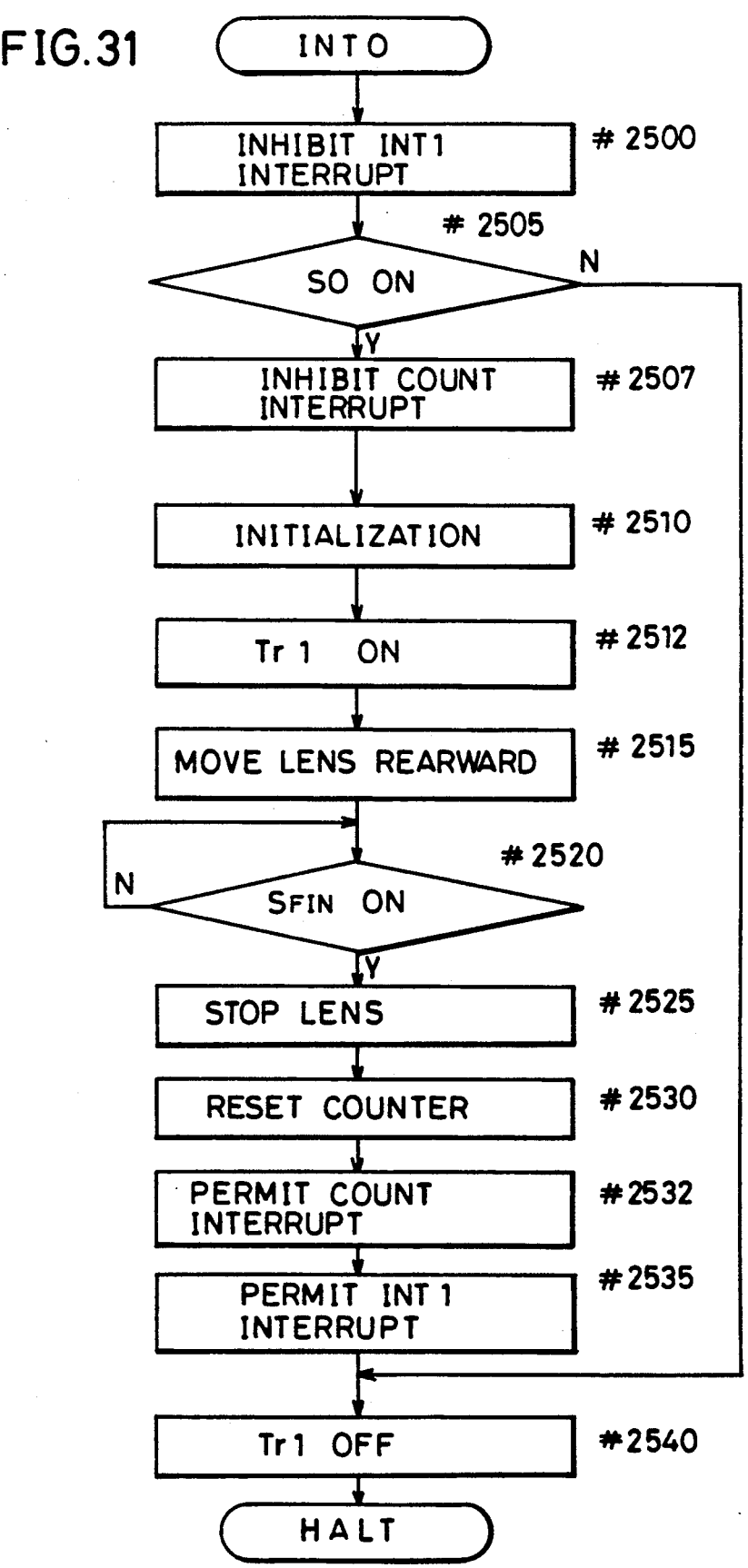

The operation of a camera in accordance with the second embodiment of the present invention will be described in the following with reference to a flow chart of the microcomputer μC. First, when the main switch So is turned ON, pulse is outputted from the one shot circuit OS to an interruption input terminal INT0, so that the microcomputer μC starts the flow of the INT0 interruption shown in FIG. 31. The microcomputer μC inhibits an interruption INT1 caused by turning ON of a preparatory switch S1, and determines whether the interruption is caused by the turning ON of the main switch SO or by the turning OFF of the switch SO based on the level of a terminal IP1 (#2500, #2505). If the terminal IP1 is at the "High" level, it is determined that the interruption is caused by turning OFF of the switch SO. In order to stop operations of all circuits, a terminal OP1 is set to the "Low" level, the output of an inverter IN is set to the "High" level, the power supply transistor Tr1 is turned OFF, and the program proceeds to the HALT condition (operation stop condition) (#2540). If the terminal IP 1 is at the "Low" level, then it is determined that the interruption is caused by turning ON of the switch SO. The counter interruption is inhibited, flags and outputs terminals are initialized, the terminal OP1 is set to the "High" level and the power supply transistor Tr1 is turned ON (#2510, #2512). Thereafter, a driving signal to move rearward the lens is outputted to the lens controlling circuit LECON, so as to control the rearward movement of the lens (#2515). The lens is driven to be moved rearward to the infinite photographing position, and if the switch $S_{FIN}$ is turned ON indicating that the lens has reached the infinite photographing position, then a lens stop signal is outputted (#2520, #2525). Accordingly, a counter indicative of the amount of forward movement from the infinite photographing position is reset, and the counter interruption is permitted (#2530, #2532). The interruption by the turning ON of the preparatory switch S1 is permitted, the terminal OP1 is set to the "Low" level to turn OFF of the power supply transistor Tr1, and the program proceeds to the HALT condition (#2535 to #2540).

The preparatory switch S1 is turned ON by the operation of a shutter release button (not shown). When this switch S1 is turned ON, then a signal which changes from the "High" level to the "Low" level is inputted to the interruption terminal INT1, and when the microcomputer μC detects this signal, the INT1 interruption shown in FIG. 25 is carried out.

The microcomputer μC initializes flags, output terminals and so on and an internal hard timer is reset and started (#31, #33). A flag AFSF indicative of the first focus adjusting operation is set, and the terminal OP1 is set to the "High" level to turn ON the transistor Tr1 (#35, #37). Thereafter, lens data (focal length data, full open aperture value, coefficient for converting the amount of defocus to the number of pulses for driving the lens and so on) are inputted from the lens circuit LEC (#39). Accumulation is carried out by the focus detection data outputting circuit AFC, and the data are inputted from the focus detection data outputting circuit AFC after the end of accumulation, which data are stored as every fourth difference data (#41, #43). Thereafter, the amounts of defocus in respective islands are calculated, exposure operation is carried out and the state of focusing and exposure information are displayed (#45, #47, #49).

Thereafter, whether it is in the AF mode or FA mode is determined. If is determined that the FA mode is selected, then the lens is not driven, and whether the switch S1 is ON or not is determined. Meanwhile, if it is determined that the operation is in the AF mode, the amount of defocus for driving the lens is calculated in accordance with the amounts of defocus in respective islands, and the lens is driven in accordance with the calculated amount (#51). Whether the switch S1 is ON or not is determined by checking whether or not a terminal IP2 is at the "Low" level. If the terminal IP2 is at the "Low" level, then it is determined that the switch S1 is ON, so that the flag AFSF indicative of the first adjusting operation is reset and the program returns to the step #39 to repeat the flow starting from the step #39 (#53, #54). If the terminal IP2 is at the "High" level, then it is determined that the switch S1 is OFF, so that the terminal OP1 is set to the "Low" level and the operation of the microcomputer μC is stopped (#55).

Figure 25:
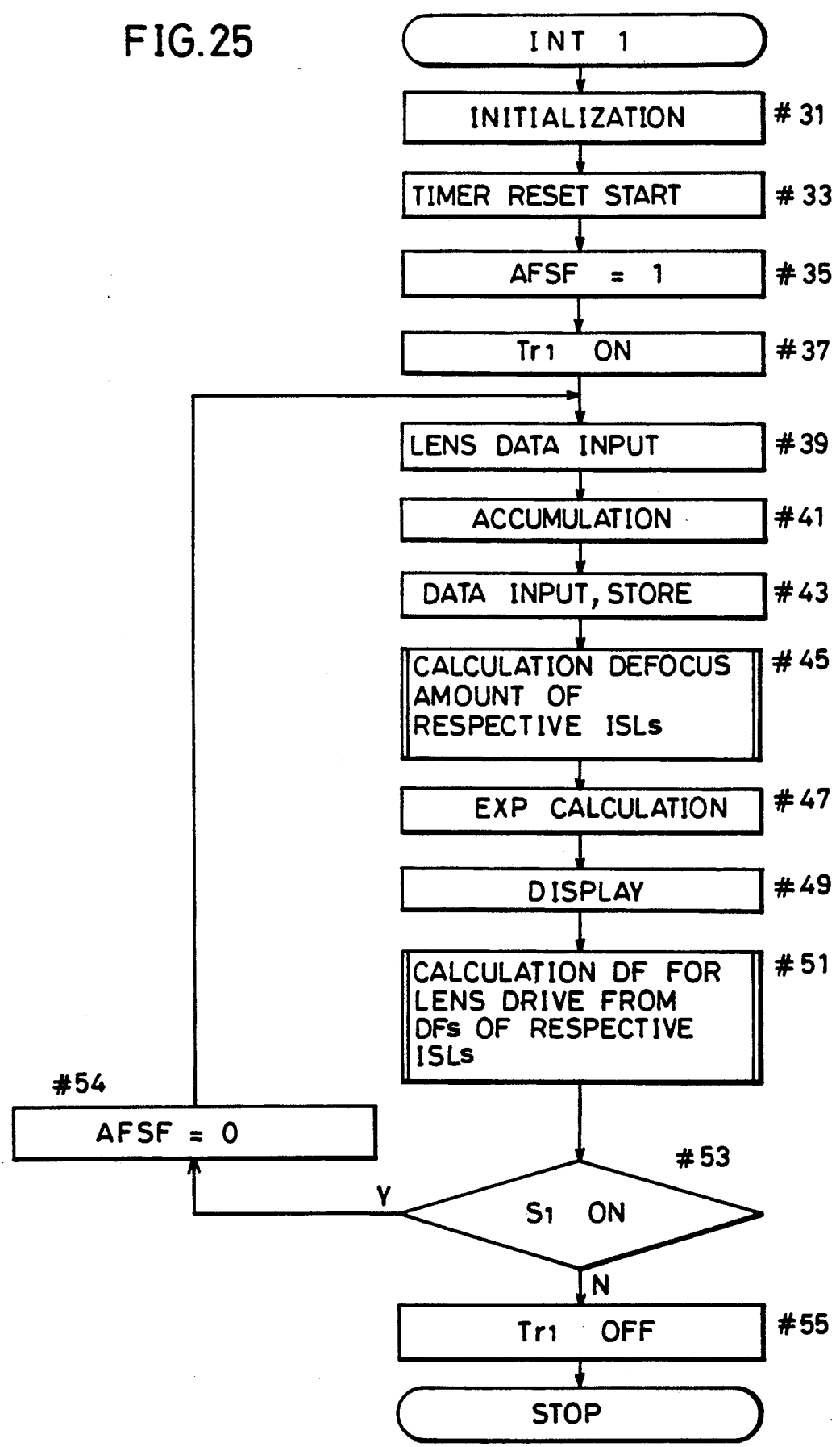
Figure 26:
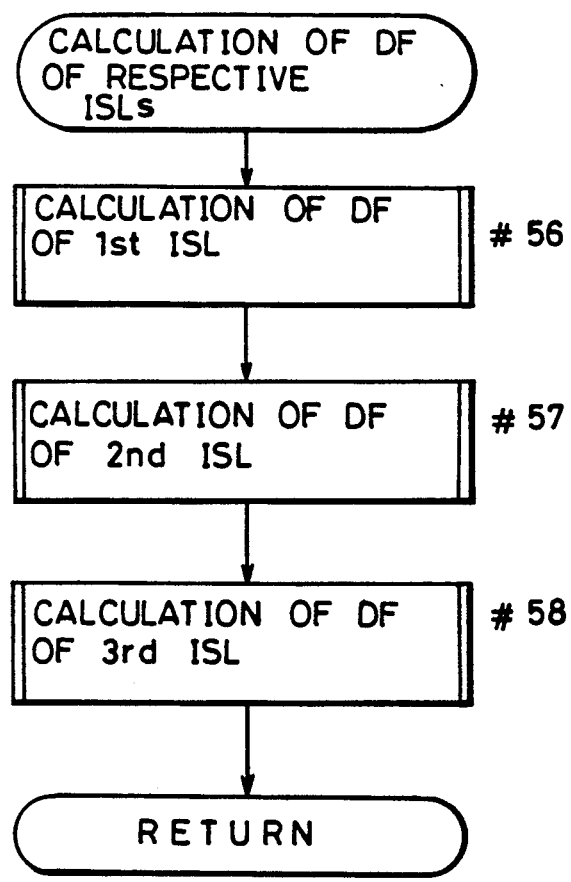
Figure 27:
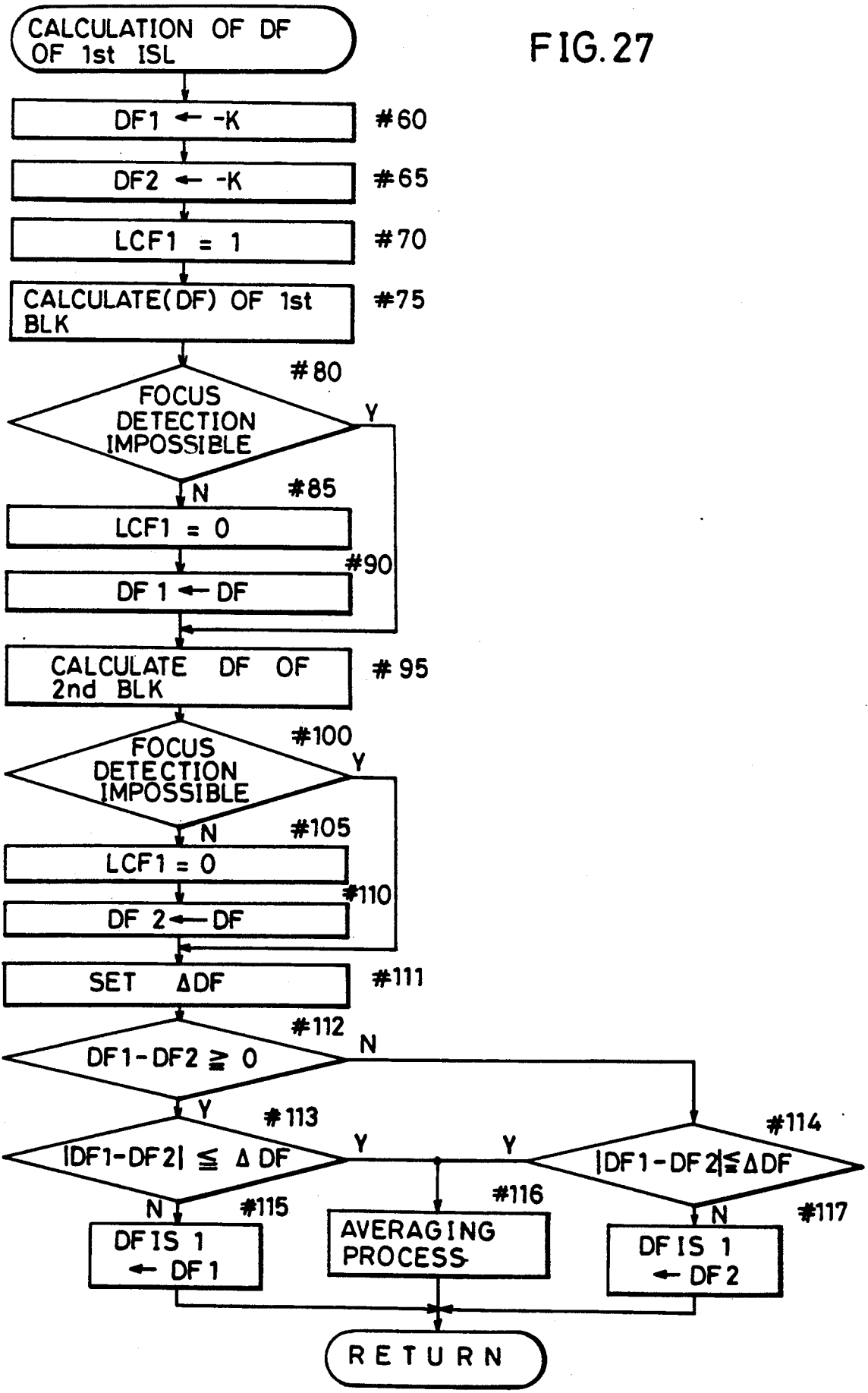
Figure 28A:
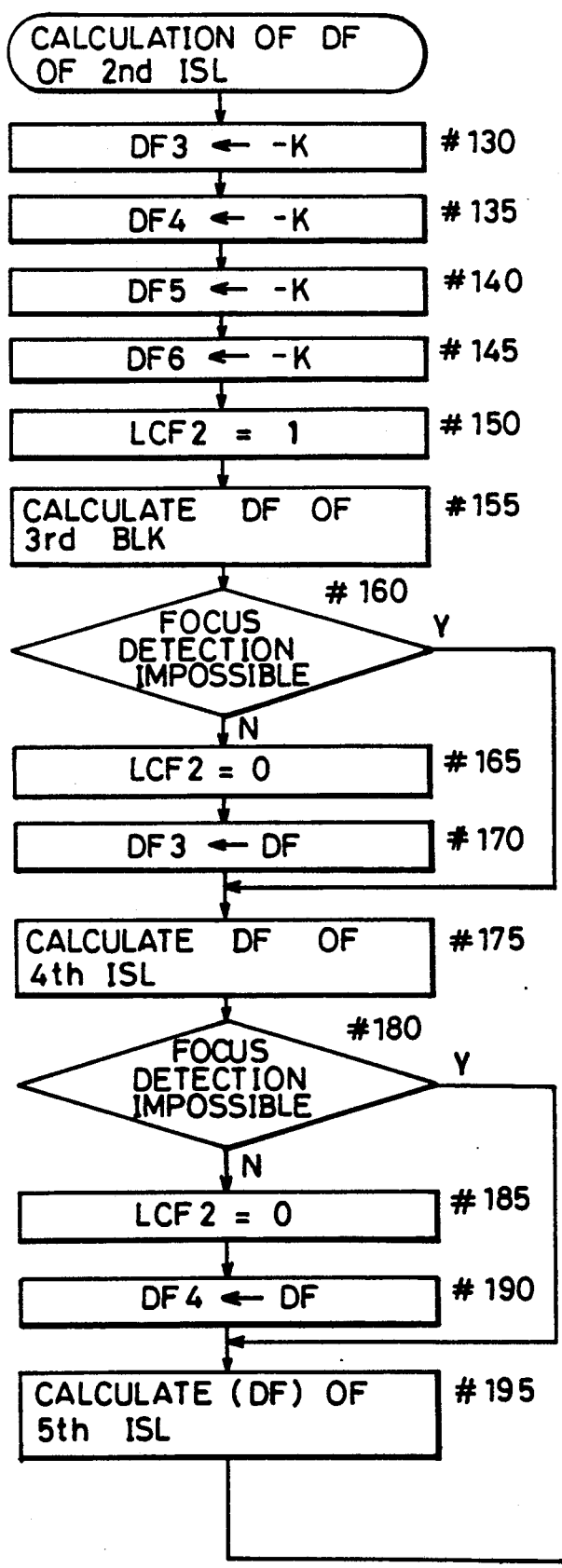
Figure 28A:
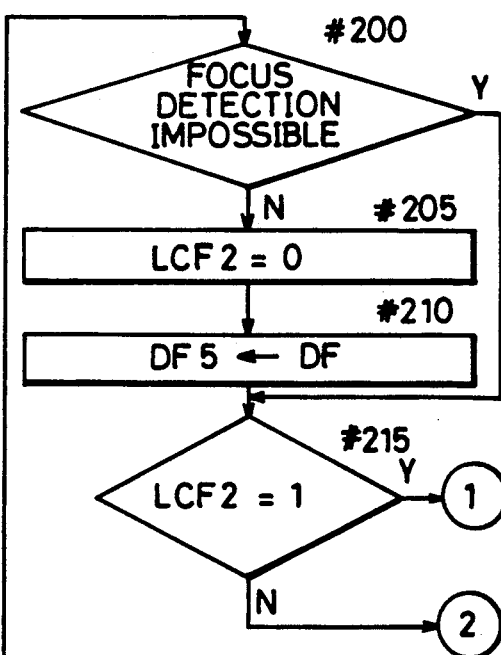
Figure 28B:
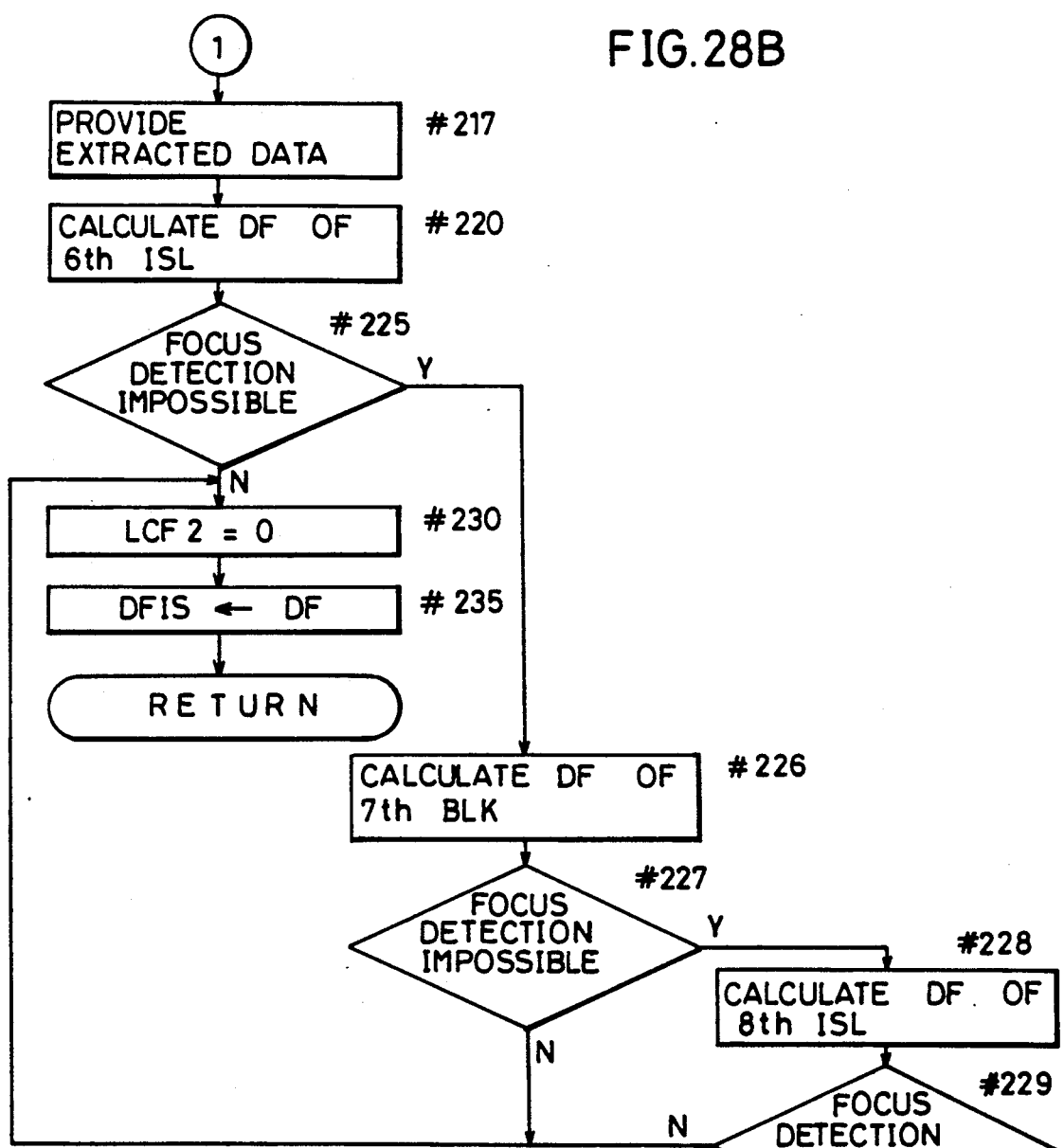
Figure 28C:
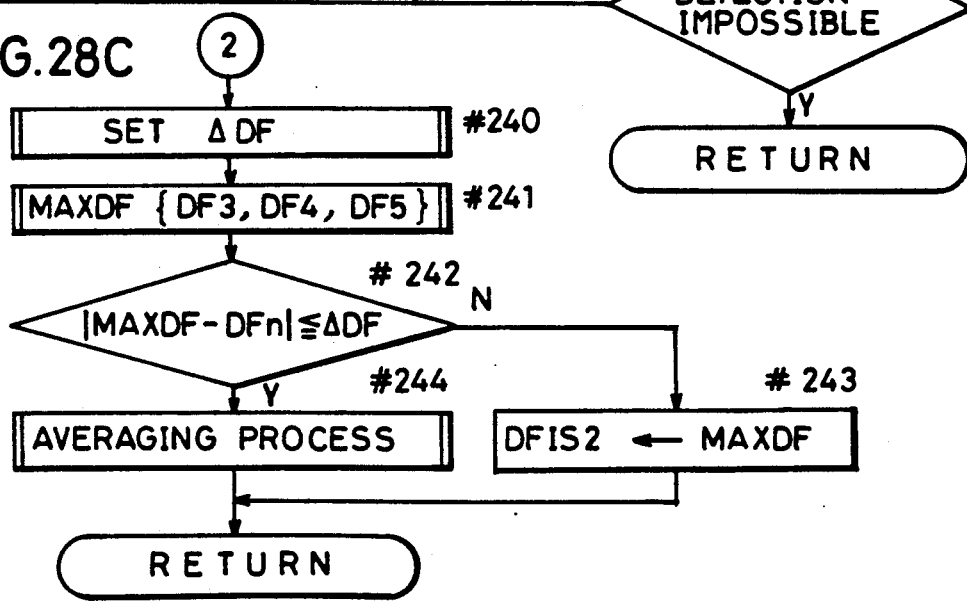
Figure 29:
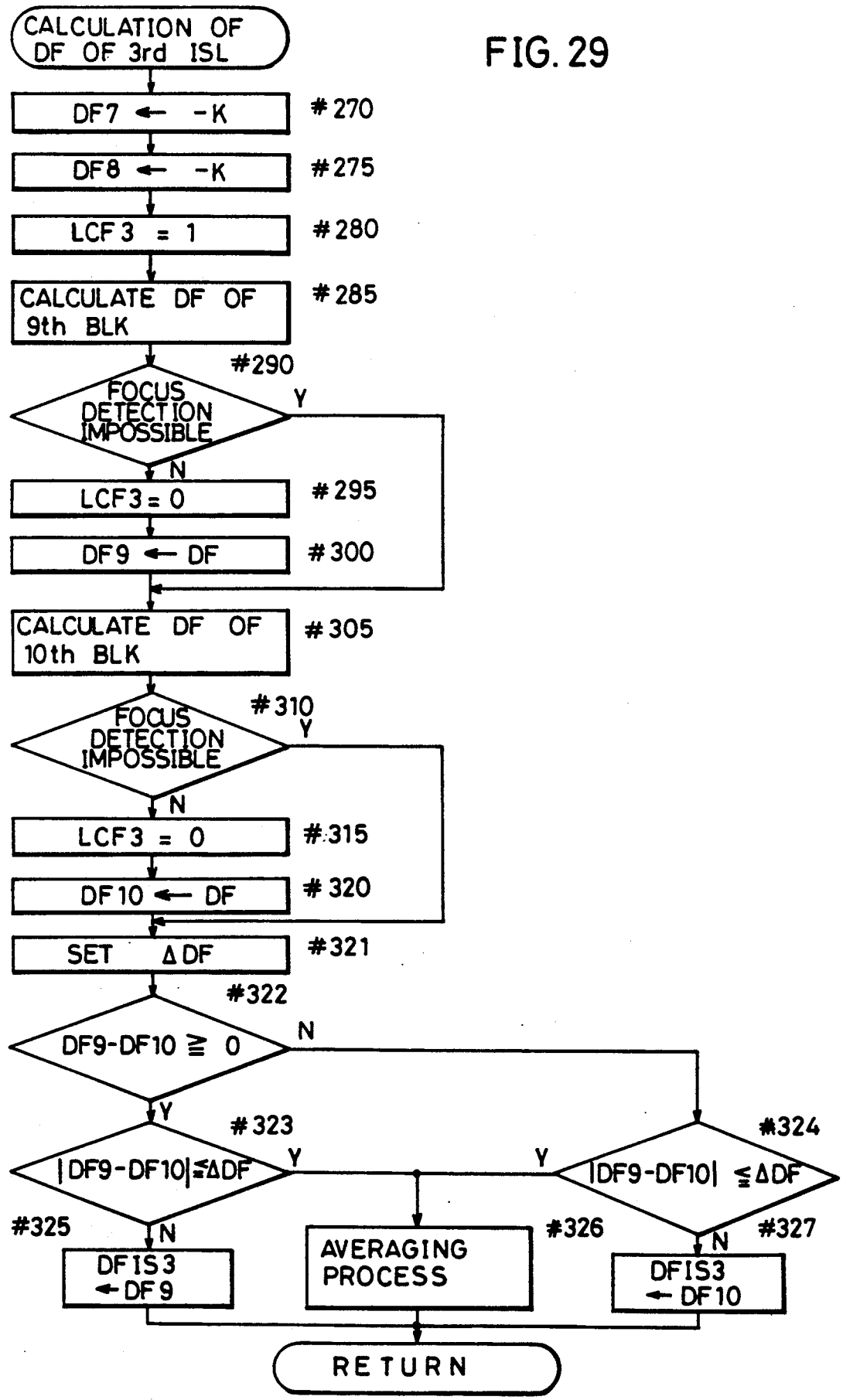

The subroutine of calculating the amounts of defocus in respective islands shown in the step #45 of FIG. 25 is shown in the FIG. 26. As shown in FIG. 26, amount of defocus of respective islands are calculated in the order of the first island, the second island and the third island. FIGS. 27, 28 and 29 show flow charts of the specific operations of calculating the amounts of defocus in the respective islands. FIG. 27 is a flow chart of calculation of the amount of defocus in the first island. As described above, the first island is divided into two blocks (first block, second block). A prescribed value (−K) is set as the variables DF1 and DF2, respectively, for storing the amount of defocus in the respective blocks (#60, #65). This value corresponds to a front-focus state, which is not possibly occur in the above blocks, and the value is used as the amount of defocus when the focus detection is impossible. Thereafter, a flag LCF1 indicative of the focus detection impossible state, (hereinafter referred to as "low contrast") in the first island is set (#75). The state of focusing is detected and the amount of defocus DF is calculated for the first block, and whether the focus detection is possible or not is determined. If the focus detection is impossible, then the program proceeds to the step #95 (#75, #80). If the focus detection is possible, then the low contrast flag LCF1 is reset, and the calculated amount of defocus DF is used as the defocus amount DF1 of the first block (#85, #90).

The state of focusing is detected and the amount of defocus DF is calculated in the second block, and if it is determined that the focus detection is impossible from the results, the program proceeds to the step #111 (#95, #100). If focus detection is possible, then the low contrast flag LCF1 of the first island is reset (#105). The calculated amount of defocus DF is employed as the defocus amount DF2 of the second block (#110), and the program proceeds to the step #111. In the step #111, difference $\Delta$DF between the defocus amounts between blocks which is to be used in an averaging process routine is set. The averaging process routine is a routine for calculating an average amount of defocus from a plurality of data in order to calculate a suitable amount of defocus. The setting of the difference $\Delta$DF is not directly related to the present invention, so that the description thereof is omitted. It is set in accordance with the diaphragm aperture value, photographing magnification rate $\beta$ and with the determination whether the averaging process was carried out in the last operation or not. In the step #112, a difference value of the defocus amounts DF1 and DF2 is determined (including direction: it is negative if the camera is in the front focus state, and it is positive if it is in the rear focus state). The amount of defocus which is larger, namely, the amount of defocus of an object nearer to the camera is employed as the amount of defocus DFIS1 of the first island. More specifically, if the amount of defocus of the first block DF1 is larger, then the amount DF1 is employed as the amount of defocus of the first island DFIS1, and when the amount of defocus of the second block DF2 is larger, then this amount DF2 is employed as the amount of defocus of the first island DFIS1 (#115, #117). If the difference value between these amounts of defocus is no more than DF, then the averaging process is carried out (#116). Thereafter, the microcomputer $\mu$C returns to the flow of FIG. 26.

Thereafter, the microcomputer $\mu$C carries out the subroutine for calculating the amount of defocus for the second island (FIG. 28) (#57). Referring to FIG. 28, the prescribed value $(-K)$ is set as respective variables DF3 to DF5 for storing the amounts of defocus of the third to fifth block. A low contrast flag LCF2 indicative of the impossibility of focus detection in the second island is set (#130 to #150). Detection of the focusing state is block and the fifth block (#155 to #210). Details of the operation are the same as in the first and second blocks, so that the description is not repeated. In the step #215, whether the focus detection is impossible in all of the third to fifth blocks is determined by checking whether or not the low contrast flag LCF2 is set. If the flag LCF2 is set, then the program proceeds to the step #217 and otherwise the program proceeds to the step #240.

In the step #240, the microcomputer $\mu$C sets the difference $\Delta$DF of the defocus amount between blocks which is to be used in the average processing routine as in the step #111 (#140). Thereafter, a difference value of the amounts of defocus DF3 to DF5 of the third to fifth blocks are determined, and the largest amount of defocus MAXDF is extracted. If the data of other blocks do not exist within the difference $\Delta$DF of the defocus amount set in #240, then the amount MAXDF is determined as the defocus amount DFIS2 of the second island (#240 to #243), and the program returns. If there is the data of other blocks within the difference $\Delta$DF of the defocus amount, then the averaging process is carried out with the block from which the value MAXDF is detected and the block containing the value within the range of the difference $\Delta$DF of the defocus amount (#244).

In the step #217, the microcomputer $\mu$C reconstructs the difference data provided by every fourth element to the difference data provided from every eighth element, in order to enable focus detection of an object with low spatial frequency. More specifically, when we represent the pixel data as $l_1, l_2, \ldots, l_n, \ldots$, then the every fourth difference data are stored as $dDn = l_1 - l_5, \ldots, l_5 - l_9, \ldots, l_n - l_{n+4}, \ldots$. Every eighth difference data will be $dDm' = l_1 - l_9, \ldots, l_m - l_{m+8}$. These values can be provided by adding every fourth one of the stored every fourth difference data dDn. Namely, the every eighth difference data will be $$dD_{m'} = (dD_1 + dD_5), \ldots, (dD_m + dD_{m+4}), \ldots =$$
$$(l_1 - l_5 + l_5 - l_9), \ldots, (l_{n-4} - l_n + l_n - l_{n+4}), \ldots =$$
$$(l_1 - l_9), \ldots, (l_{n-4} - l_{n+4}), \ldots = (l_1 - l_9), \ldots,$$
$$(l_m - l_{m+8}), \ldots, \text{where } n = m + 4.$$

Such new difference data $dD'_m$ are calculated. By adding adjacent new difference data $dD'_m$ a new arrangement of data $dW_m = dD'_m + dD'_{m+1}$ is provided. By using the data arrangement $dW_m$, focus detection in the sixth block is carried out, the state of focusing is detected and the calculation of the amount of defocus is carried out. If the focus detection is possible, then the low contrast flag LCF2 is reset, and the amount of defocus DF6 of this block is set as the amount of defocus DFIS2 of the second island, and the program returns (#220 to #235). If the focus detection is impossible, the focus detection in the seventh block is carried out. If the focus detection is possible, the low contrast flag LCF2 is reset and the amount of defocus DF7 of the seventh block is set as the amount of defocus DFIS2 of the second island, and the program returns. If focus detection is impossible, then the focus detection of the eighth block is carried out. If the focus detection is possible, then the low contrast flag LCF2 is reset and the amount of defocus DF8 of the eighth block is set as the amount of defocus DFIS2 of the second island, and the program returns. If the focus detection is impossible, the program directly returns. Thereafter, the microcomputer $\mu$C carries out a subroutine (FIG. 29) for detecting the focusing state and for calculating the amount of defocus of the third island (#58). Since the operation in this subroutine is the same as that of the first island (FIG. 27), the description is not repeated (#270 to #327). The amounts of defocus are calculated in the ninth and tenth blocks, variables DF9 and DF10 are used for storing the amounts of defocus of the respective blocks, a flag LCF3 is used to indicate impossibility of the focus detection in the third island, and a variable DFIS3 is used as the variable for storing the amount of defocus of the third island.

Figure 30:
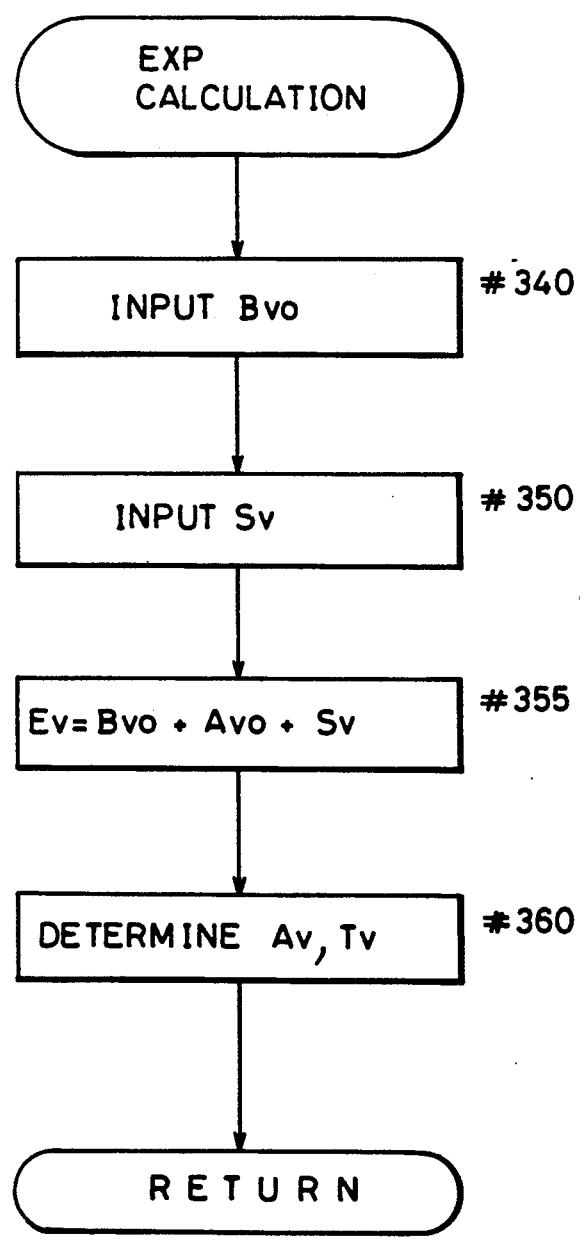

A subroutine of exposure calculation of the step #35 shown in FIG. 25 will be hereinafter described with reference to FIG. 30. The microcomputer $\mu$C outputs a signal instructing output of brightness data to the brightness detecting circuit LMC, and open brightness value $B_{vo} (= B_v - A_{vo})$ passed through the lens with the diaphragm aperture being fully open is inputted (#340). In the similar manner, the film sensitivity Sv is inputted from the film sensitivity reading circuit ISO (#350). In the above described step #39, the full open aperture value $A_{vo}$ has been inputted in advance from the lens circuit LEC. An exposure value EV is calculated based on the inputted data as $E_v = B_{vo} + A_{vo} + S_v$, the control aperture value Av and the shutter speed Tv are determined in accordance with prescribed calculations, and the program returns (#355, #360).

In the subroutine of the step #45 in FIG. 25, distribution of the objects is classified in accordance with the amounts of defocus calculated in respective islands. The most suitable algorithm is selected in accordance with the classification to provide the most suitable amount of defocus.

The pattern algorithm will be briefly described in the following. First, whether it is in the AF mode or FA mode is determined in the pattern algorithm. The FA mode is often used for taking photographs of static objects. In such cases, focusing on the aimed object is carried out carefully and deliberately. When a pattern algorithm of a wide area in accordance with the present invention is employed in such a case, it is inconvenient since which of the islands is selected for the FA display is not clear, Therefore, when the FA mode is selected, the focus detecting operation in the second island is given priority. If the distance measuring operation can be carried out by the CCDs of the second island, the amount of defocus DFIS2 of the second island is employed, and the value of the nearest island having an object locating closest to the camera is used only when focus detection by the CCDs in the second island is impossible.

Meanwhile, if the AF mode is selected and focus detection of the object is possible in any of the islands, then the amount of defocus of the closest island, namely, the island in which the amount of defocus becomes the largest, is used together with the focal length data of the lens and the distance data to the object to calculate the photographing magnification rate, whereby the algorithm for calculating the amount of defocus is changed. Basically, when the magnification rate is large, then the main object is assumed to be existing at the center of the photographing screen, so that distance measuring data of the second island are given priority. If the photographing magnification rate is small, it means that the background is included, and therefore the distribution of distance varies widely. In such a case, the main object often exist nearer to the camera. Therefore, out of the data of distance distribution, the data corresponds to the nearer side is given priority to be employed.

The value of the focal length which is used for determining the magnification rate and how the distance measuring algorithm is selected for the value are shown in Table 1. In the FA mode, the amount of defocus of the second island is employed provided that the focus detection is possible in the second island, and the amount of defocus of an island to which an object nearest to the camera belongs is used when the focus detection operation is impossible in the second island. In the AF mode, when the focus detection is possible in the second island and the focal length f is smaller than 35 mm, then the amount of defocus of an island to which the object nearest to the camera belongs is employed. If the focal length f is equal to or longer than 35 mm, the amount of defocus of the second island is employed provided that photographing magnification rate $\beta df$ is smaller than $B_H$ and if the photographing magnification rate $\beta df$ is no less than $\beta H$, then the amount of defocus of the island to which the object nearest to the camera belong is employed. In the AF mode, if the focus detection in the second island is impossible, then the amount of defocus of an island to which the nearest object belongs is employed. The reference character $\beta df$ represents the photographing magnification rate of the island to which the nearest object belongs, and $\beta_H$ is a reference value for determination. The initial value of $\beta_H$ is 1/25. If $\beta df \leq \beta_H$, then $\beta_H$ will be $\beta_H = 1/15$. If $\beta df > \beta_H$, then $\beta_H$ will be $\beta_H = 1/25$. If focus detection is impossible in all islands, then it is determined that the focus detection operation is impossible in both AF mode and FA mode.

TABLE 1

| | | MODE OF OPERATION | | |
| --- | --- | --- | --- | --- |
| | | | AF | |
| | | | | $f \geq 35$ mm |
| PATTERN DISTRIBUTION | FA | $f < 35$ mm | $\beta df > \beta_H$ | $\beta_H \geq \beta df$ |
| FOCUS DETENTION POSSIBLE IN 2ND ISLAND | 2nd | | 2nd | |
| DISTANCE MEASUREMENT IMPOSSIBLE IN 2ND ISLAND | | NEAREST ISLAND | | |
| DISTANCE MEASUREMENT IMPOSSIBLE IN ALL ISLANDS | | DISTANCE MEASUREMENT IMPOSSIBLE | | |

Referring to Table 1, the algorithm for focus detection gives priority to the nearest one in the distance distribution when $f < 35$ mm, with the focal length $f = 35$ mm being a reference. The reason for this is that the depth of focus becomes deeper as the focal length becomes shorter, so that if the camera is focused on an object existing at the nearest position, other object detected in the remaining islands can be focused fairly well. Table 1 shows the idea.

The photographing magnification rate ($\beta df$) of the object positioned at the nearest point employed in the above described pattern algorithm is calculated in the following manner.

When we represent the focal length by f and the distance of the object from the camera by x, then the photographing magnification ratio ($\beta df$) can be represented as $$\beta df = f/x,$$

the focal length f is inputted from the lens. Therefore, only the object distance x have to be provided in order to calculate the photographing magnification ratio ($\beta df$). The object distance x from the camera can be calculated as $$x = f^2 / DFx$$

where the amount of defocus from the infinite photographing position of the lens to the position of the object is represented by DFx. However, the above equation is an approximation, since the lens is not a thin ideal lens but has front and rear principal points and, the principal points are different corresponding to the different focal length. Meanwhile, the amount of defocus $DF_0$ from the infinite photographing position of the lens to the present position is stored as the amount (number) N of rotation of a motor in a counter indicative of the present position of the lens. The following relation $$N = k \cdot DF_0$$

can be applied, with the value of the coefficient k inputted from the lens. From the above equation, the amount of defocus from the infinite photographing position to the present position of the lens is represented as $DF_0 = N/k$. The amount of defocus DF from the present position of the lens to the position of the object can be provided by the focus detecting apparatus described above. Therefore, the amount of defocus DFx from the infinite photographing position of the lens to the position of the object is represented as $DFx = DF_0 + DF$. Accordingly, the object distance x is $x = f^2 / DFx = f^2 / (N/k + DF)$ and, accordingly, the photographing magnification ratio is $\beta df = f/x = (N/k + DF)/f$.

Alternately, the photographing magnification ratio can be calculated by using the amount of driving $\Delta N = DF \times k$ from the present position of the lens to the position of the object, as $\beta df = (N + \Delta N)/f \cdot k$ A specific structure of the AF sensor 17 will be described in the following with reference to FIG. 8. The structure of the AF sensor 17 is the same as that in the first embodiment in the present invention. Arrangements 16a to 16c of CCD image pick up elements are arranged on the left side of the figure, and an I/O portion to an AF controller AFC is shown in the right side. The AF sensor 17 comprises, as communication terminals with the AF controller AFC, a reference operation clock input terminal CP, an accumulation start signal terminal ICG, a data input start signal terminal SHM, an ADT terminal for the signals indicative of the completion of accumulation in respective islands and for the output data synchronizing signals, and operation mode setting terminals MD1 and MD2 for setting initializing mode of the AF sensor, the accumulation mode and the data dump mode. The AF sensor 17 outputs an analog output signal proportional to the brightness distribution of the image from the image information analog output terminal Vout. An A/D converter provided in the AF controller AFC starts A/D conversion in synchronization with the ADT signal. The result of the A/D conversion is inputted to the microcomputer $\mu C$ as the digital signal of the information in association with the brightness distribution of the image, so as to be employed in the focus detecting operation. The arrangements 16a to 16c of the CCD image pick up elements are divided into three islands IS1 to IS3 arranged in an H shape as shown in the finder display of FIG. 3, and normally the arrangements 16a to 16c are independently controlled. The detailed structure of the arrangements 16a to 16c of the CCD image pick up elements is the same as described in the description of the first embodiment.

The accumulation mode is selected in accordance with the combination of the logic on the terminals MD1 and MD2 (Refer to FIG. 8). First, when a voltage is applied to the accumulation clear gate ICG, the accumulating portion ST and the photodiode PD for photoelectric conversion discharge charges which have been accumulated to the overflow drain. The overflow drain is connected to the power supply line Vcc. Since the unnecessary charges are discharged, there is no charge left in the photodiode PD and in the accumulating portion ST, whereby each of the pixels is initialized. Thereafter, the voltage to the accumulation clear gate ICG is removed, so that the potential level of the accumulation clear gate ICG rises, the flow of charges from the accumulating portion ST to the overflow drain is stopped, and the photoelectric charges generated in accordance with the intensity of light entering the photodiode PD are drawn into the accumulating portion ST through the barrier gate BG to be accumulated therein. This is the charges accumulating operation (accumulating operation). During the accumulation clearing operation and during the accumulating operation, a prescribed voltage is applied to the barrier gate BG to set the potential at a low level in order to enable movement of charges between the photodiode PD and the accumulating portion ST. When an average level of the accumulated charges in each of the pixels reach a level suitable for the processing circuit in the succeeding stage or when there is a data request from AF controller AFC, then the voltage which has been applied to the barrier gate BG is removed in response to the signal. Consequently, the potential of the barrier gate BG rises to a high level, and the movement of charges between the photodiode PD and the accumulating portion ST is stopped. Thereafter, the flow of the charges generated by the incident light to the photodiode PD to the accumulating portion ST is inhibited, thereby completing the accumulating operation. Thereafter, a voltage is applied to the shift gate SH in response to a generation of a data request signal SHM from the AF controller AFC. By lowering the potential level of the gate, the charges are transmitted between the accumulating portion ST and the shift register SR.

The charges representing image information are successively transferred to the shift register SR in synchronization with the transfer clocks $\phi_1$ and $\phi_2$ applied to the shift register SR to be read as analog voltage from the output terminal OS.

The foregoing is the description of each of the arrangements 16a to 16c of the CCD image pick up elements shown in the block diagram of FIG. 8. How these arrangements 16a to 16c of the CCD image pick up elements are controlled in the present embodiment will be described in the following. Referring to FIG. 8, CCD accumulation time controlling portions 171 to 173 are provided for respective outputs AGCOS1 to AGCOS3 of the monitoring photodiodes MPD1 to MPD3 in the arrangements 16a to 16c of the CCD image pick elements. The barrier gates BG1 to BG3, the accumulating portions ST1 to ST3 and the accumulation clear gates STICG1 to STICG3 of the respective islands IS1 to IS3 are controlled by the controlling portions. A CCD clock generating portion 174 is provided for all the islands for controlling the transfer clocks $\phi_1$ and $\phi_2$ common to the shift register SR in all islands and the shift gates SH1 to SH3 of the respective islands.

Since the above mentioned accumulation mode is the same as in the first embodiment shown in FIG. 15A, only the portions different from the first embodiment will be described.

Accumulation of the reference output signals AGCDOS1 to AGCDOS3 for detecting drift component dependent on the temperature of the monitoring photodiodes MPD1 to MPD3 is started. In the CD accumulation time controlling portions 171 to 173, differential outputs between the monitoring output AGCOS 1 to AGCOS3 and the reference outputs AGCDOS 1 to AGCDOS3 for detecting the drift components are continuously detected. The state of accumulation of the photodiodes PD1 to PD3 for pixels can be checked by determining whether or not the differential output reached a prescribed value. Every time a prescribed level fluctuation is generated in the differential output and it is detected in any of the CCD accumulation time controlling portions 171 to 173 that the accumulation in any of the photodiodes PD1 to PD3 for pixel has reached the suitable level, the corresponding one of the accumulation level attained signal $V_{FLG1}$ to $V_{FLG3}$ of the islands IS1 to IS3 is inverted. Generally, the respective islands detect different objects. Therefore, the timings of inversion of the accumulation level attained signals $V_{FLG1}$ to $V_{FLG3}$ are different from each other. In the example of FIG. 15A, the accumulation level attained signal $V_{FLG2}$ is inverted first in the second island. At this point of time, the CCD accumulation time controlling portion 171 inverts the barrier gate signal BG2 which have outputted a "High" level signal from the time of the accumulation clearing operation to "Low" level, thereby cutting flow of charges between the photodiode PD and the accumulating portion ST to complete the accumulating operation. At the same time, a "Low" level pulse signal is applied to the ADD signal, which has been kept at the "High" level from the time of accumulation clearing, so that AF controller AFC is informed of the completion of accumulation in one island. The AF controller AFC can recognize the completion of accumulation in one island by receiving the falling of the ADT signal as an interruption signal to carry out an ADT interruption process (which will be describe later with reference to FIG. 32 and the following drawings).

Figure 15A:
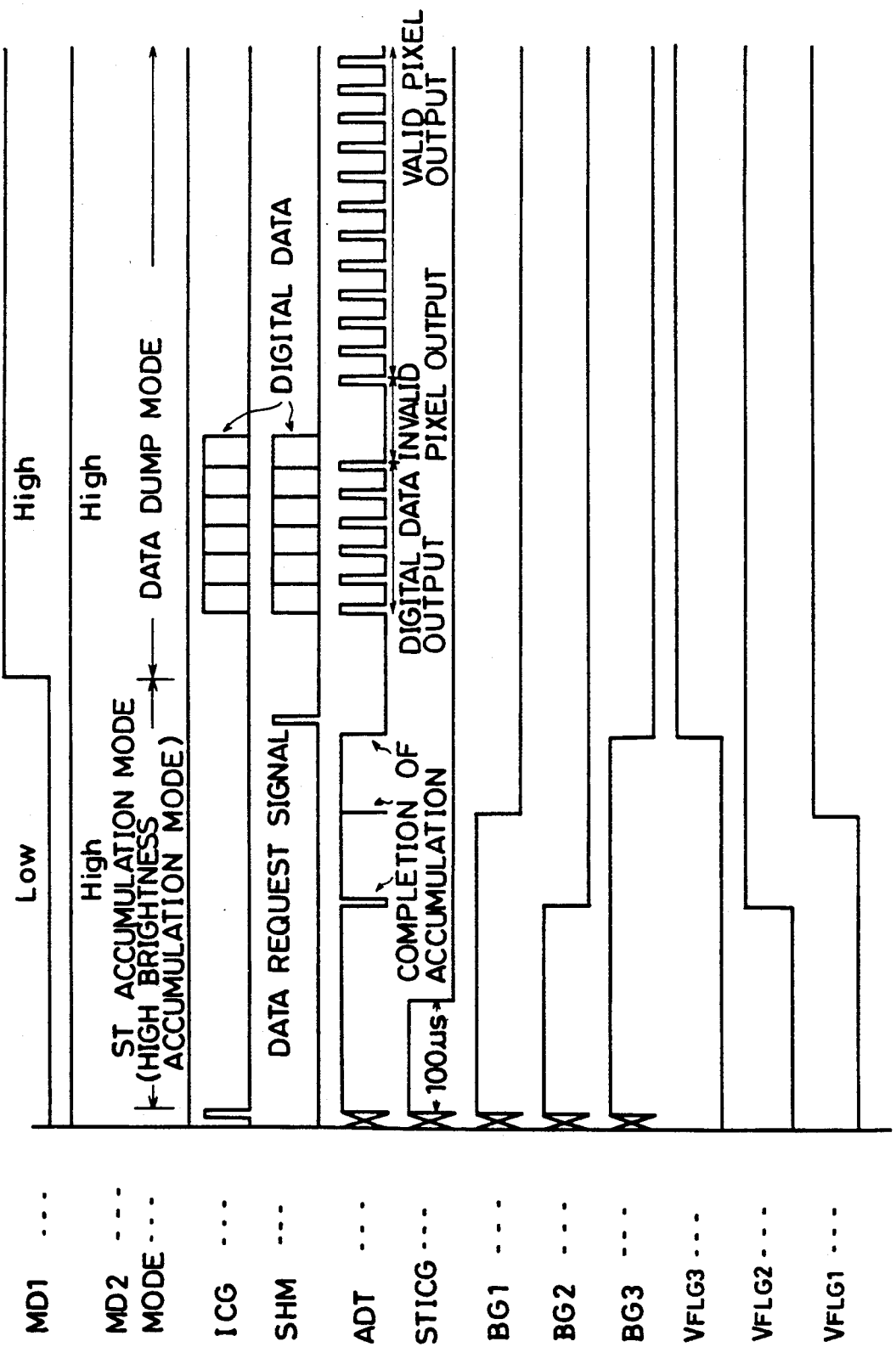
FIG. 15A is a diagram of waveforms showing operations of the photoelectric converting apparatus to which the present invention is applied, in an ST accumulation mode and a data dump mode.
Figure 15B:
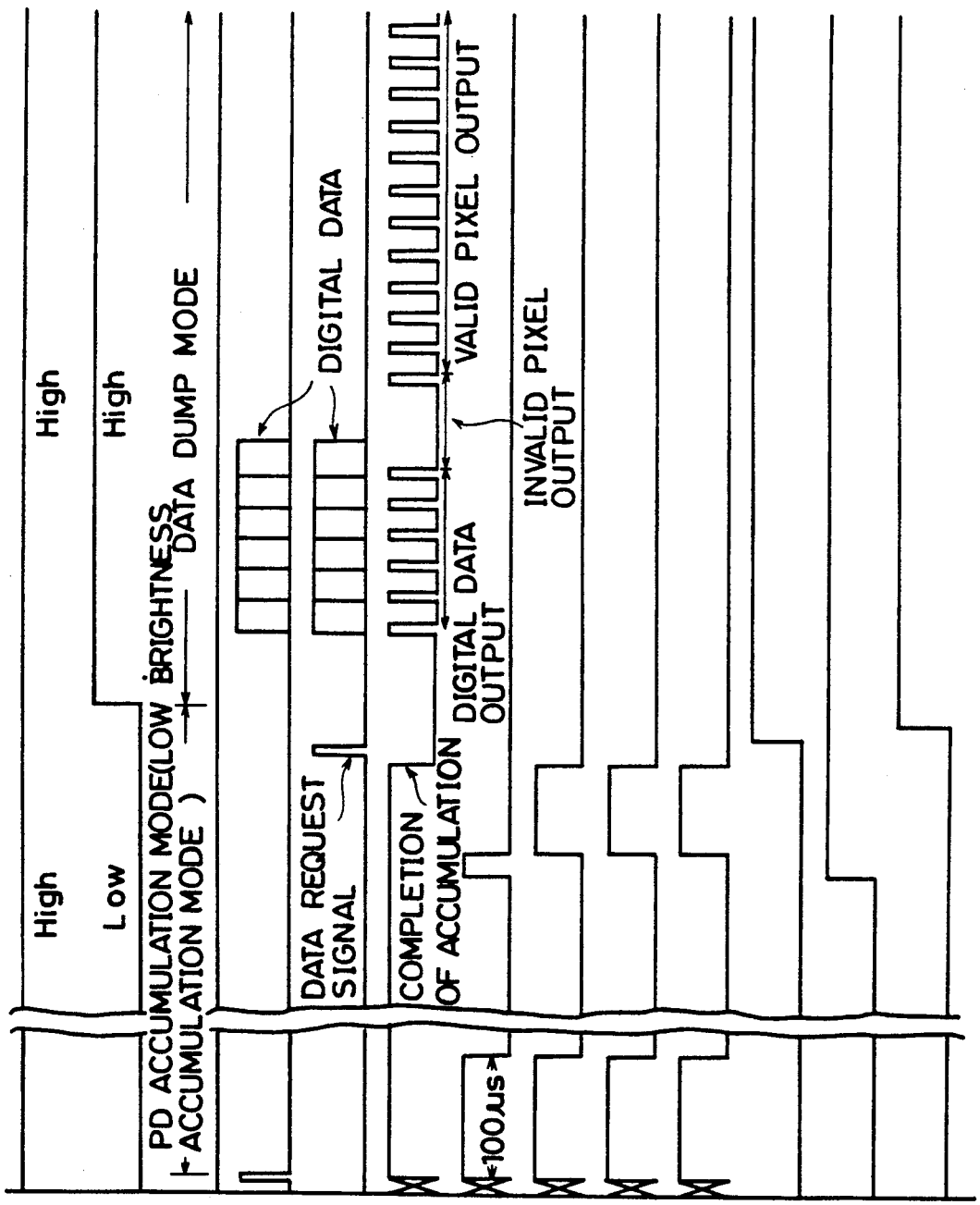
FIG. 15B is a diagram of waveforms showing operations of the photoelectric converting apparatus to which the present invention is applied in a PD accumulation mode and the data dump mode.

In other islands, namely, the first and third islands in the example of FIG. 15A, the barrier gate signals BG1 and BG3 are kept at the "High" level independent from the operation of the second island, whereby accumulation is continued. In the example of FIG. 15A, inversion of the accumulation level attained signal $V_{FLG1}$ of the first island occurs after the inversion in the second island. In this case also, the "Low" level pulse is outputted to the ADT signal, the barrier gate signal BG1 is inverted, and the flow of charges between the photodiode PD and the accumulating portion ST is interrupted, thereby completing the accumulation as in the case of the second island. The AF controller AFC recognizes the completion of accumulation in another island by the falling of the ADT signal. When the accumulation level attained signal $V_{FLG3}$ of the third island is inverted before the time lapse of the maximum permissible accumulation time (20 msec), then the ADT signal is kept at the "Low" level, the barrier gate signal BG3 is set to the "Low" level and the flow between the photodiode PD and the accumulating portion ST is cut, thereby completing the accumulation. The AF controller AFC repeatedly senses the ADT signal with the period being little longer than the pulse width indicative of the first and second accumulation. Since the continuous output of the "Low" level signal is detected, the completion of accumulation in all the islands can be recognized.

At this point, an amount of charges whose level is suitable for the analog signal processing portion 176 is prepared and held in the accumulating portions of the arrangements 16a to 16c of the CCD image pick up elements in the respective island.

Thereafter, the AF controller AFC applies the SHM signal which serves as a data request signal to the AF sensor 17. The SHM signal is applied to the CCD accumulation time controlling portions 171 to 173 and to the CCD clock generating portion 174 through the I/O controlling portion 175 of FIG. 8. As shown in the time chart of FIG. 15A, if the accumulating operation is automatically completed by the CCD accumulation time controlling portions 171 to 173 before the application of the SHM signal in all islands, then the CCD accumulation time controlling portions 171 to 173 do not operate in response to the SHM signal. Meanwhile, the CCD clock generating portion 174 initializes the internal counter by the SHM signal to start counting of the input pulse CP from this time on. Simultaneously, the transfer clock $\phi_1$ is set to the "High" level and the transfer clock $\phi_2$ is set to the "Low" level. The shift gate pulse SH2 is applied. By the application of the shift gate pulse SH2, the charges accumulated in the storage portion ST2 of the second island are transferred to the shift register SR2 of the second island. After the application of the shift gate pulse SH2, the transfer clocks $\phi_1$ and $\phi_2$ are started again. The shift registers SR2 of the CCDs transmit photoelectric charges generated in the photoelectric converting portion of the second island as output signals OS2 to the analog signal processing circuit 176 in synchronization with the transfer clocks $\phi_1$ and $\phi_2$. The CCD clock generating portion 174 counts the number of transfer clocks of the CCD. The counted value is transmitted to the analog signal processing portion 176. When analog signals are outputted from CCD dark current outputting elements (output signals from portions of the CCDs which are masked), a control signal for level clamping is applied to the analog signal processing portion 176 in order to clamp the output level corresponding to the dark current as the A/D conversion reference voltage Vref.

The CCD clock generating portion 174 outputs the ADT signal through the I/O controlling portion 175. The ADT signal is outputted to indicate switching between the CCD data pixel by pixel, and the AF controller AFC starts A/D conversion of the pixel data at the fall of the ADT signal. During the accumulation and during the dark current output level clamping operation, the output of the ADT signal becomes unstable, so that this signal is not suitable as a signal to be applied externally. Therefore, during these periods, the CCD clock generating portion 174 controls the AD converter so that the influence of temperature upon A/D conversion reference voltage Vref is eliminated. The temperature data $V_{TEMP}$ is supplied from the temperature detecting portion 177 shown in FIG. 8 to the analog signal processing portion 176.

As described above, although the accumulation of the pixel data in respective islands is started at the same time, the accumulation is terminated at different times, and therefore the central time of accumulation differs from each other.

The operation of the AF sensor will be described in the following. Referring to FIG. 21, when it is detected that the "Low" level of the ADT signal is continued, then the data requiring pulse is applied to the SHM terminal by the AF controller AFC to start reading of data. Consequently, the output terminal MD1 is set to the "High" level to set the data reading mode, and the reading of data is started. At the start of the data reading mode, the AF sensor 17 outputs a prescribed number of the ADT signals. The gain information is determined in the respective CCD accumulation time controlling portions 171 to 173 in the AF sensor 17 and applied to the analog signal processing portion 176 for respective outputs of the islands. The AF sensor 17 outputs the gain information and the order of the time of completion of accumulation of respective islands as digital data from the SHM terminal and ICG terminal. Gain information of once, twice, four or eight is applied to the AF controller AFC.

Thereafter, all the pixel data of the second island, all the pixel data of the first island and all the pixel data of the third island are outputted as analog signals from the output terminal Vout one pixel by one pixel corresponding to every pulse of the ADT signal. The foregoing is the brief description of the operation of the AF sensor 17.

The focus detecting operation during the driving of the lens will be described with reference to the time chart of FIG. 21. Now, while the lens is driven at a constant speed, images which are moved as the time passes in correspondence with the driving of the lens are projected on the AF sensor 17, and the distance between images is calculated as the distance between the moving images. Distance of the images coincides with the distance between images provided at the central point (center of accumulation) of the accumulation period of the AF sensor 17, so long as the brightness of the object is constant. Now, assuming that the accumulation is started at the time $t_0$ the accumulation in the first island is completed at the time $t_1$, the accumulation in the third island is completed at the time $t_2$ and the accumulation in the second island is completed at the time $t_3$, then the amounts of defocus DFIS1 to DFIS3 are calculated in the focus detecting operation at the time $t_4$ based on the distances between the images at the different time points in the respective islands. Namely, the amounts of the defocus DFIS1 to DFIS3 of the respective islands are calculated based on the distances between images at the time points of $I1=(t_0+t_1)/2$ in the first island, $I2=(t_0+t_3)/2$ in the second island and $I3=(t_0+t_2)/2$ in the third island. These values DFIS1 to DFIS3 are converted into the number of driving pulses N1 to N3, respectively. The calculated numbers of pulses N1 to N3 are the numbers of necessary driving pulses at the different centers of accumulation (the central times I1 to I3 of the accumulation period) of the respective islands, so that these numbers must be converted into the numbers of remaining driving pulses R1 to R3 at the time $t_4$ of completion of the focus detecting operation. Therefore, the values of pulse count indicative of the amounts of lens drive at the time points $t_0$, $t_1$, $t_2$ and $t_3$ must be accumulated in counter registers CT(0) to CT(3). When we represent the pulse count values indicative of the lens driving amounts at respective points as $P(t_0)$, $P(t_1)$, $P(t_2)$ and $P(t_3)$ and the pulse count value indicative of the lens driving amount at the present as $P(t_4)$, the number of remaining driving pulses R1 to R3 of the respective islands IS1 to IS3 are provided by subtracting the values of the pulse counts driven from the central time of accumulation I1 to I3 to the point $t_4$ at which the focus detecting calculation is completed, from the number of the driving pulses N1 to N3 calculated by the focus detecting calculation that is, $$R1 = N1 + P(t_4) - \{P(t_0) + P(t_1)\}/2$$

$$R2 = N2 + P(t_4) - \{P(t_0) + P(t_3)\}/2$$

$$R3 = N3 + P(t_4) - \{P(t_0) + P(t_2)\}/2$$

Thus, the amounts of defocus of respective islands IS1 to IS3 viewed from the same point (the amounts of the focus are converted into the numbers of pulse counts R1 to R3 at this time) are calculated, and it is determined which one of the amounts of the focus of the respective islands IS1 to IS3 is to be employed for driving the lens.

However, the operation of calculating the proper focus detecting values by correcting the movement independently in respective islands is complicated and the storage capacity must be increased. Therefore, the limit of the above described maximum accumulation time and the limit of the lens driving speed are appropriately set rather than carrying out correction for the movement based on the respective central points of accumulation of the islands, whereby the amount of movement is corrected based on the central point of accumulation of one representative island, and the error in that correction can be suppressed.

Figure 32:
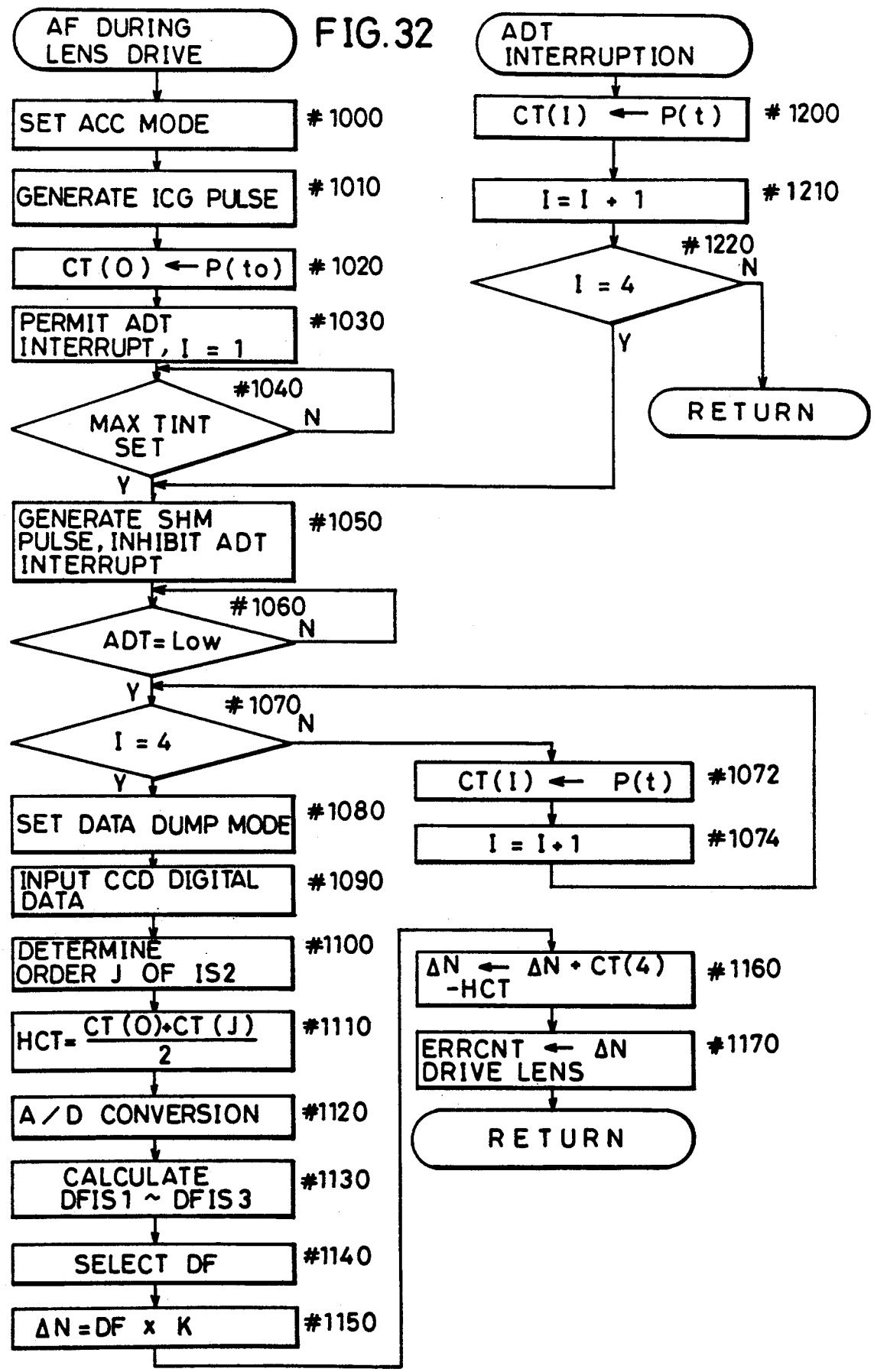
Figure 33:
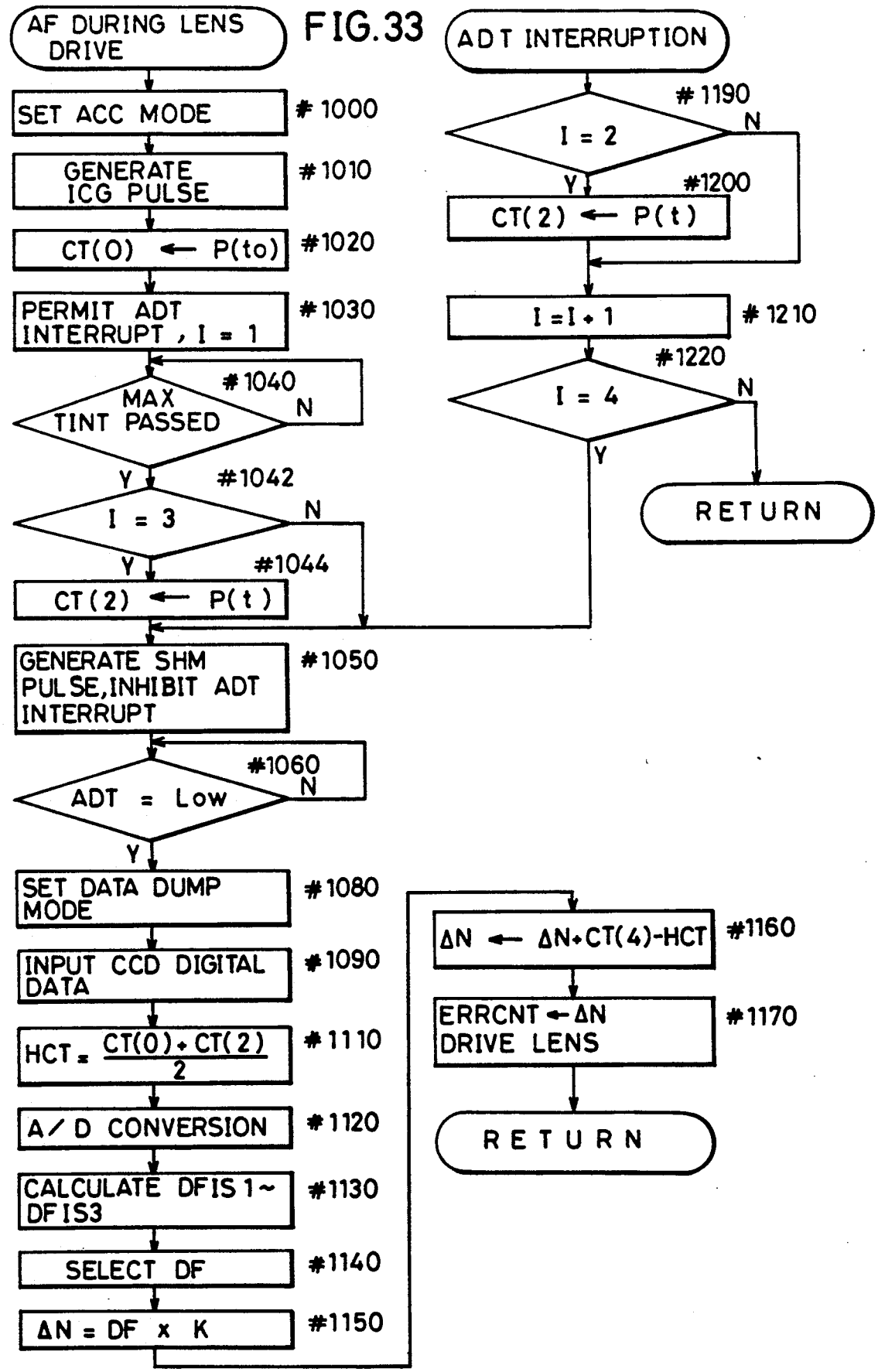
Figure 34A:
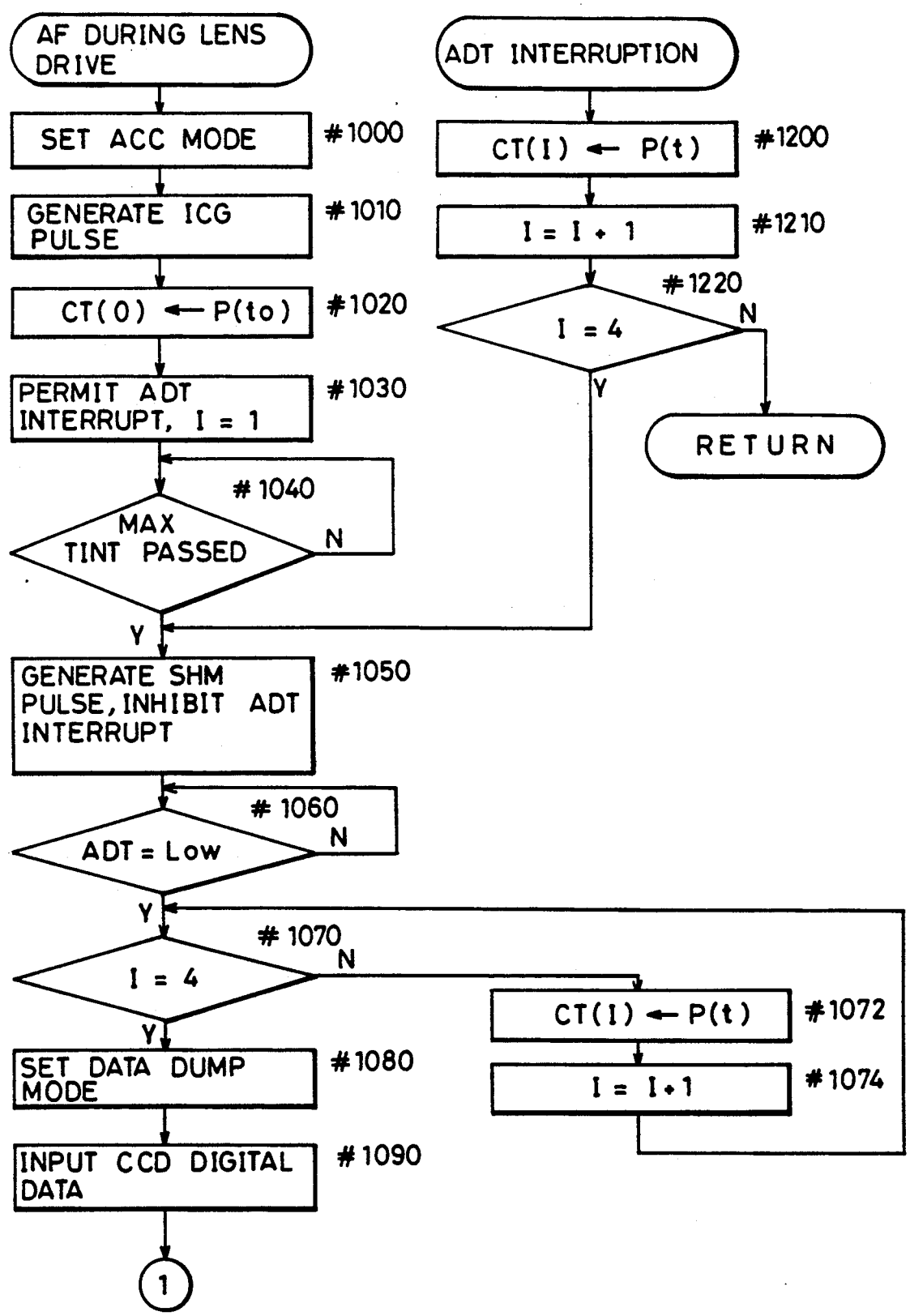

Three examples of selection of the representative islands will be described. Namely, (i) correction for the movement of the lens is carried out based on the central point of accumulation of a predetermined island, (ii) correction of the lens movement is carried out based on the central position of accumulation of an island in which the accumulation is completed in accordance with a predetermined order, and (iii) correction of the lens movement is carried out based on the central point of accumulation of the island which was selected last time in accordance with a multipoint algorithm. The FIGS. 32 to 34 are flow charts showing operation in association with the focus detection of the respective examples. These flow charts show the details of the steps #41, #43, #45 and #51.

FIG. 32 shows a flow in which a predetermined island is employed as the representative island. In this example, the correction of the lens movement is carried out based on the central position of accumulation of the second island at the center of the photographing screen. Focus detection is carried out again with the lens being driven at a constant speed, in accordance with the value provided in the last focus detecting operation. First, the AF controller AFC sets the accumulation mode by providing prescribed signals to the terminals MD1 and MD2 so as to obtain image information from the AF sensor 17 (#1000) and generates ICG pulses (#1010) to start the accumulating operation. The value of the lens position counter $P(t_0)$ at the time $t_0$ when the accumulation is started is accumulated as CT(O) (#1020). Thereafter, the AF controller AFC permits the ADT interruption in which the ADT signal serving as the signal indicative of the completion of accumulation is received as an interruption signal, and sets 1 in the interruption number counter I(#1030). Thereafter, the time lapse of the maximum accumulation time is checked (#1040). In this manner, the AF sensor 17 continuous to accumulate brightness distribution data of the images. Since the lens is driven during this operation, data of brightness distribution of the images are accumulated, with the images having the distance between images in the basic part and the reference part changing in correspondence with the driving of the lens.

In the time chart shown in FIG. 21, the suitable accumulating levels are successively attained in the order of the first, third and second islands in the AF sensor, and the accumulating operation is completed by the operation of the respective CCD accumulation time controlling portions. The AF controller AFC recognizes the timing of completion of the accumulating operation by the "Low" level signal of the ADT terminal. In the AF controller AFC, the ADT interruption routine is called in correspondence with the timing, and the values of the lens position counters P(t) at the respective time points of completion of the accumulation are stored as CT(1), CT(2) and CT(3) (#1200 to #1220). At the time when the value CT(3) is stored, the completion of accumulation in all of the islands is recognized (#1200), the data read start routine is called from the ADT interruption routine, the SHM pulse is generated and the ADT interruption is inhibited (#1050). Meanwhile, if the maximum accumulation time has passed in #1040, then the data read start routine is called, the SHM pulse is generated, the ADT interruption is inhibited, and the value of the lens position counter CT(I), which value has not yet been stored since the accumulation is not yet completed, is stored (#1070, #1072, #1074). Thereafter, the data dump mode is set by the terminals MD1 and MD2 (#1080). At this stage, it cannot be determined which of the values of the lens position counter CT(I) corresponding to the lens position at the completion of the accumulating operation in three islands correspond to which of the three islands. However, the data are stored in the respective position counters CT(I) regardless of the determination whether the maximum accumulation time has passed or not.

Immediately after the setting of the data dump mode, the AF controller AFC reads the AGC data and the order of completion of accumulation of respective islands outputted from the AF sensor 17 in synchronization with the ADT signal, as information represented by "1" and "0" (#1090). Referring to FIG. 21, the AGC data D11, D12 of the first island, the AGC data D21, D22 of the second island, the AGC data D31, D32 of the third island, the order of completion of accumulation D41, D42 of the first island, the order of completion of accumulation D51, D52 of the second island and the order of completion of accumulation D61 and D62 of the third island are inputted as digital data to the AF controller AFC. The AF controller AFC recognizes the order of accumulation completion at this stage, determine the order J of completion of accumulation in the second island (#1100), calculates the lens position counter value HCT at the central time of accumulation which is to be employed for correcting the amount of movement (#1110) and thereafter the AF controller AFC can clear the counter values CT(0) to CT(3) which are stored at the start of accumulation and at the times of completion of accumulation in the respective islands.

Figure 22:
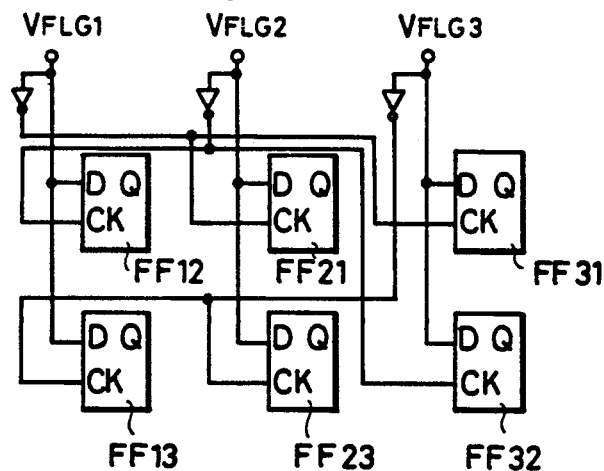
FIG. 22 is a schematic diagram of an accumulation completion order storing circuit employed in the AF sensor.

The order of completion of accumulation in the second island is determined based on the digital data D51 and D52 by an accumulation completion order determining circuit (FIG. 22) in the AF sensor 17, as described above. If the data D51 and D52 are both 1, then CT (J) = CT (1) and if the data are both 0, then CT (J) = CT (3). Either one of the data is 0, then CT (J) = CT (2). The lens position counter value HCT the central point of accumulation of the second island can be calculated as HCT = {(CT (0) + CT (J)}/2, by using the data as described above.

Thereafter, image information is successively outputted in synchronization with the ADT signal in the order of the second island, the first island and the third island from the analog output terminal Vout. The AF controller AFC starts A/D conversion at the fall of the ADT signal, and the brightness distribution of the respective pixels are stored in a memory as digital data (#1120).

When the data of all pixels are stored, the microcomputer calculates the amount of defocus DF1, DF2, and DF3 of the respective islands, and selects one defocus amount DF out of the three amounts in accordance with the multiple point selecting algorithm (#1140). The amount of defocus DF is converted into the number of driving pulses $\Delta N = DF \times K$ by using a conversion coefficient K for converting the defocus amount of the lens in the amount of movement provided as information from respective lenses (#1150). The number of driving pulses is the pulse number calculated at the central position of accumulation and correction for the movement is carried out by using the value of the lens position counter CT (4) at the time $t_4$ at which the focus detecting calculation is completed and the counter value HCT of the central point of accumulation calculated in advance. In addition, the number of driving pulses for driving the lens is calculated as $\Delta N + CT (4) - HCT$. The value is set in a lens driving counter ERRCNT, and the lens is driven so as to make this value 0 (#1170). During the driving of the lens, the next focus detection is carried out. The value of the lens driving counter ERRCNT is decreased by the pulse number supplied from the encoder ENC shown in FIG. 24, as interruption is generated when the counter value becomes 0 to stop the lens.

FIG. 33 is a flow chart showing correction of the lens movement carried out based on the central position of accumulation of the island in which accumulation is completed in the predetermined order, in this example at the second earliest time point. As in the case of FIG. 32, the accumulation mode is set, the accumulation is started in response to the ICG pulse, and the value of the lens position counter P ($t_0$) at the time $t_0$ of the start of accumulation is stored as CT (0). The ADT interruption is permitted, the interruption number counter I is set to 1 and the time lapse of the maximum accumulation time is checked (#1000 to #1040). If an interruption at the completion of accumulation of the respective islands (ADT interruption) is generated before the time lapse of the maximum accumulation time, then whether it is the second interruption or not is checked (#1490). If the interruption is the second interruption, then the value of the lens position counter at that time is stored as CT (2) (#1200). When the accumulation is completed in all of the three islands (#1210, #1220), then the SHM pulse is generated to start reading of data (#1050). Meanwhile, if accumulation is not completed in all of the islands after the time lapsed of the maximum accumulation time, then whether the second accumulation has completed or not is checked (#1042) if not, then the value of the lens position counter at that time point is stored as CT (2) (#1044) and the SHM pulse is generated (#1050). The accumulating operation is thus completed, the SHM pulse is generated for data reading, and the ADT interruption is inhibited. After the recognition of the ADD signal being "Low" level (#1060), the data dump mode is set (#1080) and CCD digital data are inputted (#1090). Thereafter, the accumulation center counter value HCT is calculated in accordance with the counter value CT (0) at the start of accumulation and the counter value CT (2) at the time of completion of the second accumulation (#1110). Thereafter, the A/D conversion of the CCD analog data (#1120) calculation of the amount of defocus (#1130), selection of the amount of defocus (#1140) and conversion into the driving pulse number (#1450) are carried out as in the case of FIG. 32. Based on the driving pulse number $\Delta N$, the lens position counter value CT (4) at that time and the accumulation center position counter value HCT are used to carry out correction of the movement (#1160), calculate the number of remaining driving pulses ΔN and the calculated value is set in the driving counter ERRCNT to continue the driving of the lens (#1170).

Finally, an example will be described in which the correction for the movement of the lens is carried out based on the central position of accumulation of the island ISL which is selected last time, with reference to FIG. 34. The flow is approximately the same as that shown in FIG. 32. Whether or not an island was selected in the last operation is checked before calculation of the lens position counter value HCT at the central position of accumulation. If any of the islands was selected last time, then the order of completion of accumulation of the island ISL which was selected last time is checked, and the lens position counter value at the time of completion of accumulation in accordance with the checked order is determined. If there was an island selected, then the order of completion of accumulation of the second island ISn=IS2 is checked. The lens position counter value at the time of completion of accumulation in accordance with the order and the counter value at the start of accumulation are used to calculate the lens position counter HN1 at the central time of accumulation. Other processes are the same as those described with reference to the flow of FIG. 32.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An automatic focus adjusting apparatus of a camera, comprising:
   (a) a plurality of photoelectric converting means receiving light from an object, each of said photoelectric converting means having a plurality of light receiving portions and a plurality of charge accumulating portions for accumulating charges generated in said light receiving portions;
   (b) accumulation controlling means for controlling time of charge accumulation in each said photoelectric converting means;
   (c) focus detecting means for detecting an in-focus state of a photographic lens based on outputs from said photoelectric converting means to output a focus signal;
   (d) calculating means for calculating an amount of driving said photographic lens based on said focus signal;
   (e) selecting means for selecting one photoelectric converting means out of said plurality of photoelectric converting means, a focusing error being generated when said photographic lens is moved during said time of charge accumulation of the photoelectric converting means selected by said selecting means;
   (f) correcting means for correcting the amount of driving of the photographic lens calculated based on said focusing error; and
   (g) driving means for driving said photographic lens based on said corrected amount of driving the photographic lens.

2. An automatic focus adjusting apparatus of a camera according to claim 1, wherein
   said selecting means selects a prescribed one of said photoelectric converting means.

3. An automatic focus adjusting apparatus of a camera according to claim 1, wherein
   said focus detecting means detects said in-focus state repeatedly, and
   said selecting means selects said photoelectric converting means in which said lens driving amount of a last operation has been calculated.

4. An automatic focus adjusting apparatus of a camera in accordance with claim 1, wherein
   said selecting means detects an order of completion of said charge accumulation in said plurality of photoelectric converting means and selects one of said photoelectric converting means in which charge accumulation is completed in a prescribed order.

5. An automatic focus adjusting apparatus of a camera according to claim 1, further comprising:
   (h) monitoring means for monitoring a present position of said photographic lens; and
   (i) storing means for storing first and second positions of said' photographic lens corresponding to the start and end of said charge accumulation in said selected photoelectric converting means and a third position of said photographic lens corresponding to the end of said focus detection; wherein
   said correcting means determines said focusing error based on said first, second and third positions.

6. An automatic focus adjusting apparatus of a camera, comprising:
   (a) a plurality of photoelectric converting means receiving light from an object, each of said photoelectric converting means having a plurality of light receiving portions and a plurality of charge accumulating portions for accumulating charges generated in said light receiving portions;
   (b) accumulation controlling means for controlling time of charge accumulation in each of said photoelectric converting means;
   (c) focus detecting means for detecting in each of said photoelectric converting means an in-focus state of a photographic lens to output focus signals each indicative of said in-focus state of each of the photoelectric converting means;
   (d) calculating means for calculating an amount of driving said photographic lens for each of said photoelectric converting means based on said focus signals, a focusing error being generated when said photographic lens is moved during the charge accumulation time of each of said photoelectric converting means;
   (e) correcting means for calculating said focusing error in each of said photoelectric converting means and for correcting said calculated lens driving amount in each of said photoelectric converting means based on said focusing error;
   (f) determining means for determining the amount of driving said photographic lens based on each said corrected lens driving amount; and
   (g) driving means for driving said photographic lens based on said lens driving amount determined by said determining means.

7. An automatic focus adjusting apparatus of a camera according to claim 6, further comprising:

(h) monitoring means for monitoring present position of said photographic lens;

(i) memory means for storing first and second positions of said photographic lens corresponding to the start and end of said charge accumulation of each of said photoelectric converting means and a third position of said photographic lens corresponding to the end of focus detection; wherein said correcting means calculates a value of said focusing error of each of said photoelectric converting means based on said first, second and third positions.

8. An automatic focus adjusting apparatus of a camera according to claim 7, wherein each of said photoelectric converting means comprises monitoring means for monitoring intensity of light entering the photoelectric converting means arranged close thereto, and said accumulation controlling means controls said charge accumulation time each of said photoelectric converting means based on an output from each of said brightness monitoring means.

9. An automatic focus adjusting apparatus according to claim 6, wherein said correcting means comprises selecting means for selecting one of said corrected plurality of focusing errors, and said determining means determines said lens driving amount based on said focusing error selected by said selecting means.

10. An automatic focus adjusting apparatus of a camera, comprising:

(a) a single photoelectric converting means having a plurality of light receiving portions each including a plurality of photoelectric converting elements for receiving light from an object, and a plurality of charge accumulating portions provided corresponding to the plurality of light receiving portions for accumulating charges generated in the respective photoelectric converting elements;

(b) accumulation controlling means for controlling charge accumulation time in each of the light receiving portions;

(c) focus detecting means for detecting an in-focus state of a photographic lens based on an output from said photoelectric converting means to output a focus signal;

(d) calculating means for calculating an amount of driving said photographic lens based on said focus signal;

(e) selecting means for selecting one light receiving portion out of said plurality of light receiving portions, a focusing error being generated when said photographic lens is moved in said charge accumulation time of the light receiving portion selected by said selecting means;

(f) correcting means for correcting the amount of driving said photographic lens calculated based on said focusing error; and (g) driving means for driving said photographic lens based on said corrected amount of driving said photographic lens.

11. An automatic focus adjusting apparatus of a camera according to claim 10, wherein said selecting means selects a prescribed one of said light receiving portions.

12. An automatic focus adjusting apparatus according to claim 10, wherein said focus detecting means detects said in-focus state repeatedly, and said selecting means selects one of said light receiving portions in which said lens driving amount of a last operation has been calculated.

13. An automatic focus adjusting apparatus of a camera according to claim 10, wherein said selecting means detects an order of completion of said charge accumulation in said plurality of light receiving portions and selects one of said light receiving portion in which charge accumulation is completed in a prescribed order.

14. An automatic focus adjusting apparatus of a camera, comprising:

(a) a single photoelectric converting means having a plurality of light receiving portions each including a plurality of photoelectric converting elements for receiving light from an object, and a plurality of charge accumulating portions provided corresponding to the plurality of light receiving portions for accumulating charges generated in the respective photoelectric converting elements;

(b) accumulation controlling means for controlling charge accumulation time in each of said light receiving portions;

(c) focus detecting means for detecting an in-focus state of a photographic lens in each of said light receiving portions and an outputting focus signals indicative of said in-focus state of the respective light receiving portions;

(d) calculating means for calculating an amount of driving said photographic lens for each of said light receiving portions based on said focus signals, a focusing error being generated when said photographic lens is moved during the charge accumulation time in each of said light receiving portions;

(e) correcting means for detecting said focusing error in each of said light receiving portions and for correcting said calculated lens driving amount in each of said light receiving portions based on said focusing error;

(f) determining means for determining the amount of driving said photographic lens based on each of said corrected lens driving amounts;

(g) driving means for driving said photographic lens based on said lens driving amount determined by said determining means.

* * * * *